(12) United States Patent
Narutaki et al.

(10) Patent No.: US 7,916,249 B2
(45) Date of Patent: Mar. 29, 2011

(54) COLOR FILTER LAYER AND DISPLAY DEVICE USING THE SAME

(75) Inventors: Yozo Narutaki, Nara-ken (JP); Masumi Kubo, Nara-ken (JP); Shogo Fujioka, Nara-ken (JP); Takayuki Shimada, Nara-ken (JP); Mikio Katayama, Nara-ken (JP); Youji Yoshimura, Nara-ken (JP); Yutaka Ishii, Nara-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/461,790

(22) Filed: Aug. 25, 2009

(65) Prior Publication Data

US 2010/0060832 A1   Mar. 11, 2010

Related U.S. Application Data

(60) Division of application No. 11/812,856, filed on Jun. 22, 2007, now Pat. No. 7,599,023, which is a division of application No. 11/084,140, filed on Mar. 21, 2005, now Pat. No. 7,250,998, which is a division of application No. 10/618,599, filed on Jul. 15, 2003, now Pat. No. 6,906,765, which is a division of application No. 09/695,400, filed on Oct. 25, 2000, now Pat. No. 6,624,860, which is a continuation-in-part of application No. 09/236,397, filed on Jan. 25, 1999, now Pat. No. 6,215,538.

(30) Foreign Application Priority Data

Jan. 26, 1998 (JP) .................................. 10-012241
Jul. 7, 1998 (JP) .................................. 10-190913
Jul. 14, 1998 (JP) .................................. 10-198462
Aug. 5, 1998 (JP) .................................. 10-221255
Oct. 16, 1998 (JP) .................................. 10-294324

(51) Int. Cl.
*G02F 1/1335* (2006.01)
(52) U.S. Cl. .......................... 349/114; 349/106
(58) Field of Classification Search .................. 349/114
See application file for complete search history.

(56) References Cited

U.S. PATENT DOCUMENTS

| | | |
|---|---|---|
| 4,492,432 A | 1/1985 | Kaufmann et al. |
| 4,519,678 A | 5/1985 | Komatsubara et al. |
| 5,408,345 A | 4/1995 | Mitsui et al. |
| 5,510,916 A | 4/1996 | Takahashi |
| 5,724,112 A | 3/1998 | Yoshida et al. |
| 5,753,937 A | 5/1998 | Shimomaki et al. |
| 6,084,650 A | 7/2000 | Sekiguchi |
| 6,124,909 A | 9/2000 | Miyashita et al. |

(Continued)

FOREIGN PATENT DOCUMENTS

JP   55-74516   6/1980

(Continued)

OTHER PUBLICATIONS

U.S. Appl. No. 11/812,856, filed Jun. 22, 2007; Narutaki et al.

(Continued)

*Primary Examiner* — Wen-Ying P Chen
(74) *Attorney, Agent, or Firm* — Nixon & Vanderhye P.C.

(57) ABSTRACT

A color filter layer includes a first region and a second region, wherein the number of times that light used for display is transmitted through the color filter layer is different between the first region and the second region.

11 Claims, 35 Drawing Sheets

U.S. PATENT DOCUMENTS

| | | |
|---|---|---|
| 6,147,728 A | 11/2000 | Okumura et al. |
| 6,195,140 B1 | 2/2001 | Kubo et al. |
| 6,211,992 B1 | 4/2001 | Van Aerle et al. |
| 6,215,538 B1 | 4/2001 | Narutaki et al. |
| 6,281,952 B1 | 8/2001 | Okamoto et al. |
| 6,624,860 B1 | 9/2003 | Narutaki et al. |
| 6,819,379 B2 | 11/2004 | Kubo et al. |
| 6,906,765 B2 | 6/2005 | Narutaki et al. |
| 6,950,159 B2 | 9/2005 | Kubo et al. |
| 6,965,422 B2 | 11/2005 | Kubo et al. |
| 7,064,801 B2 | 6/2006 | Kubo et al. |
| 7,084,943 B2 | 8/2006 | Kubo et al. |
| 7,250,998 B2 | 7/2007 | Narutaki et al. |
| 7,471,359 B2 | 12/2008 | Narutaki et al. |
| 7,599,023 B2 | 10/2009 | Narutaki et al. |

FOREIGN PATENT DOCUMENTS

| | | |
|---|---|---|
| JP | 57-56818 | 1/1985 |
| JP | 61-147231 | 7/1986 |
| JP | 61-198131 | 9/1986 |
| JP | 61-230101 | 10/1986 |
| JP | 4-44250 B2 | 7/1992 |
| JP | 4-282613 | 10/1992 |
| JP | 7-218923 | 8/1995 |
| JP | 7-318929 | 12/1995 |
| JP | 7-325284 | 12/1995 |
| JP | 7-333598 | 12/1995 |
| JP | 8-122762 | 5/1996 |
| JP | 8-286178 | 11/1996 |
| JP | 10-010528 | 1/1998 |
| JP | 10-10528 | 1/1998 |
| JP | 10-123312 | 5/1998 |
| JP | 10-142621 | 5/1998 |
| JP | 11-052366 | 2/1999 |
| JP | 11-109331 | 4/1999 |
| JP | 11-183892 | 7/1999 |
| JP | 11-295736 | 10/1999 |
| JP | 2000-267081 | 9/2000 |
| JP | 2000-298271 | 10/2000 |
| JP | 2000-305110 | 11/2000 |
| WO | WO97/04350 | 2/1997 |

OTHER PUBLICATIONS

Patent Abstracts of Japan, Publication No. 08286178 (Nov. 1996).
U.S. Patent Application "Liquid Crystal Display Device" filed Oct. 1, 2002.

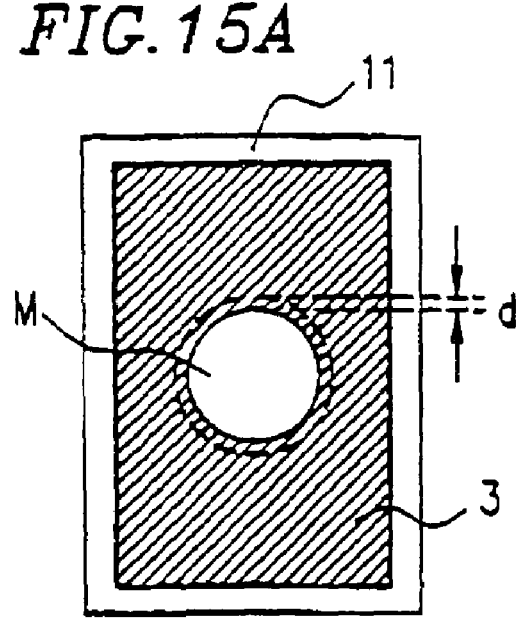
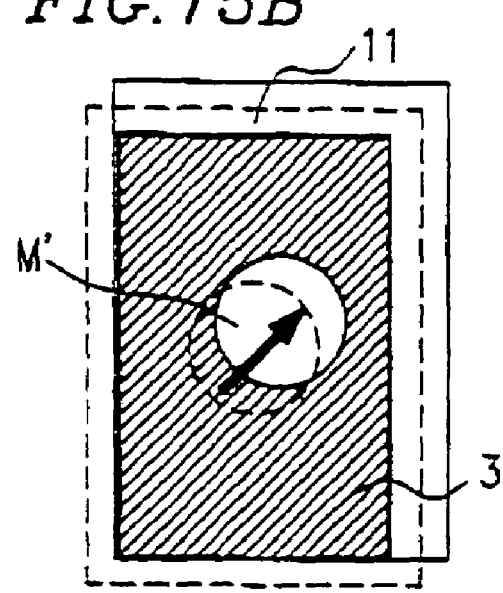

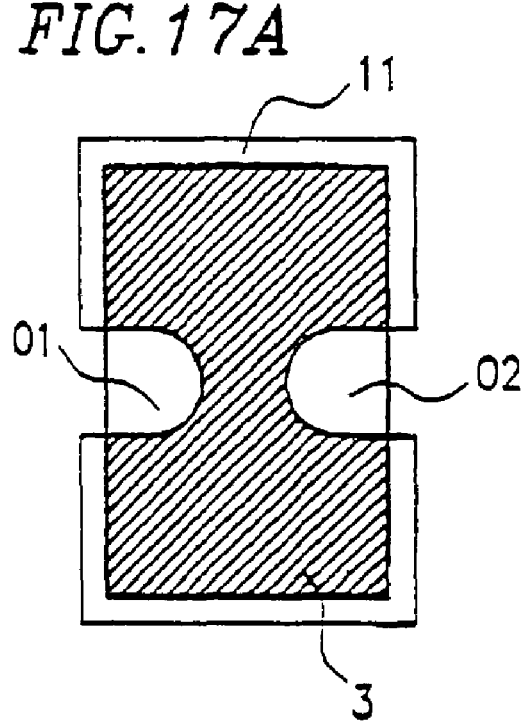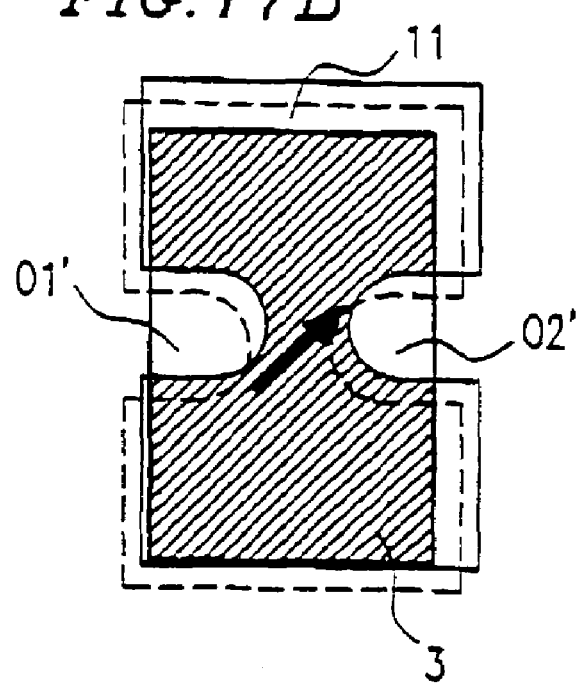

▲ Reflective color filter (reflection characteristics)
■ Transmissive color filter (transmission characteristics)
○ Example 15   Sr=0.125
□ Example 17   Sr=0.2
× Example 18   Sr=0.38(R), 0.5(G), 0.18(B)

COLOR FILTER LAYER AND DISPLAY DEVICE USING THE SAME

RELATED APPLICATION

This application is a Divisional of application Ser. No. 11/812,856, filed Jun. 22, 2007, which is a DIV of Ser. No. 11/084,140, filed Mar. 21, 2005 (now U.S. Pat. No. 7,250,998), which is a Divisional of application Ser. No. 10/618,599, filed Jul. 15, 2003 (now U.S. Pat. No. 6,906,765), which is a Divisional of application Ser. No. 09/695,400, filed Oct. 25, 2000(now U.S. Pat. No. 6,624,860) which is a continuation-in-part application of application Ser. No. 09/236,397 filed Jan. 25, 1999 (now U.S. Pat. No. 6,215,538), the entire contents of which are all hereby incorporated herein by reference in this application.

BACKGROUND OF THE INVENTION

1. Field of the Invention

The present invention relates to a liquid crystal display device for use in office automation (OA) equipment (e.g., word processors and personal computers), portable information equipment (e.g., electronic books), video cassette recorders (VCRs) incorporating a liquid crystal monitor, and the like.

2. Description of the Related Art

Recently, liquid crystal display devices have been widely used in OA equipment (e.g., word processors and personal computers), portable information equipment (e.g., electronic books), video cassette recorders (VCRs) incorporating a liquid crystal monitor and the like, utilizing the features of a thin display thickness and low power consumption.

Such liquid crystal display devices include a transmission-type liquid crystal display device using a thin, transparent, electrically conductive film such as ITO (Indium Tin Oxide) as pixel electrodes, and a reflection-type liquid crystal display device using reflective electrodes of, for example, a metal as pixel electrodes.

Unlike CRTs (cathode ray tubes) and EL (electroluminescence), liquid crystal display devices are not self-light-emitting display devices. Therefore, in the case of the transmission-type liquid crystal display device, an illumination device such as a fluorescent tube, which is a so-called backlight, is placed behind the liquid crystal display device, whereby a display is provided using incident light of the backlight. On the other hand, in the case of the reflection-type liquid crystal display device, a display is provided by reflecting incident light from the outside by the reflective electrodes.

Since the transmission-type liquid crystal display device uses the backlight to provide a display, the transmission-type liquid crystal display device has an advantage of providing a bright, high-contrast display without being significantly affected by the brightness around the liquid crystal display device. However, the backlight consumes about 50% or more of the overall power consumption of the liquid crystal display device, whereby power consumption is disadvantageously increased.

On the other hand, since the reflection-type liquid crystal display device does not use such a backlight, the reflection-type liquid crystal display device has an advantage of significantly reducing power consumption. However, brightness and contrast of the display are affected by environmental factors such as brightness around the liquid crystal display device and/or the conditions under which the liquid crystal display device is used.

In the case of the reflection-type liquid crystal display device, visual recognition of the display is affected by environmental factors such as brightness around the liquid crystal display device, and is extremely deteriorated particularly when ambient light is dark. On the other hand, in the case of the transmission-type liquid crystal display device, visual recognition of the display is reduced when ambient light is extremely bright such as in good weather.

As means for solving such problems, liquid crystal display devices having functions of both reflection- and transmission-type liquid crystal display devices (hereinafter, referred to as "transmission/reflection-type liquid crystal display devices") are disclosed in copending U.S. application Ser. No. 09/122,756 filed on Jul. 27, 1998; U.S. application Ser. No. 09/220,792 filed on Dec. 28, 1998, which is a continuation-in-part application of U.S. application Ser. No. 09/122,756; and U.S. application Ser. No. 09/523,658 filed on Mar. 10, 2000, which is a continuation-in-part application of U.S. application Ser. No. 09/122,756. These U.S. applications are incorporated herein by reference.

In the transmission/reflection-type liquid crystal display devices proposed by the above-mentioned U.S. applications, each pixel region includes a reflective electrode region for reflecting ambient light and a transmissive electrode region for transmitting light from a backlight, the transmissive electrode region being formed from a film having a relatively high light-reflectance. As a result, the transmission/reflection-type liquid crystal display device (i) serves, in a pitch-dark environment, as a transmission-type liquid crystal display device which provides a display by using light from the backlight transmitted through the transmissive electrode regions, (ii) serves, in a dark environment, as a transmission/reflection-type liquid crystal display device which provides a display by using both light from the backlight transmitted through the transmissive electrode regions and ambient light reflected by the reflective electrode regions, and (iii) serves, in a bright environment, as a reflection-type liquid crystal display device which provides a display by using light reflected from the reflective electrode regions.

Hereinafter, the terms "reflective electrode region", "transmissive electrode region", "reflective region" and "transmissive region" as used herein will be defined.

A display device which provides a display in a reflection mode by using ambient light has reflective electrode regions for reflecting ambient light transmitted through a liquid crystal layer, the reflective electrode regions being provided on one of a pair of substrates. The reflective electrode region may be formed from a reflective electrode, or may be formed from a combination of a transparent electrode and a reflective layer (reflective plate). In other words, an electrode for applying a voltage to the liquid crystal layer may be formed from the transparent electrode, and the reflective layer for reflecting incident light does not have to function as an electrode.

In the display device according to the present invention, a region for providing a display in a transmission mode is referred to as a transmissive region, whereas a region for providing a display in a reflection mode is referred to as a reflective region. The transmissive region includes a transmissive electrode region and a liquid crystal region defined by the transmissive electrode region, and the reflective region includes a reflective electrode region and a liquid crystal region defined by the reflective electrode region. Although a semi-transmission/reflection-type liquid crystal display device using a semi-transmissive/reflective film (i.e., a porous, reflective film) has reflective electrode regions and transmissive electrode regions, light passing through respective liquid crystal regions defined by the reflective electrode regions and transmissive electrode regions is mixed and overlaps each other. Therefore, a region for providing a display in a transmission mode (i.e., a transmissive region) and a region for providing a display in a reflection mode (i.e., a reflective region) cannot be defined independently. In other words, among the liquid crystal display devices each of which has a transmissive electrode region and a reflective electrode region, a liquid crystal device in which a region for providing a display in a transmission mode and a region for providing a display in a reflection mode cannot be defined independently (that is, they substantially overlap each other) is referred to as a semi-transmission/reflection type liquid crystal display device.

The term "pixel region" as used herein will now be described. The liquid crystal display device of the present invention includes a plurality of pixel regions for providing a display. A single pixel region indicates a portion (component) of the liquid crystal display device, which constitutes a pixel, i.e., a minimum unit of the display. Typically, in an active matrix-type liquid crystal display device having a counter electrode and a plurality of pixel electrodes which are switched by respective active devices (e.g., thin film transistors (TFTs)) formed in a matrix, each pixel region includes a respective pixel electrode, a counter electrode region facing the pixel electrode, and a liquid crystal region located therebetween. In a simple matrix-type (or passive matrix-type) liquid crystal display device having stripe-shaped electrodes (scanning electrodes and signal electrodes) which are formed on respective substrates so as to intersect each other with a liquid crystal layer interposed therebetween, a pixel region includes respective intersection regions of the corresponding scanning and signal electrodes and a liquid crystal region located at the intersection.

In a color display device, color filter regions are formed in a display region, and light passing through the color filter regions is controlled, thereby providing color display by an additive color mixing method. For example, in the case where the color filter regions correspond to the pixel regions, a single color picture element region is formed from three pixel regions: red pixel region (R-pixel region), green pixel region (G-pixel region) and blue pixel region (B-pixel region). The color filter regions are regions which are provided in a color filter layer, and each of them indicates, for example, a red filter region (R-filter region), a green filter region (G-filter region) or a blue filter region (B-filter region). A color filter region is a portion of a respective color layer (i.e., red layer (R-layer), green layer (G-layer) or blue layer (B-layer)). A layer including a plurality of color layers is herein referred to as a color filter layer. In the case where the plurality of color layers are arranged in stripes, the color filter layer includes a plurality of R-layers, G-layers and B-layers which are arranged in a cyclic manner (i.e., RGBRGB . . . ). The color filter layer may include a light-shielding layer (black mask) provided between the color layers or between the color filter regions. A region having no color layer is herein referred to as a transmissive non-color filter region. In the present invention, the color filter layer includes color filter regions and transmissive non-color filter regions.

It should be noted that the term "retardation" as used herein indicates retardation with respect to light which is incident perpendicularly to a liquid crystal layer or phase compensation element (e.g., quarter-wave plate or half-wave plate) unless otherwise specified.

The above-mentioned transmission/reflection-type liquid crystal display device can always provide excellent visual recognition of display regardless of the brightness of ambient light. However, in the case where a conventional color filter is used for color display, optimum color display cannot be obtained both in a transmission mode and reflection mode. For example, the brightness of outside light is changed, visual recognition of the color display deteriorates.

FIG. 30 is a plan view showing the case where a normal color filter layer 24 as conventionally used is provided in the above-mentioned transmission/reflection-type liquid crystal display device. As shown in FIG. 30, the color filter layer 24 includes color filter regions 24A, 24B and 24C. Each of the color filter regions 24A, 24S and 24C is a part of a respective stripe-shaped color layer (i.e., R-layer, G-layer or B-layer), and is formed so as to entirely cover a respective pixel region having a reflective electrode region (R region) 3 and a transmissive electrode region (T region) 8.

In the case where such a conventional color filter layer 24 is applied to the above-mentioned transmission/reflection-type liquid crystal display device as shown in FIG. 30, light from the backlight is transmitted through a color filter layer in a transmissive region only once, whereas ambient light is transmitted through a color filter layer in a reflective region twice due to the reflection. Therefore, in the case where the same color filter is used both in the transmissive region and reflective region, display in the reflective region becomes dark. For example, a transmittance of a color filter for use in a normal transmission-type liquid crystal display device is about 30% after human eye's color sensitivity collection, while being about 16% when this color filter is used in a reflection-type liquid crystal display device.

Japanese Laid-Open Publication No. 8-286178 discloses a liquid crystal display device which realizes bright, high chromaticity-property color display, wherein a color filter has an island-shaped color portion in each pixel, and an opening (i.e., a region having no color portion) is provided around each color portion. However, Japanese Laid-Open Publication No. 8-286178 merely discloses the structure of the color filter layer for use in a transmission or reflection-type liquid crystal display device, and fails to disclose an optimal structure of a color filter layer for use in a transmission/refection-type liquid crystal display device including, in every pixel region, both a reflective electrode region for reflecting ambient light and a transmissive electrode region for transmitting light from the backlight. In other words, Japanese Laid-Open Publication No. 8-286178 fails to disclose features and arrangement of color filter region (i.e., color portion) and transmissive non-color filter region (i.e., opening). When the technique of forming a color filter as disclosed in Japanese Laid-Open Publication No. 8-286178 is applied to such a transmission/reflection-type liquid crystal display device, only a light-colored, low chromaticity-property display can be obtained. Therefore, it is very difficult to realize a color filter capable of providing a bright, high chromaticity-property color display both in the transmissive and reflective regions. Moreover, in the case where a substrate having a color filter layer and a substrate having electrodes used for display are laminated to each other so as to be shifted from each other, that is, in the case where the substrates are misaligned with respect to each other, the transmissive non-color filter regions protrude into the transmissive regions, thereby reducing chromaticity property.

SUMMARY OF THE INVENTION

According to one aspect of the present invention, a color filter layer includes a first region and a second region, wherein the number of times that light used for display is transmitted through the color filter layer is different between the first region and the second region.

In one embodiment of the present invention, the first and second regions of the color filter layer are formed so that a difference in a chromaticity property between the light used for display in the first region and the light used for display in the second region is small.

According to another aspect of the present invention, a display device includes: a first substrate having a display region, the display region including at least one reflective region in which light is reflected by a reflection means and at least one transmissive region through which light is transmitted; and a color filter layer including at least one first region and at least one second region, wherein the number of times that light used for display is transmitted through the color filter layer is different between the at least one first region and the at least one second region.

In one embodiment of the present invention, the color filter layer is formed so that a difference in a chromaticity property between the light used for display in the at least one first region and the light used for display in the at least one second region is small.

In another embodiment of the present invention, light used for display in the at least one first region is light which has been reflected by the reflection means of the at least one reflective region; and light used for display in the at least one second region is light which has been transmitted through the at least one transmissive region.

In still another embodiment of the present invention, the at least one reflective region includes a liquid crystal layer and a reflective electrode region which performs as the reflection means and which provides a voltage to the liquid crystal layer of the at least one reflective region; and the at least one transmissive region includes a liquid crystal layer and a transmissive electrode region which provides a voltage to the liquid crystal layer of the at least one transmissive region.

In still another embodiment of the present invention, the display device further includes a second substrate which faces the first substrate.

In still another embodiment of the present invention, the at least one first region and the at least one second region each include a color filter region, the color filter region giving a color to light which passes through the color filter region.

In still another embodiment of the present invention, the at least one first region includes a transmissive non-color filter region.

In still another embodiment of the present invention, in the at least one first region, the transmissive non-color filter region is provided over or under the color filter region in the color filter layer.

In still another embodiment of the present invention, the color filter layer is provided on the first substrate.

In still another embodiment of the present invention, the transmissive non-color filter region is positioned between the first substrate and the color filter layer.

In still another embodiment of the present invention, the display device further includes a second substrate on which the color filter layer is provided.

In still another embodiment of the present invention, in the at least one first region, the transmissive non-color filter region is positioned between the second substrate and the color filter region.

In still another embodiment of the present invention, a thickness of the color filter region in at least a portion of the at least one first region is different from a thickness of the color filter region in the at least one second region which produces a same color type as that produced in the at least one first region.

In still another embodiment of the present invention, a material used for the color filter region in the at least one first region is the same as that used for the color filter region in the at least one second region which produces a same color type as that produced in the at least one first region.

In still another embodiment of the present invention, a thickness of the color filter region in at least a portion of the at least one first region is different from that of the color filter region in the at least one second region which produces a same color type as that produced in the at least one first region.

In still another embodiment of the present invention, a material used for the color filter region in the at least one first region is the same as that used for the color filter region in the at least one second region which produces a same color type as that produced in the at least one first region.

In still another embodiment of the present invention, the color filter layer includes a plurality of first regions; and each of the plurality of first regions has the same ratio of an area ratio of the color filter region to the transmissive non-color filter region.

In still another embodiment of the present invention, a transmissivity at least a portion of the at least one first region for a wavelength in a certain wavelength range is less than a transmissivity for a wavelength in the certain wavelength range of the at least one second region which produces a same color type as that produced in the at least one first region.

In still another embodiment of the present invention, a material used for the color filter region in the at least one first region is different from that used for the color filter region in the at least one second region which produces a same color type as that produced in the first region.

According to one aspect of the present invention, a liquid crystal display device includes: a first substrate; a second substrate; a liquid crystal layer interposed between the first and second substrates; a plurality of pixel regions for providing a display; and a reflective region for providing a display by using reflected light, the reflective region being provided in each of the plurality of pixel regions, wherein the first substrate includes a reflective electrode region in the reflective region, the second substrate includes a color filter layer, the color filter layer having a color filter region and a non-color filter region in the reflective electrode region, and the color filter region and the non-color filter region are located such that an overlapping area of the reflective electrode region and the non-color filter region is not changed even when the first and second substrates are mis-aligned with respect to each other.

In one example, the color filter layer includes a light-shielding region between the color filter region and the non-color filter region.

According to another aspect of the present invention, a liquid crystal display device includes: a first substrate; a second substrate; a liquid crystal layer interposed between the first and second substrates; a plurality of pixel regions for providing a display; and a reflective region for providing a display by using reflected light and a transmissive region for providing a display by using transmitted light, the reflective region and the transmissive region being provided in each of the plurality of pixel regions, wherein the first substrate includes a reflective electrode region in the reflective region and a transmissive electrode region in the transmissive region, the second substrate includes a color filter layer, the color filter layer having a color filter region and a non-color filter region in the reflective electrode, and the color filter region and the non-color filter region are located such that an overlapping area of the reflective electrode region and the non-color filter region is not changed even when the first and second substrates are mis-aligned with respect to each other.

In one example, the transmissive region includes the color filter region located on the second substrate.

In one example, the color filter layer includes a light-shielding region between the color filter region and the non-color filter region.

In one example, each of the plurality of pixel electrodes has the same ratio of an area of the color filter region to an area of the non-color filter layer in the reflective region.

In one example, a ratio of the area of the non-color filter region to an area of the reflective region is in a range of about 0.05 to about 0.2.

In one example, the color filter layer includes one of a blue filter region, a red filter region and a green filter region in each of the plurality of pixel regions, wherein in a pixel region having the blue filter region, a ratio of an area of the non-color filter region to an area of the reflective region is in a range of about 0.05 to about 0.2; in a pixel region having the red filter region, a ratio of an area of the non-color filter region to an area of the reflective region is in a range of about 0.05 to about 0.38; and in a pixel region having the green filter region, a ratio of an area of the non-color filter region to an area of the reflective region is in a range of about 0.05 to about 0.5.

In one example, the liquid crystal layer includes a liquid crystal material exhibiting negative dielectric anisotropy, and a quarter-wave plate and a polarizing plate are provided on each of the first and second substrates with the first and second substrates interposed therebetween.

In one example, the reflective electrode region has a light-diffusing structure having an uneven surface.

In one example, a planarizing layer having a light transmitting property is formed in the non-color filter region.

In one example, the first substrate further includes a switching device provided in each of the plurality of pixel regions, the reflective electrode region includes an insulation layer and a reflective electrode formed on the insulation layer, the reflective electrode and the switching device being electrically connected to each other through a contact hole formed in the insulation layer, and the second substrate has the color filter region at a portion facing the contact hole.

Hereinafter, functions of the present invention will be described briefly.

A liquid crystal display device of the present invention includes a pair of substrates which are laminated to each other with a liquid crystal layer interposed therebetween, and also includes reflective regions for providing a display by using reflected light, wherein reflective electrode regions are formed on one of the substrates, and a color filter layer including color filter regions is formed on the other substrate. A color filter region(s) and a non-color filter region(s) are formed on the respective reflective region of the color filter substrate. This color filter layer is formed such that the area of the non-color filter region(s) in each reflective region is not changed even when the pair of substrates (i.e., the reflective electrode regions and the color filter regions) are not accurately laminated to each other (i.e., the pair of substrates are mis-aligned with respect to each other). Therefore, variation in optical characteristics of the liquid crystal device (e.g., brightness and chromaticity property) can be minimized even when a finished pattern of the edge portion of the color filter region is varied upon producing the color filter layer, as well as even when the substrates are mis-aligned upon producing the liquid crystal panel.

Moreover, a black mask (light-shielding region) having a line width larger than the variation in a finished pattern of the edge portion of the color filter region is formed at least on the boundary between the color filter region and non-color filter region. As a result, variation in display characteristics such as chromaticity property and contrast can be minimized even when the finished pattern of the edge portion of the color filter region is varied.

According to the present invention, a non-color filter region is provided in the respective reflective regions of the other substrate in a transmission/reflection-type liquid crystal display device, whereby white display can be provided as well as brightness of the display can be improved without increasing the number of steps in the production process as compared to the case where the color filter layer for use in the transmission-type liquid crystal display device is used. This is because a thickness of the color layers of the color filter layer need not be adjusted separately in the transmissive electrode region and reflective electrode region. In the conventional examples, brightness and chromaticity property have been optimized for each of the color layers. Therefore, it has been difficult to select a type of pigment and to adjust a concentration of the pigment dispersed in a resin. However, according to the present invention, brightness and chromaticity property can be optimized only by the design of a mask pattern, whereby the production process is simplified as well as the restrictions in designing a liquid crystal display device can be reduced.

According to the present invention, light transmitted through the color filter regions having high chromaticity property is mixed with light transmitted through the non-color filter regions, whereby bright color display required for the reflection display can be realized.

Moreover, the color filter region(s) having high chromaticity property is/are provided in each transmissive region, whereby a display having high chromaticity property can be provided as in the case of the conventional transmission-type liquid crystal display devices.

In each pixel region, the ratio of the area of the color filter region(s) to the area of the non-color filter region(s) in the reflective region is the same. Therefore, different masks need not be used for producing different color layers (i.e., R, G and B layers) of the color filter layer by using an exposure process. In other words, each of the R, G and B layers can be produced by merely shifting a single mask to a respective prescribed position and conducting the exposure process. As a result, the production process of the color filter layer can be simplified.

By setting the ratio of the area of the non-color filter region(s) to the area of the reflective region in the range of 0.05 to 0.2, color display having excellent brightness and chromaticity property can be realized. When the area of each non-color filer region is uniformly increased in order to increase the brightness, the brightness is improved, whereas the chromaticity property is reduced, and finally, display cannot be distinguished from white display. In other words, when the ratio of the area of the non-color filter region(s) to the area of the reflective region is set to less than about 0.05, sufficient brightness cannot be obtained in reflection display, resulting in a defective display. On the other hand, when the ratio of the area of the non-color filter region(s) to the area of the reflective region is set to more than about 0.2, the chromaticity property is reduced, resulting in a light-colored display which cannot be distinguished from white display (see, for example, FIGS. 25 and 26).

Moreover, the color filter layer includes one of R, G and B filter regions in each pixel region. The ratio of the area of the non-color filter region(s) to the area of the reflective region in a pixel region having a B filter region is set in the range of about 0.05 to about 0.2. The ratio of the area of the non-color filter region(s) to the area of the reflective region in a pixel region having a R filter region is set in the range of about 0.05 to about 0.38. The ratio of the area of the non-color filter region(s) to the area of the reflective region in a pixel region having a G filter region is set in the range of about 0.05 to about 0.5. Thus, brightness and chromaticity property of each color can be retained, whereby a well-balanced color filter can be realized. Such setting of the ratios is done because respective optimal values of the brightness and chromaticity property are different for each color.

When the liquid crystal display device is in a normally black mode (e.g., the liquid crystal molecules are arranged in a crossed-Nicols arrangement in a vertical alignment mode), black display can be provided while a voltage is not applied. Therefore, leakage of light can be eliminated when the transmission/reflection-type liquid crystal display device of the present invention is used either as a reflection-type liquid crystal display device or as a transmission-type liquid crystal display device. As a result, reduction in contrast can be prevented.

Moreover, a liquid crystal material having negative dielectric anisotropy is used for the liquid crystal layer, and a quarter-wave plate and a polarizing plate are provided on each of the respective outer surfaces of the pair of substrates which face each other. Accordingly, a high-contrast display can be realized without changing the thickness of the liquid crystal layer in the transmissive region and reflective region.

Moreover, each reflective electrode region has an uneven surface so as to have a light-diffusing property. Therefore, a light-diffusing function can be obtained only by the reflective electrode regions, whereby a mirror effect in the reflective electrode regions can be prevented, as well as a paper-white display can be realized. The "mirror effect" herein means, for example, a phenomenon that a viewer's face is reflected in a mirror.

Moreover, a planarizing film having a light-transmitting property is formed at least on each of the non-color filter regions, whereby the surface of the color filter substrate which faces the liquid crystal layer (i.e., the surface of the color filter substrate on which a counter electrode is formed) can be substantially planarlized. Accordingly, in each reflective region, a thickness of the portion of the liquid crystal layer which corresponds to the color filter region is made equal to a thickness of the portion of the liquid crystal layer which corresponds to the non-color filter region (i.e., a cell gap difference is eliminated). As a result, retardation in both portions of the liquid crystal layer is made equal to each other, whereby a uniform display can be realized from a dark state to a bright state. It should be noted that, when the planarizing film is formed from a colorless material, only the thickness of the liquid crystal layer can be adjusted by the planarizing film. Therefore, light is not absorbed in the color filer substrate, thereby preventing reduction in light utilization efficiency. Furthermore, designed color-reproduction of the color filter layer is not affected.

Moreover, the color filter layer is also formed on the region of the color filter substrate which corresponds to a contact hole for connecting a pixel electrode to a switching device, whereby the leakage of light within the reflective region, which results from the mismatch of the electro-optical characteristics due to the difference in retardation, is reduced. Accordingly, a defective display which occurs in the vicinity of the contact hole can be eliminated, whereby a uniform display can be obtained in a dark state, gray state and bright state. Also, a higher contrast can be achieved.

Thus, the invention described herein makes possible the advantage of providing a display device which is capable of providing a high-quality color display regardless of the condition of ambient light.

These and other advantages of the present invention will become apparent to those skilled in the art upon reading and understanding the following detailed description with reference to the accompanying figures.

BRIEF DESCRIPTION OF THE DRAWINGS

FIGS. 15A and 15B are enlarged plan views each showing a pixel electrode portion of a liquid crystal display device according to Example 10 of the present invention.

FIGS. 17A and 17B are enlarged plan views each showing a pixel electrode portion of a liquid crystal display device according to Example 12 of the present invention.

FIGS. 35A through 36H show steps of forming a color filter substrate according to example 24 of the present invention by partially thinning the thickness of a color filter layer.

FIGS. 36A through 36I show steps of forming a color filter substrate according to example 24 by using a dyeing technique and by partially thinning the thickness of a color filter layer.

DESCRIPTION OF THE PREFERRED EMBODIMENTS

Embodiment 1

EXAMPLE 1

Hereinafter, features of Example 1 and comparative examples of the present invention will be described with reference to the accompanying drawings.

COMPARATIVE EXAMPLE 1

Figure 1A:
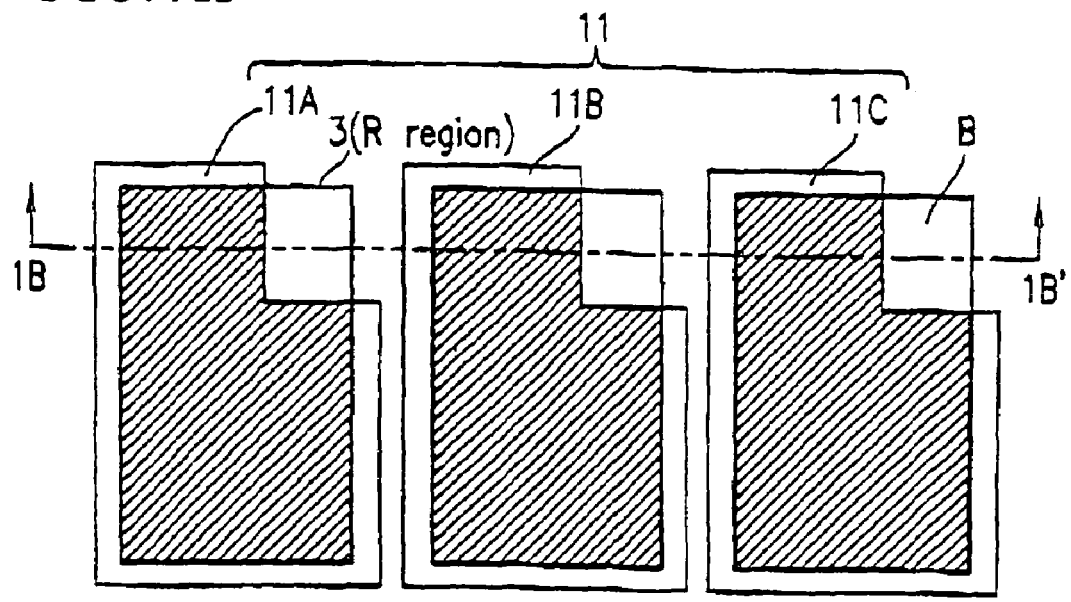
FIG. 1A is an enlarged plan view showing a pixel electrode portion of a reflection-type liquid crystal display device according to Comparative Example 1 of the present invention.

For facilitating understanding of examples of the present invention, a liquid crystal display device according to Comparative Example 1 of the present invention will be described with reference to the drawings. FIG. 1A is an enlarged plan view showing a pixel electrode portion of a reflection-type liquid crystal display device of Comparative Example 1, and FIG. 1D is an enlarged cross sectional view taken along line 1-1B' of FIG. 1A.

Figure 2A:
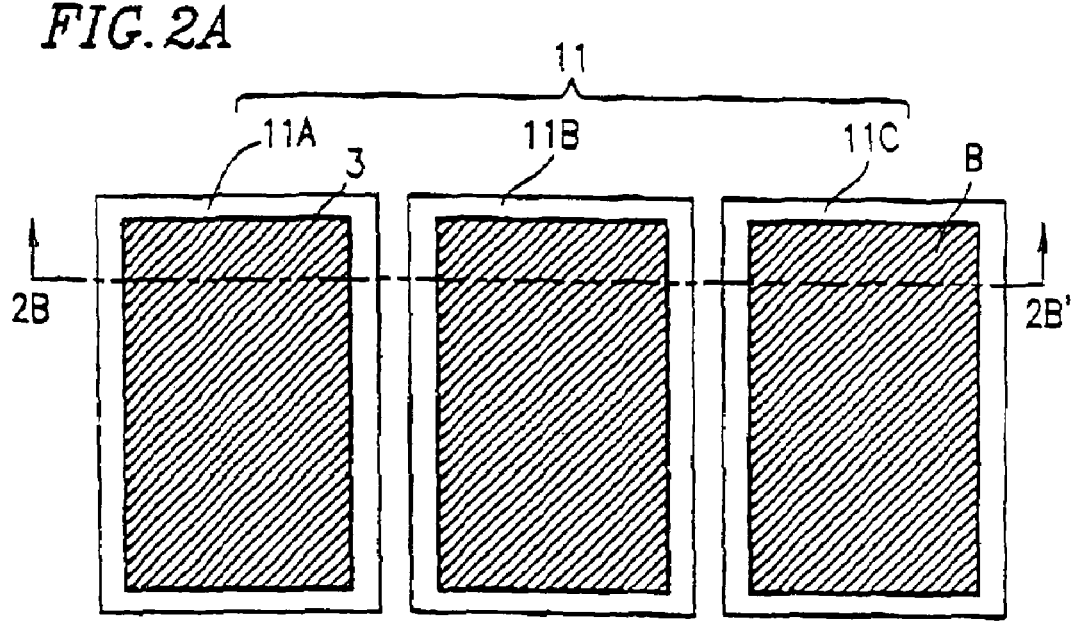
FIG. 2A is an enlarged plan view showing a pixel electrode portion of a conventional reflection-type liquid crystal display device.
Figure 2B:
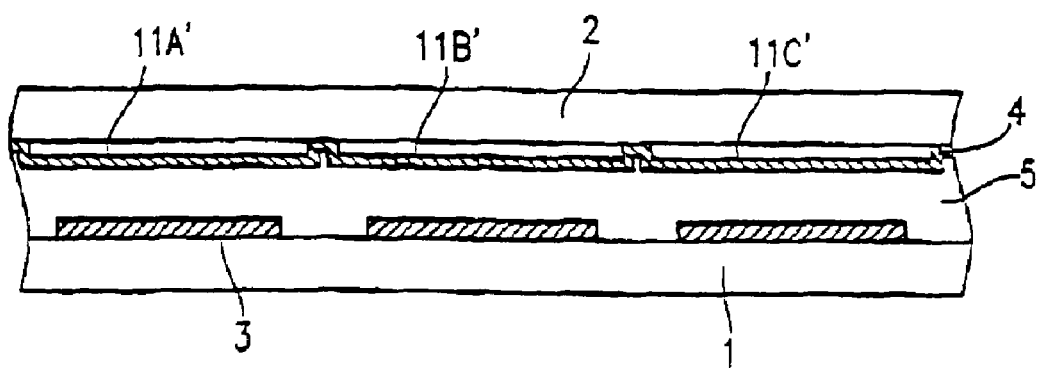
FIG. 2B is an enlarged cross sectional view taken along line 2B-2B' of FIG. 2A.

FIG. 2A is an enlarged plan view showing a pixel electrode portion of a conventional reflection-type liquid crystal display device, and FIG. 2B is an enlarged cross sectional view taken along line 2B-2B' of FIG. 2A.

It should be noted that the structure other than a color filter layer 11 including color filter regions 11A, 11B and 11C and reflective electrodes 3 serving as pixel electrodes is omitted in FIGS. 1A, 1B, 2A and 2B. The reflective electrodes 3 may have a shape other than the rectangular shape as shown in the Figures.

First, the conventional reflection-type liquid crystal display device will be described with reference to FIGS. 2A and 2B. As shown in FIGS. 2A and 2B, the reflective electrodes 3 having a prescribed shape are formed on a lower substrate 1, whereas the color filter layer 11 including the color filter regions 11A, 11B and 11C, and a transparent electrode 4 are formed on a color filter substrate 2 which faces the lower substrate 1. A liquid crystal layer 5 is interposed between the reflective electrodes 3 and the transparent electrode 4 which are respectively formed on the lower substrate 1 and the color filter substrate 2.

In order to display various colors, in a liquid crystal display device, a color filter including three color layers, red (R), green (G) and blue (B) layers, are generally provided on a single substrate such that the respective color layers are arranged in a prescribed manner, and quantities of light transmitted through the respective color layers are controlled by controlling a voltage applied to the liquid crystal layer 5. Thus, light components transmitted through the respective color layer are mixed together, thereby providing color display. Such a method is referred to as an additive color mixing method.

In the case of a color filter which is generally used in a transmission-type liquid crystal display device, white (W) display is obtained by equally mixing R, G and B light components, thereby achieving a transmittance of about 32%. However, it has been found that, in the case where such a color filter for use in the transmission-type liquid crystal display device is used in a reflection or transmission/reflection-type liquid crystal display device, light passes through the color filter in the reflective regions twice. Accordingly, a brightness of only about 11% can be obtained in the white display of the reflective regions.

Figure 1B:
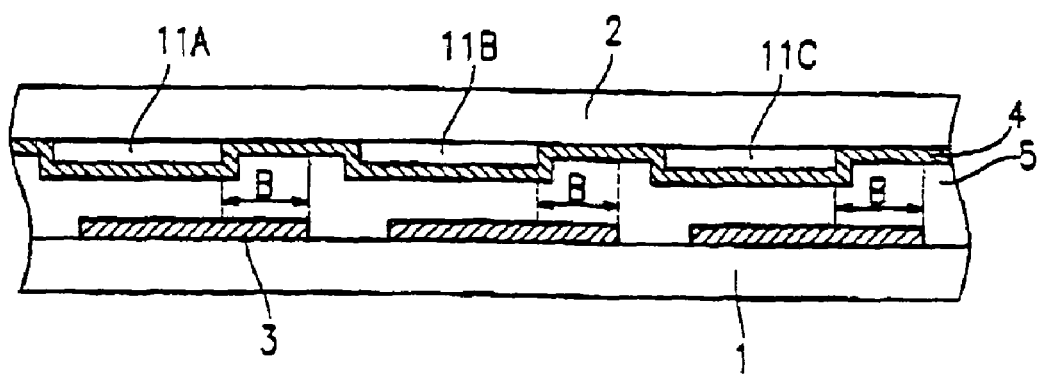
FIG. 1B is an enlarged cross sectional view taken along line 1B-1B' of FIG. 1A.

Comparative Example 1 of the present invention will now be described with reference to FIGS. 1A and 1B. As shown in FIGS. 1A and 1B, reflective electrodes 3 having a prescribed shape are formed on a lower substrate 1, whereas a color filter layer 11 including color filter regions 11A, 11B and 11C, and a transparent electrode 4 are formed on a color filter substrate 2 which faces the lower substrate 1. A liquid crystal layer 5 is interposed between the reflective electrodes 3 and the transparent electrode 4 which are respectively formed on the lower substrate 1 and the color filter substrate 2.

In Comparative Example 1, the above-mentioned method for changing a material or thickness of the conventional color filter is not used. Instead, as shown in FIG. 1A, Comparative Example 1 is characterized in that the color filter regions 11A, 11B and 11C of the high chromaticity-property color filter layer 11 for use in the transmission-type liquid crystal display device are formed as well as non-color filter regions B are provided on the regions of the color filter substrate 2 which correspond to the reflective electrodes 3. Therefore, white display is provided by the non-color filter regions B, and is mixed with color display provided by the high chromaticity-property color filter 11, whereby a bright display, which is required in the reflective regions of the reflection- or transmission/reflection-type liquid crystal display device, can be realized.

Figure 3:
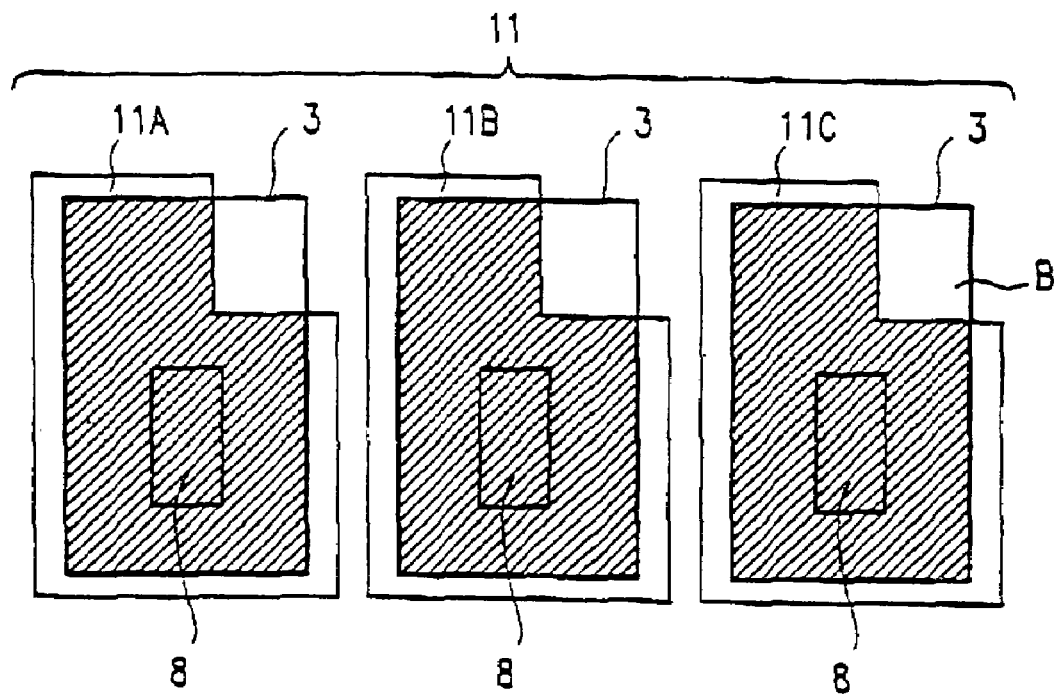
FIG. 3 is an enlarged plan view showing a pixel electrode portion of a transmission/reflection-type liquid crystal display device of Comparative Example 1.

The reflection-type liquid crystal display device in which all of the pixel electrodes 3 are reflective electrode regions are described as Comparative Example 1. However, the same is applied to a transmission/reflection-type liquid crystal display device in which each pixel electrode has a transparent electrode region 8 and a reflective electrode region 3 as shown in, for example, FIG. 3.

A liquid crystal display device according to Example 1 of the present invention will now be described with reference to the drawings. FIGS. 5A to 5D are enlarged plan views each showing a pixel electrode portion of the liquid crystal display device of Example 1.

In the liquid crystal display device of Example 1, reflective electrodes (pixel electrodes) having a prescribed shape are formed on a lower substrate, whereas a color filter layer and a transparent electrode (counter electrode) are formed on a color filter substrate which faces the lower substrate, although not shown in the Figures. A liquid crystal layer is interposed between the reflective electrodes formed on the lower substrate and the transparent electrode formed on the color filter substrate.

Figure 5A:
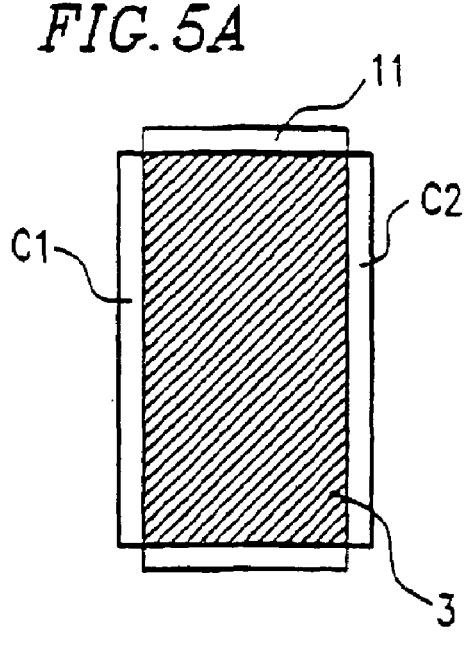
FIGS. 5A to 5D are enlarged plan views each showing a pixel electrode portion of the liquid crystal display device according to Example 1 of the present invention.

As shown in FIG. 5A, in Example 1, a color filter region 11 of a high chromaticity-property color filter layer for use in the transmission-type liquid crystal display device is formed as well as non-color filter regions C1 and C2 are provided in each of the regions of the color filter substrate 2 which corresponds to the respective reflective electrode regions. White display is provided by the non-color filter regions C1 and C2, and is mixed with color display provided by the high chromaticity-property color filter regions 11, whereby a bright display, which is required in the reflective regions of the reflection- or transmission/reflection-type liquid crystal display device, can be realized.

FIG. 5A shows the color filter region 11 on the color filter substrate and the reflective electrode 3 on the lower substrate in the case where the lower substrate and the color filter substrate of the reflection-type liquid crystal display device are laminated to each other with the designed alignment accuracy.

Figure 5B:
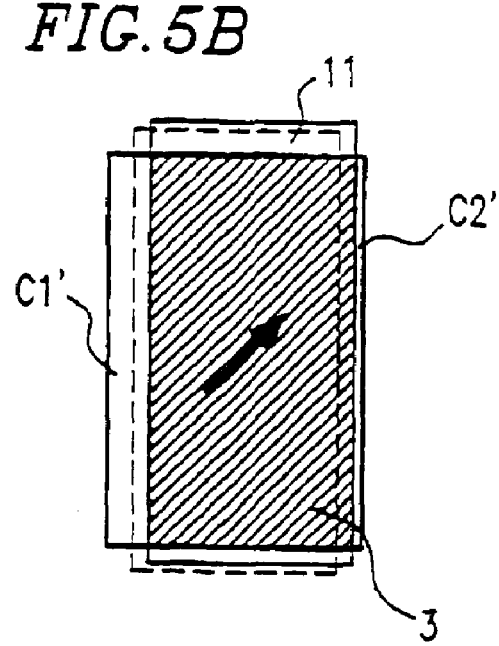

FIG. 5B shows the color filter region 11 on the color filter substrate and the reflective electrode 3 on the lower substrate in the case where the lower substrate and the color filter substrate of the reflection-type liquid crystal display device are laminated to each other with the color filter substrate being shifted with respect to the lower substrate in the direction shown by the arrow.

In the production process of the liquid crystal display device of Example 1, even when the lower substrate and the color filter substrate are mis-aligned with respect to each other (as shown FIG. 5B), the total area S(C') of the resultant non-color filter regions C1' and C2' of FIG. 5B is equal to the total area S(C) of the non-color filter regions C1 and C2 of FIG. 5A, as follows:

$$S(C')=C1'+C2'$$

$$S(C)=C1+C2$$

$$S(C')=S(C).$$

Therefore, chromaticity and brightness of the liquid crystal display device are not changed.

According to Example 1, the non-color filter regions are provided, and the color filter layer is patterned such that the total area of the non-color filter regions in each pixel region is not changed even when the lower substrate and the color filter substrate are mis-aligned with respect to each other. Therefore, a liquid crystal display device in which chromaticity and brightness are not changed can be realized.

Figure 5C:
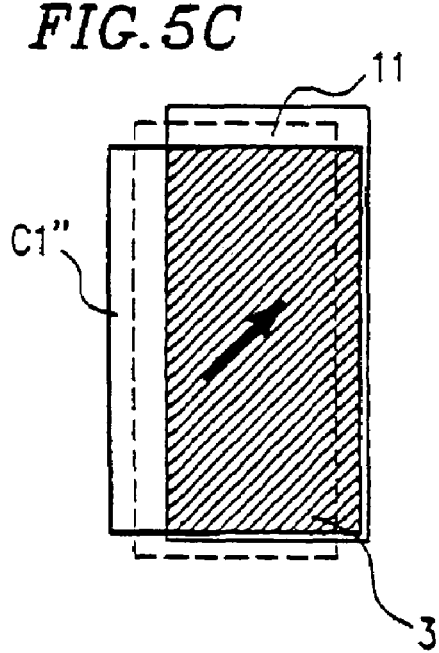

However, as shown in FIG. 5C, in the case where the lower substrate and the color filter substrate are excessively mis-aligned with respect to each other so that the non-color filter region C2 as shown in FIG. 5A is eliminated, the area S(C") of the resultant non-color filter region C1" becomes smaller than the total area (C) of the non-color filter regions C1 and C2, as follows:

$$S(C'')=C1''$$

$$S(C'')>S(C).$$

Accordingly, chromaticity and brightness of the liquid crystal display device are changed.

In Example 1, it is therefore desirable to determine a pattern of the color filter layer so as to prevent occurrence of the state shown in FIG. 5C, in view of the alignment accuracy of the substrates in the production process of the liquid crystal display device.

Figure 5D:
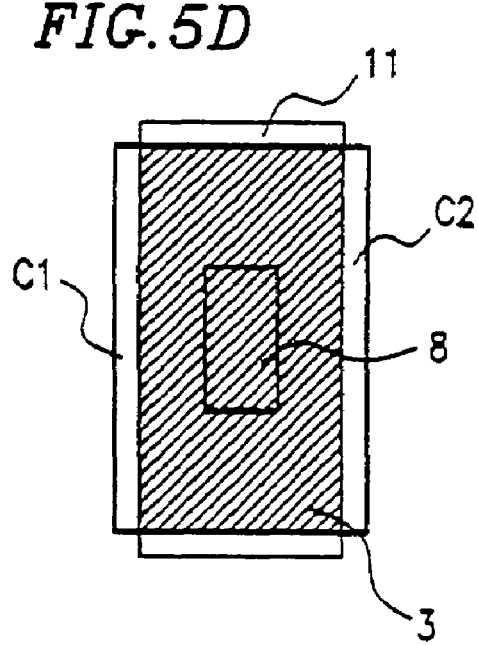

It should be noted that similar effects can also be obtained upon using the transmission/reflection-type liquid crystal display device in which each pixel electrode has a transmissive electrode region 8 and a reflective electrode region 3 as shown in FIG. 5D.

In the case of the transmission/reflection-type liquid crystal display device, however, when the lower substrate and the color filter substrate are mis-aligned such that a non-color filter region C1 or C2 on the color filter substrate overlaps a transparent electrode region 8 of a pixel electrode, chromaticity and brightness of the display in the transparent electrode region 8 are changed. Therefore, in the case of the transmission/reflection-type liquid crystal display device as well, it is desirable to determine a pattern of the color filter layer so as to prevent the non-color filter region from overlapping the transparent electrode region 8 of the pixel electrode, in view of the alignment accuracy of the substrates in the production process of the liquid crystal display device.

Hereinafter, the liquid crystal display device having a color filter pattern as shown in Comparative Example 1 will be described briefly in terms of the case where the lower substrate 1 and the color filter substrate 2 are mis-aligned with respect to each other (see FIGS. 1A and 1B).

Figure 4A:
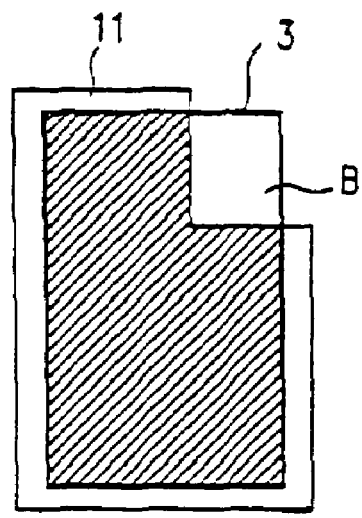
FIGS. 4A and 4B are enlarged plan views each showing a pixel electrode portion of the reflection-type liquid crystal display device of Comparative Example 1.
Figure 4B:
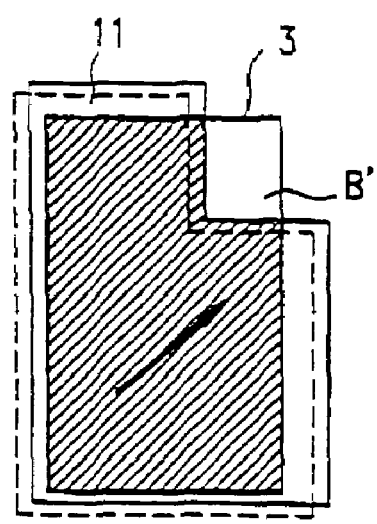

FIG. 4A shows the color filter region 11 and the reflective electrode region 3 of the reflection-type liquid crystal display device in the case where the lower substrate 1 and the color filter substrate 2 are laminated to each other with the designed alignment accuracy. FIG. 4B shows the color filter region 11 and the reflective electrode region 3 of the reflection-type liquid crystal display device in the case where the lower substrate 1 and the color filter substrate 2 are laminated to each other with the color filter substrate 2 being shifted with respect to the lower substrate 1 in the direction shown by the arrow.

In the production process of the liquid crystal display device of Comparative Example 1, when the lower substrate 1 and the color filter substrate 2 are mis-aligned with respect to each other as shown in FIG. 4B, the area S(B') of the resultant non-color filter region B' is smaller than the area S(B) of the non-color filter region B in the case where the lower substrate 1 and the color filter substrate 2 are laminated to each other with the designed alignment accuracy, that is, S(B')<S(B). Therefore, chromaticity and brightness of the liquid crystal display device of Comparative Example 1 are changed when the substrates are mis-aligned with respect to each other.

COMPARATIVE EXAMPLE 2

Figure 6A:
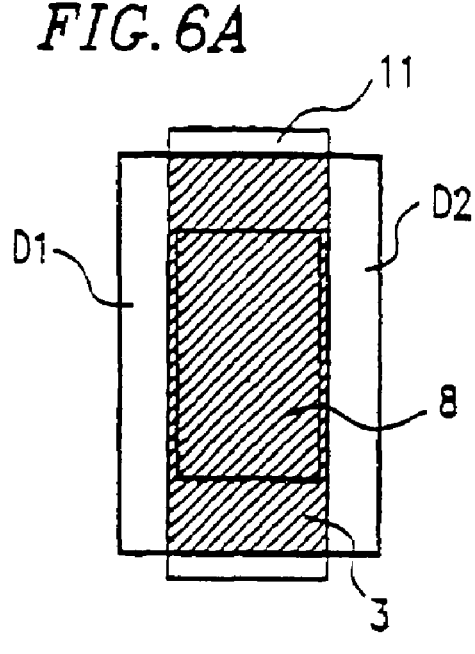
FIGS. 6A and 6B are enlarged plan views each showing a pixel electrode portion of a transmission/reflection-type liquid crystal display device according to Comparative Example 2 of the present invention.

Hereinafter, a liquid crystal display device according to Comparative Example 2 of the present invention will be described with reference to the drawings. FIG. 6A is an enlarged plan view showing a pixel electrode portion of a transmission/reflection-type liquid crystal display device of Comparative Example 2.

As shown in FIG. 6A, Comparative Example 2 is characterized in that a color filter region 11 of a high chromaticity-property color filter layer for use in the transmission-type liquid crystal display device is formed as well as non-color filter regions D1 and D2 are provided in each of the regions of the color filter substrate 2 which correspond to the respective pixel electrode regions 3. White display is provided by the non-color filter regions D1 and D2, and is mixed with color display provided by the high chromaticity-property color filter regions 11, whereby a bright display which is required in the reflective regions of the transmission/reflection-type liquid crystal display device can be realized.

FIG. 6A shows the color filter region 11 on the color filter substrate and the reflective electrode region 3 and the transmissive electrode region 8 on the lower substrate in the case where the lower substrate and the color filter substrate of the transmission/reflection-type liquid crystal display device are laminated to each other with the designed alignment accuracy.

Figure 6B:
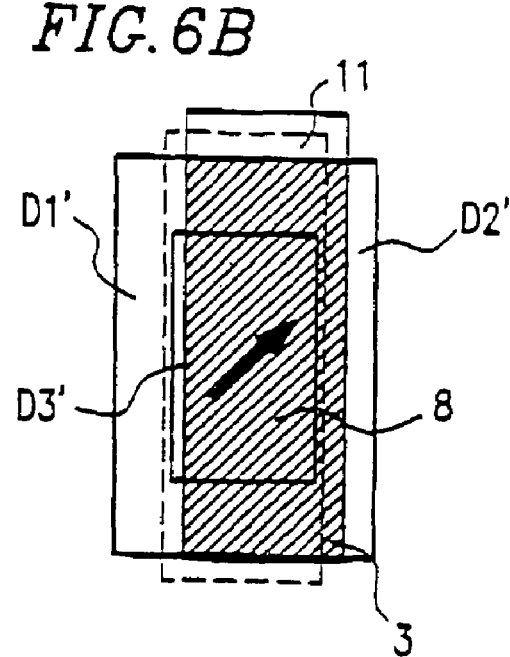

FIG. 6B shows the color filter region 11 on the color filter substrate and the reflective electrode region 3 and the transmissive electrode region 8 on the lower substrate in the case where the lower substrate and the color filter substrate of the transmission/reflection-type liquid crystal display device are laminated to each other with the color filter substrate being shifted with respect to the lower substrate in the direction shown by the arrow.

In the production process of the liquid crystal display device of Comparative Example 2, when the lower substrate and the color filter substrate are mis-aligned with respect to each other as shown in FIG. 6B, the total area S(D') of the resultant non-color filter regions D1' and D2' in the reflective region is smaller than the total area S(D) of the non-color filter regions D1 and D2 of FIG. 6A, as follows:

$$S(D')=D1'+D2'-D3'$$

$$S(D)=D1+D2$$

$$S(D')<S(D).$$

Accordingly, in the liquid crystal display device of Comparative Example 2, chromaticity and brightness of the liquid crystal display device are changed when the substrates are mis-aligned with respect to each other.

Since Comparative Example 2 is a transmission/reflection-type liquid crystal display device in which each pixel electrode has a transmissive electrode region 8 and a reflective electrode region 3, such a disadvantage resulting from mis-alignment may occur in the case where an edge portion of the color filter region 11 is designed to be located in the vicinity of an edge portion of the transmissive electrode region 8.

Thus, in the case of the transmission/reflection-type liquid crystal display device, chromaticity and brightness of the display in the transmissive electrode region 8 is changed when the lower substrate and the color filter substrate are mis-aligned such that the non-color filter region on the color filter substrate overlaps the transmissive electrode region 8 of the pixel electrode. Accordingly, it is desirable to determine a pattern of the color filter layer so as to prevent the non-color filter region from overlapping the transmissive electrode region 8 of the pixel electrode, in view of the alignment accuracy of the substrates in the production process of the liquid crystal display device.

EXAMPLE 2

Figure 7A:
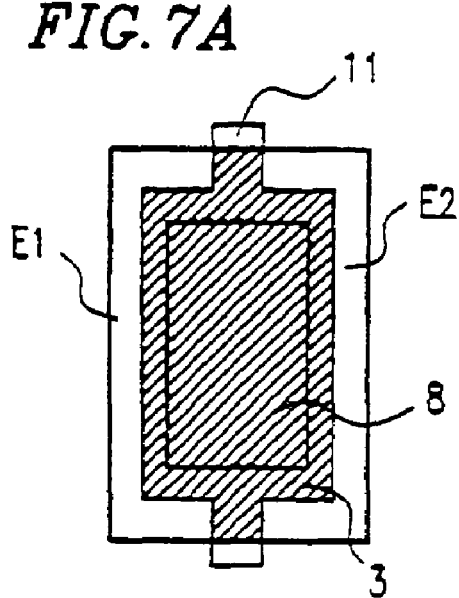
FIGS. 7A and 7B are enlarged plan views each showing a pixel electrode portion of a liquid crystal display device according to Example 2 of the present invention.
Figure 7B:
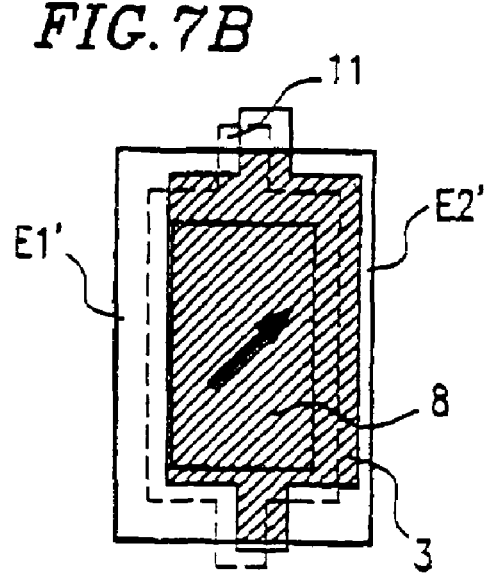

Hereinafter, a liquid crystal display device according to Example 2 of the present invention will be described with reference to the drawings. FIGS. 7A and 7B are enlarged plan views each showing a pixel electrode portion of the liquid crystal display device of Example 2.

In Example 2, as shown in FIG. 7A, a color filter region 11 of a high chromaticity-property color filter for use in the transmission-type liquid crystal display device is formed as well as non-color filter regions E1 and E2 are provided in each of the regions of the color filter substrate 2 which correspond to the respective picture electrode regions 3. White display is provided by the non-color filter regions E1 and B2, and is mixed with color display provided by the high chromaticity-property color filter regions 11, whereby bright display which is required in the reflective regions of the transmission/reflection-type liquid crystal display device can be realized.

FIG. 7A shows the color filter region 11 on the color filter substrate and the pixel electrode region 3 on the lower substrate in the case where the lower substrate and the color filter substrate are laminated to each other with the designed alignment accuracy.

FIG. 7B shows the color filter region 11 on the color filter substrate and the pixel electrode region 3 on the lower substrate in the case where the lower substrate and the color filter substrate are laminated to each other with the color filter substrate being shifted with respect to the lower substrate in the direction shown by the arrow.

In the production process of the liquid crystal display device of Example 2, even when the lower substrate and the color filter substrate are misaligned with respect to each other as shown in FIG. 7B, the total area S(E') of the resultant non-color filter regions E1' and E2' is equal to the total area S(E) of the non-color filter regions E1 and E2 of FIG. 7A, as follows:

$$S(E')=E1'+E2'$$

$$S(E)=E1+E2$$

$$S(E')=S(E).$$

Therefore, chromaticity and brightness of the liquid crystal display device are not changed.

According to Example 2, the non-color filter regions are provided, and the color filter layer is patterned such that the total area of the non-color filter regions in each pixel region is not changed even when the lower substrate and the color filter substrate are misaligned with respect to each other. Therefore, a liquid crystal display device in which chromaticity and brightness are not changed can be realized.

In this respect, in the transmission/reflection-type liquid crystal display device of Example 2, a pattern of the color filter region 11 is determined so that the non-color filter region does not overlap the transmissive electrode region 8 of the pixel electrode when the lower substrate and the color filter substrate are mis-aligned with respect to each other, in view of the alignment accuracy of the substrates in the production process of the liquid crystal display device. In other words, in Example 2, the color filter region 11 and the transmissive electrode region 8 are located such that the distance between the respective edge portions of the color filter region 11 and the transmissive electrode region 8 is larger than the alignment margin. Accordingly, such a change in chromaticity and brightness of the liquid crystal display device resulting from the mis-alignment of the substrates as in the case of the liquid crystal display device of Comparative Example 2 can be suppressed.

EXAMPLE 3

Figure 8A:
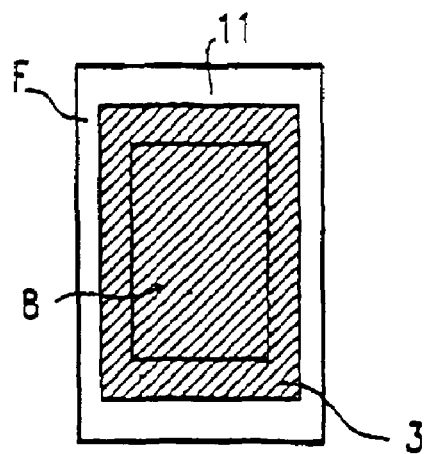
FIGS. 8A and 8B are enlarged plan views each showing a pixel electrode portion of a liquid crystal display device according to Example 3 of the present invention.
Figure 8B:
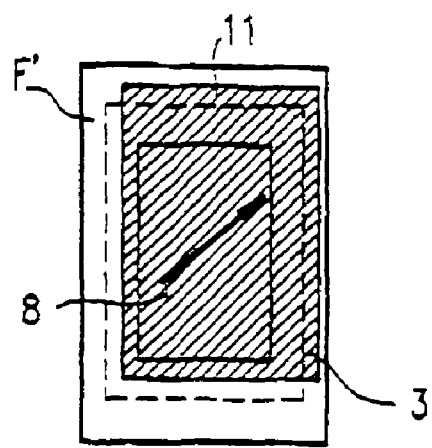

Hereinafter, a liquid crystal display device according to Example 3 of the present invention will be described with reference to the drawings. FIGS. 8A and 8B are enlarged plan views each showing a pixel electrode portion of the liquid crystal display device of Example 3.

In Example 3, as shown in FIG. 8A, a color filter region 11 of a high chromaticity-property color filter layer for use in the transmission-type liquid crystal display device are formed as well as a non-color filter region F is provided in a region of the color filter substrate which corresponds to the respective pixel electrode 3. White display is provided by the non-color filter regions F, and is mixed with color display provided by the high chromaticity-property color filter regions 11, whereby a bright display, which is required in the reflective regions of the transmission/reflection-type liquid crystal display device, can be realized.

FIG. 8A shows the color filter region 11 on the color filter substrate and the pixel electrode 3 on the lower substrate in the case where the lower substrate and the color filter substrate are laminated to each other with the designed alignment accuracy.

FIG. 8B shows the color filter region 11 on the color filter substrate and the pixel electrode 3 on the lower substrate in the case where the lower substrate and the color filter substrate are laminated to each other with the color filter substrate being shifted with respect to the lower substrate in the direction shown by the arrow.

In the production process of the liquid crystal display device of Example 3, even when the lower substrate and the color filter substrate are misaligned with respect to each other as shown in FIG. 8B, the area S(F') of the resultant non-color filter region F' is equal to the area S(F) of the non-color filter region F of FIG. 8A, that is, S(F')=S(F). Therefore, chromaticity and brightness of the liquid crystal display device are not changed.

Thus, according to Example 3, the non-color filter regions are provided, and the color filter layer is patterned such that the area of the non-color filter in each pixel region is not changed even when the lower substrate and the non-color filter substrate are mis-aligned with respect to each other. In other words, the color filter region 11 and the transmissive electrode region 8 are located such that the distance between the respective edge portions of the color filter 11 and the transmissive electrode region 8 is larger than the alignment margin. Therefore, a liquid crystal display device in which chromaticity and brightness are not changed can be realized.

EXAMPLE 4

Figure 9A:
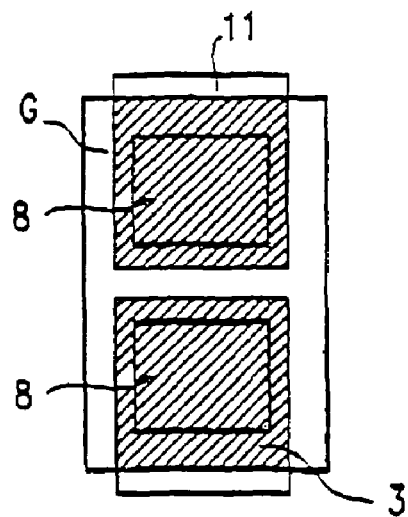
FIGS. 9A and 9B are enlarged plan views each showing a pixel electrode portion of a liquid crystal display device according to Example 4 of the present invention.
Figure 9B:
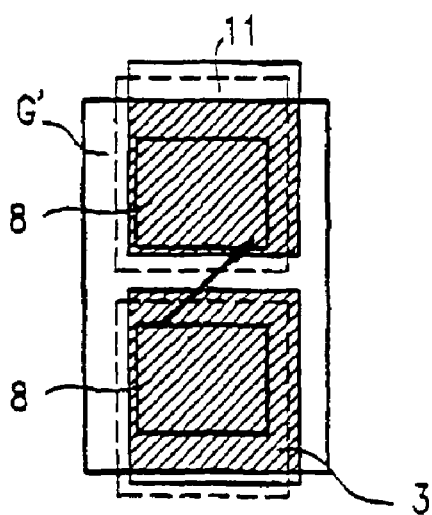

Hereinafter, a liquid crystal display device according to Example 4 of the present invention will be described with reference to the drawings. FIGS. 9A and 9B are enlarged plan views each showing a pixel electrode portion of the liquid crystal display device of Example 4.

In Example 4, as shown in FIG. 9A, a color filter region 11 of a high chromaticity-property color filter layer for use in the transmission-type liquid crystal display device is formed as well as a non-color filter region G is provided in each of the regions of the color filter substrate which correspond to the respective pixel electrodes 3. White display is provided by the non-color filter regions G, and is mixed with color display provided by the high chromaticity-property color regions 11, whereby a bright display, which is required in the reflective regions of the transmission/reflection-type liquid crystal display device, can be realized.

FIG. 9A shows the color filter region 11 on the color filter substrate 2 and the pixel electrode 3 on the lower substrate in the case where the lower substrate and the color filter substrate are laminated to each other with the designed alignment accuracy.

FIG. 9B shows the color filter region 11 on the color filter substrate and the pixel electrode 3 on the lower substrate in the case where the lower substrate and the color filter substrate are laminated to each other with the color filter substrate being shifted with respect to the lower substrate in the direction shown by the arrow.

In the production process of the liquid crystal display device of Example 4, even when the lower substrate and the color filter substrate are mis-aligned with respect to each other as shown in FIG. 9B, the area S(G') of the resultant non-color filter region G' is equal to the area S(G) of the non-color filter region G of FIG. 9A, that is, S(G')=S(G). Therefore, chromaticity and brightness of the liquid crystal display device are not changed.

According to Example 4, the non-color filter regions are provided, and the color filter is patterned such that the area of the non-color filter in each pixel region is not changed even when the lower substrate and the non-color filter substrate are mis-aligned with respect to each other. Therefore, a liquid crystal display device in which chromaticity and brightness are not changed can be realized.

EXAMPLE 5

Figure 10A:
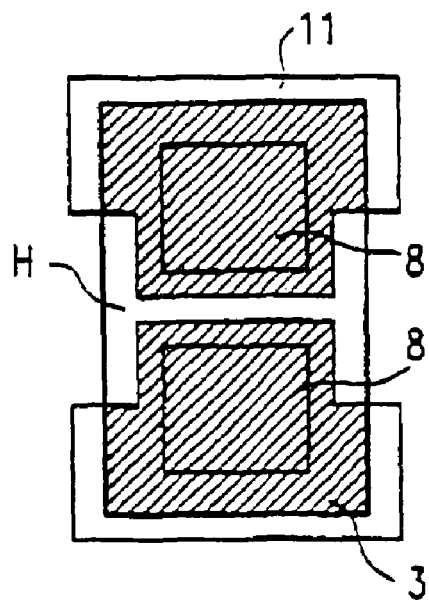
FIGS. 10A and 10B are enlarged plan views each showing a pixel electrode portion of a liquid crystal display device according to Example 5 of the present invention.
Figure 10B:
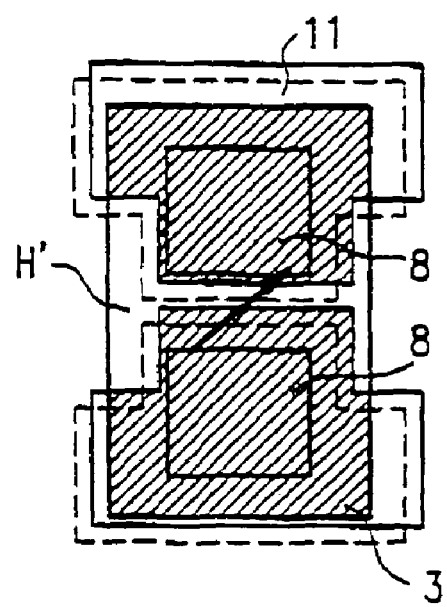

Hereinafter, a liquid crystal display device according to Example 5 of the present invention will be described with reference to the drawings. FIGS. 10A and 10B are enlarged plan views each showing a pixel electrode portion of the liquid crystal display device of Example 5, and FIG. 10C is a plan view showing the entire pattern of a color filter layer in the liquid crystal display device of Example 5.

In Example 5, as shown in FIG. 10A, a color filter region 11 of a high chromaticity-property color filter for use in the transmission-type liquid crystal display device is formed as well as a non-color filter region H is provided in each of the regions of the color filter substrate which correspond to the respective pixel electrodes 3. White display is provided by the non-color filter regions H, and is mixed with color display provided by the high chromaticity-property color filter regions 11, whereby a bright display, which is required in the reflective regions of the transmission/reflection-type liquid crystal display device, can be realized.

Figure 10C:
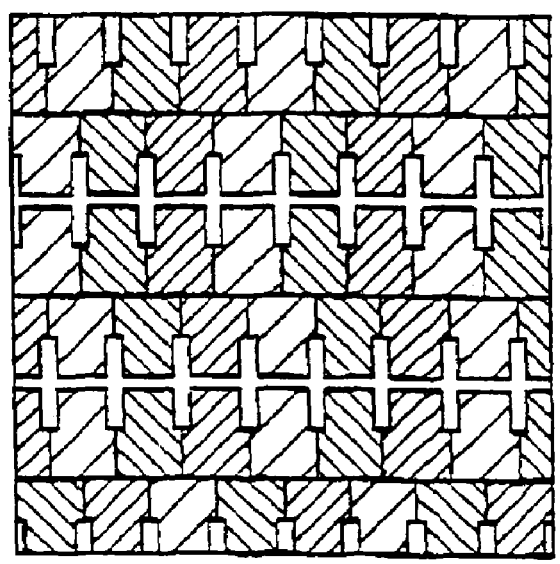
FIG. 10C is a plan view showing the entire pattern of a color filter of the liquid crystal display device of Example 5.

It should be noted that, in the liquid crystal display device of Example 5, the R, G and B color filter regions 11 as shown in FIG. 10A are provided in a delta arrangement as shown in FIG. 10C for color display.

FIG. 10A shows the color filter region 11 on the color filter substrate and the pixel electrode 3 on the lower substrate in the case where the lower substrate and the color filter substrate are laminated to each other with the designed Alignment accuracy.

FIG. 10B shows the color filter region 11 on the color filter substrate and the pixel electrode 3 on the lower substrate in case where the lower substrate and the color filter substrate are laminated to each other with the color filter substrate being shifted with respect to the lower substrate in the direction shown by the arrow.

In the production process of the liquid crystal display device of Example 5, even when the lower substrate and the color filter substrate are mis-aligned with respect to each other as shown in FIG. 10B, the area S(H') of the resultant non-color filter region H' is equal to the area S(H) of the non-color filter region H of FIG. 10A, that is, S(H')=S(H). Therefore, chromaticity and brightness of the liquid crystal display device are not changed.

According to Example 5, the non-color filter regions are provided, and the color filter layer is patterned such that the area of the non-color filter in each pixel region is not changed even when the lower substrate and the non-color filter substrate are mis-aligned with respect to each other. Therefore, a liquid crystal display device in which chromaticity and brightness are not changed can be realized.

EXAMPLE 6

Figure 11A:
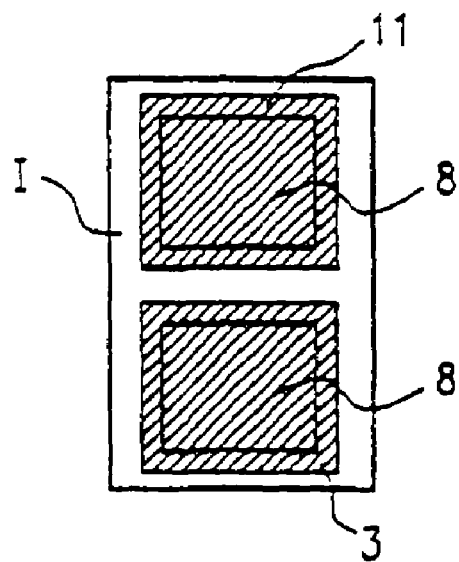
FIGS. 11A and 11B are enlarged plan views each showing a pixel electrode portion of a liquid crystal display device according to Example 6 of the present invention.
Figure 11B:
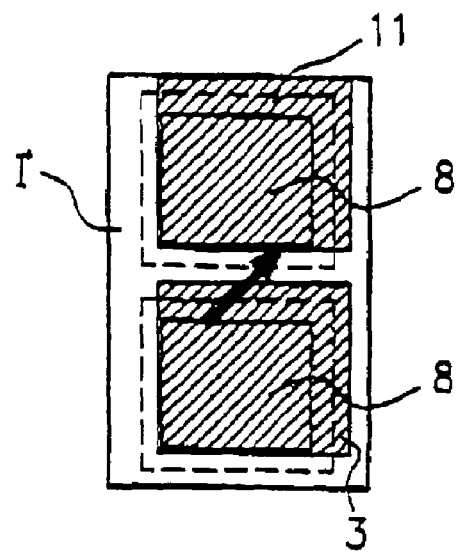

Hereinafter, a liquid crystal display device according to Example 6 of the present invention will be described with reference to the drawings. FIGS. 11A and 11B are enlarged plan views each showing a pixel electrode portion of the liquid crystal display device of Example 6.

In Example 6, as shown in FIG. 11A, a color filter region 11 of a high chromaticity-property color filter for use in the transmission-type liquid crystal display device is formed as well as a non-color filter region I is provided in each of the regions of the color filter substrate which correspond to the respective pixel electrodes 3. White display is provided by the non-color filter regions I, and is mixed with color display provided by the high chromaticity-property color filter regions 11, whereby a bright display, which is required in the reflective regions of the transmission/reflection-type liquid crystal display device, can be realized.

FIG. 11A shows the color filter region 11 on the color filter substrate and the pixel electrode 3 on the lower substrate in the case where the lower substrate and the color filter substrate are laminated to each other with the designed alignment accuracy.

FIG. 11B shows the color filter region 11 on the color filter substrate and the pixel electrode 3 on the lower substrate in the case where the lower substrate and the color filter substrate are laminated to each other with the color filter substrate being shifted with respect to the lower substrate in the direction shown by the arrow.

In the production process of the liquid crystal display device of Example 6, even when the lower substrate and the color filter substrate are misaligned with respect to each other as shown in FIG. 11B, the area S(I') of the resultant non-color filter region I' is equal to the area S(I) of the non-color filter region I of FIG. 11A, that is, S(I')=S(I). Therefore, chromaticity and brightness of the liquid crystal display device are not changed.

According to Example 6, the non-color filter regions are provided, and the color filter layer is patterned such that the area of the non-color filter in each pixel region is not changed even when the lower substrate and the non-color filter substrate are mis-aligned with respect to each other. Therefore, a liquid crystal display device in which chromaticity and brightness are not changed can be realized.

Hereinafter, the effects of variation in a finished pattern of the edge portion of the color filter 11 on optical characteristics will be described with reference to FIGS. 9A, 10A and 11A.

First, in FIG. 11A, the boundary between the color filter region 11 and the non-color filter region I (hereinafter, simply referred to as "boundary") is entirely present in the reflective region. In FIG. 9A, however, the boundary partially extends out of the reflective region, whereby the boundary which is present within the reflective region in FIG. 9A is shorter than that of FIG. 11A. In FIG. 10A, the boundary further extends out of the reflective region as compared to the case of FIG. 9A. Therefore, the boundary which is present within the reflective region in FIG. 10A is shorter than that of FIG. 9A.

When the finished pattern of the edge portion of the color filter 11 is varied, the boundary which is present within the reflective region affects the optical characteristics. Accordingly, in the case where the boundary partially extends out of the reflective region as shown in, for example, FIGS. 9A and 10A, the length of the boundary which is present within the reflective region is reduced, whereby the optical characteristics can be affected less by the variation in a finished pattern of the edge portion of the color filter region 11.

Moreover, a black mask having a line width larger than the variation in a finished pattern of the edge portion of the color filter region 11 may be formed at least on the boundary which is present within the reflective region. In this case, variation in display characteristics such as chromaticity property and contrast can be reduced, although the aperture ratio may be only somewhat reduced.

EXAMPLE 7

Figure 12A:
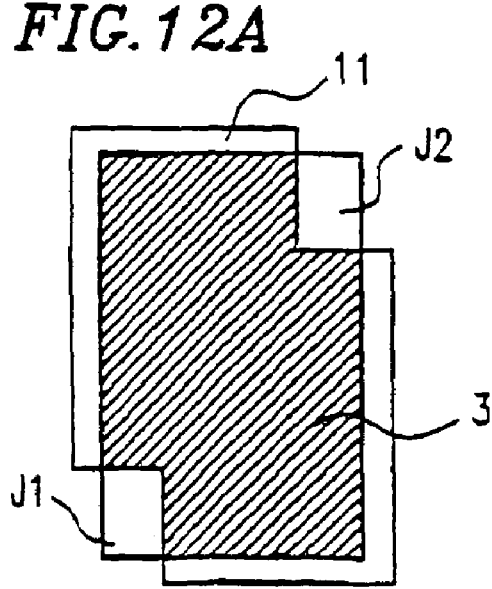
FIGS. 12A and 12B are enlarged plan views each showing a pixel electrode portion of a liquid crystal display device according to Example 7 of the present invention.
Figure 12B:
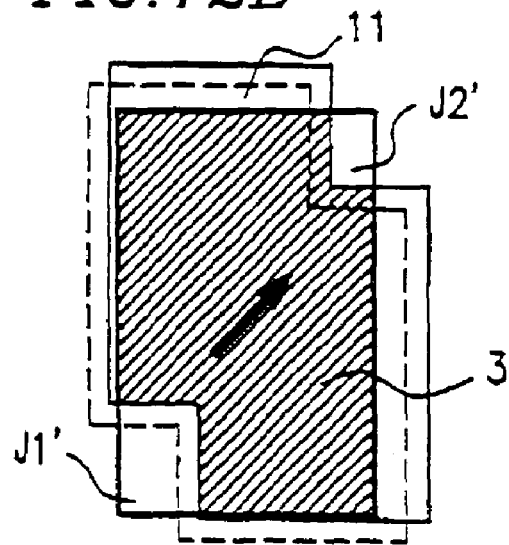

Hereinafter, a liquid crystal display device according to Example 7 of the present invention will be described with reference to the drawings. FIGS. 12A and 12B are enlarged plan views each showing a pixel electrode portion of the liquid crystal display device of Example 7.

In Example 7, as shown in FIG. 12A, a color filter region 11 of a high chromaticity-property color filter for use in the transmission-type liquid crystal display device is formed as well as non-color filter regions J1 and J2 are provided in each of the regions of the color filter substrate which correspond to the respective pixel electrodes 3. White display is provided by the non-color filter regions J1 and J2, and is mixed with color display provided by the high chromaticity-property color filter regions 11, whereby a bright display, which is required in the reflective regions of the reflection-type liquid crystal display device, can be realized.

FIG. 12A shows the color filter region 11 on the color filter substrate and the pixel electrode 3 on the lower substrate in the case where the lower substrate and the color filter substrate are laminated to each other with the designed alignment accuracy.

FIG. 12B shows the color filter region 11 on the color filter substrate and the pixel electrode 3 on the lower substrate in the case where the lower substrate and the color filter substrate are laminated to each other with the color filter substrate being shifted with respect to the lower substrate in the direction shown by the arrow.

In the production process of the liquid crystal display device of Example 7, when the lower substrate and the color filter substrate are mis-aligned with respect to each other as shown in FIG. 12B, the total area S(J') of the resultant non-color filter regions J1' and J2' becomes smaller than the total area S(J) of the non-color filter regions J1 and J2 of FIG. 12A, as follower $S(J')=J1'+J2'$ $S(J)=J1+J2$ $S(J')<S(J)$.

According to the liquid crystal display device of Example 7, the non-color filter regions are provided, and the color filter is patterned such that the total area of the non-color filter regions in each pixel region is changed when the lower substrate and the color filter substrate are mis-aligned with respect to each other. However, as compared to Comparative Example 1 in which a single non-color filter region which has the same area as the total area of the non-color filter regions in each pixel region of Example 7 is provided in each pixel region, the amount of change in the area in Example 7 is so small that the chromaticity and brightness of the liquid crystal display device are not changed.

Hereinafter, the effects of variation in a finished pattern of the edge portion of the color filter region 11 on optical characteristics will be described with reference to FIGS. 12A and 13A.

Figure 13A:
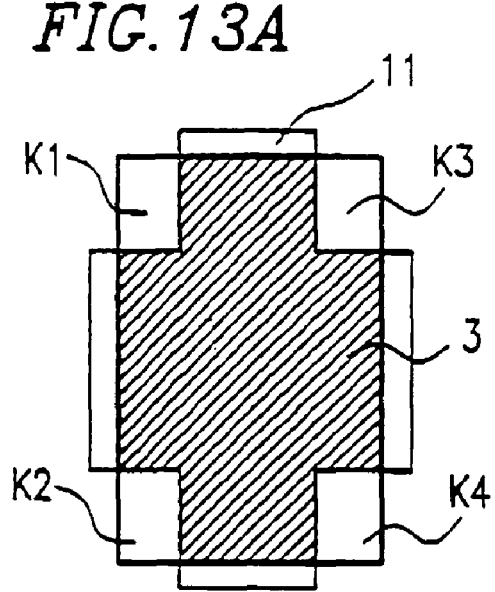
FIGS. 13A and 13B are enlarged plan views each showing a pixel electrode portion of a liquid crystal display device according to Example 8 of the present invention.

In the case where the total area of the non-color filter regions in each reflection region in FIG. 12A is the same as that of non-color filter regions in each reflection region in FIG. 13A, the boundary which is present within the reflection region in FIG. 12A is shorter than that in FIG. 13A. Accordingly, in FIG. 12A, optical characteristics can be affected less by the variation in a finished pattern of the edge portion of the color filter region 11.

Depending upon a type of color filter layer, optical characteristics may be affected more by the variation in the finished pattern of the edge portion of the color filter region 11 than by the alignment margin. In such a case, the pattern shown in FIG. 12A is preferred to that shown in FIG. 13A.

Moreover, a black mask having a line width larger than the variation in the finished pattern of the edge portion of the color filter region 11 may be formed at least on the boundary which is present within the reflective region. In this case, variation in display characteristics such as chromaticity property and contrast can be reduced, although the aperture ratio may be only somewhat reduced.

EXAMPLE 8

Figure 13B:
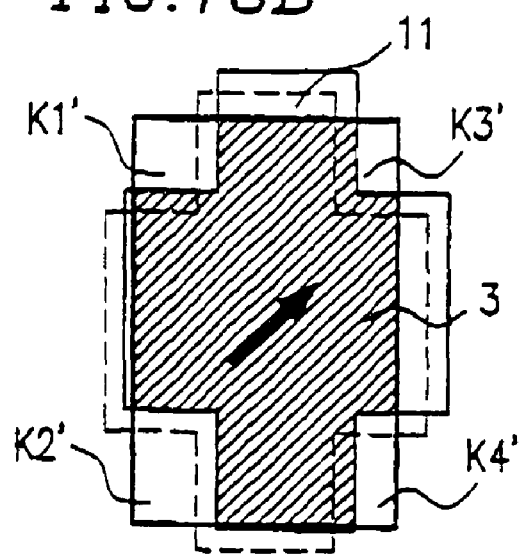

Hereinafter, a liquid crystal display device according to Example 8 of the present invention will be described with reference to the drawings. FIGS. 13A and 13B are enlarged plan views each showing a pixel electrode portion of the liquid crystal display device of Example 8.

In Example 8, as shown in FIG. 13A, a color filter region 11 of a high chromaticity-property color filter for use in the transmission-type liquid crystal display device is formed as well as non-color filter regions K1, K2, K3 and K4 are provided in each of the regions of a color filter substrate which correspond to the respective pixel electrodes 3. White display is provided by the non-color filter regions K1, K2, R3 and K4, and is mixed with color display provided by the high chromaticity-property color filter 11, whereby a bright display, which is required in the reflective regions of the reflection-type liquid crystal display device, can be realized.

FIG. 13A shows the color filter region 11 on the color filter substrate and the pixel electrode 3 on the lower substrate in the case where the lower substrate and the color filter substrate are laminated to each other with the designed alignment accuracy.

FIG. 13B shows the color filter region 11 on the color filter substrate and the pixel electrode 3 on the lower substrate in the case where the lower substrate and the color filter substrate are laminated to each other with the color filter substrate being shifted with respect to the lower substrate in the direction shown by the arrow.

In the production process of the liquid crystal display device of Example 8, even when the lower substrate and the color filter substrate are misaligned as shown in FIG. 13B, the total area S(K') of the resultant non-color filter regions K1', K2', K3' and K4' is equal to the total area S(K) of the non-color filter regions K1, K2, K3 and K4 of FIG. 13A, as follows:

$S(K')=K1'+K2'+K3'+K4'$ $S(K)=K1+K2+K3+K4$ $S(K')=S(K)$.

Therefore, chromaticity and brightness of the liquid crystal display device are not changed.

According to Example 8, the color filter layer is patterned such that the total area of the non-color filter regions in each pixel region is not changed even when the lower substrate and the non-color filter substrate are mis-aligned with respect to each other. Therefore, a liquid crystal display device in which the chromaticity and brightness are not changed can be realized.

EXAMPLE 9

Figure 14A:
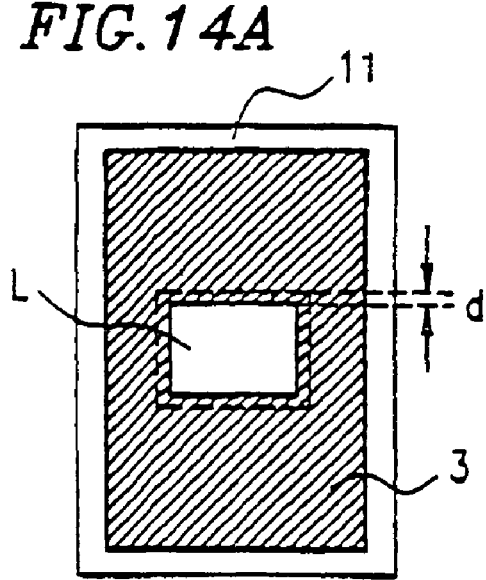
FIGS. 14A and 14B are enlarged plan views each showing a pixel electrode portion of a liquid crystal display device according to Example 9 of the present invention.
Figure 14B:
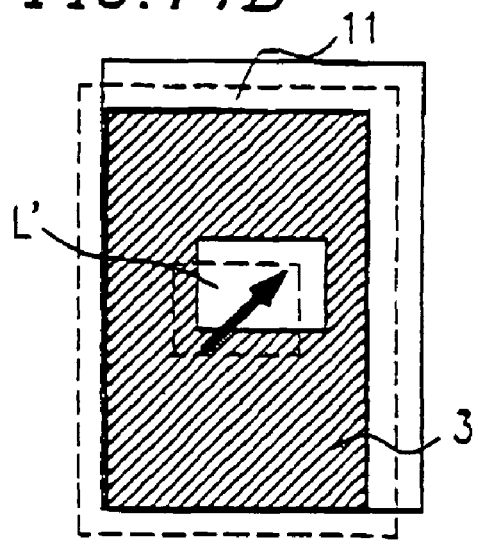

Hereinafter, a liquid crystal display device according to Example 9 of the present invention will be described with reference to the drawings. FIGS. 14A and 14B are enlarged plan views each showing a pixel electrode portion of the liquid crystal display device of Example 9.

In Example 9, as shown in FIG. 14A, a color filter region 11 of a high chromaticity-property color filter for use in the transmission-type liquid crystal display device is formed as well as a non-color filter region L is provided in each of the regions of the color filter substrate which correspond to the respective pixel electrodes 3. White display is provided by the non-color filter regions L, and is mixed with color display provided by the high chromaticity-property color filter regions 11, whereby a bright display, which is required in the reflective regions of the reflection-type liquid crystal display device, can be realized.

FIG. 14A shows the color filter region 11 on the color filter substrate and the pixel electrode 3 on the lower substrate in the case where the lower substrate and the color filter substrate are laminated to each other with the designed alignment accuracy.

FIG. 14B shows the color filter region 11 on the color filter substrate and the pixel electrode 3 on the lower substrate in the case where the lower substrate and the color filter substrate are laminated to each other with the color filter substrate being shifted with respect to the lower substrate in the direction shown by the arrow.

In the production process of the liquid crystal display device of Example 9, even when the lower substrate and the color filter substrate are mis-aligned with respect to each other as shown in FIG. 14B, the area S(L') of the resultant non-color filter region L' is equal to the area S(L) of the non-color filter region L of FIG. 14A, that is, S(L')=S(L). Therefore, chromaticity and brightness of the liquid crystal display device are not changed.

According to Example 9, the non-color filter regions are provided, and the color filter layer is patterned such that the area of the non-color filter in each pixel region is not changed even when the lower substrate and the non-color filter substrate are mis-aligned with respect to each other. Therefore, a liquid crystal display device in which the chromaticity and brightness are not changed can be realized.

EXAMPLE 10

Hereinafter, a liquid crystal display device according to Example 10 of the present invention will be described with reference to the drawings. FIGS. 15A and 15B are enlarged plan views each showing a pixel electrode portion of the liquid crystal display device of Example 10.

In Example 10, as shown in FIG. 15A, a color filter region 11 of a high chromaticity-property color filter for use in the transmission-type liquid crystal display device is formed as well as a non-color filter region M is provided in each of the regions of the color filter substrate which correspond to the respective pixel electrodes 3. White display is provided by the non-color filter regions M, and is mixed with color display provided by the high chromaticity-property color regions 11, whereby a bright display, which is required in the reflective regions of the transmission/reflection-type liquid crystal display device, can be realized.

FIG. 15A shows the color filter region 11 on the color filter substrate and the pixel electrode 3 on the lower substrate in the case where the lower substrate and the color filter substrate are laminated to each other with the designed alignment accuracy.

FIG. 15B shows the color filter region 11 on the color filter substrate and the pixel electrode 3 on the lower substrate in the case where the lower substrate and the color filter substrate are laminated to each other with the color filter substrate being shifted with respect to the lower substrate in the direction shown by the arrow.

In the production process of the liquid crystal display device of Example 10, even when the lower substrate and the color filter substrate are mis-aligned with respect to each other as shown in FIG. 15B, the area S(M') of the resultant non-color filter region M' is equal to the area S(M) of the non-color filter region M of FIG. 15A, that is, S(M')=S(M). Therefore, chromaticity and brightness of the liquid crystal display device are not changed.

According to Example 10, the non-color filter regions are provided, and the color filter layer is patterned such that the area of the non-color filter in each pixel region is not changed even when the lower substrate and the non-color filter substrate are mis-aligned with respect to each other. Therefore, a liquid crystal display device in which the chromaticity and brightness are not changed can be realized.

Hereinafter, the effects of variation in a finished pattern of the edge portion of the color filter region 11 on optical characteristics will be described with reference to FIGS. 14A and 15A.

First, the non-color filter region L corresponding to the pixel electrode 3 of FIG. 14A has a rectangular shape of sides x and y, whereas the non-color filter region M corresponding to the pixel electrode 3 of FIG. 15A has a circular shape of radius r. It is now assumed that the area of the non-color filter region L is equal to that of the non-color filter region M, and that a finished pattern of the edge portion of each of the color filter regions 11 is varied by d from the above-mentioned respective set value (i.e., x, y and r) due to the exposure step for producing each of the color layers, as shown in FIGS. 14A and 15A.

At this time, the difference $\Delta L$ in area in the case of FIG. 14A can be given by the following equation:

$$\Delta L=(x+2d)(y+2d)-xy=2d(x+y)+4d^2.$$

Since the minimum value $\Delta L$ is obtained when x=y.

$$\Delta L=4dx+4d^2.$$

Since the area of the non-color filter region L is equal to that of the non-color filter region M, the following equations can be obtained:

$$xy=x^2=\pi r^2$$

$$x=(\sqrt{\pi})r.$$

Therefore, the following equation can be obtained:

$$\Delta L=4(\sqrt{\pi})rd+4d^2.$$

Moreover, the difference $\Delta M$ in area in the case of FIG. 15A can be given by the following equation:

$$\Delta M=\pi(r+d)^2-\pi r^2=2\pi rd+\pi d^2.$$

Therefore, the following relation can be obtained:

$$\Delta L>\Delta M.$$

Thus, in the case where the area of the non-color filter region L is equal to that of the non-color filter region M, the circumference (i.e., the above-mentioned boundary) of the circular pattern as shown in FIG. 15A is shorter than that of the rectangular pattern as shown in FIG. 14A. Therefore, in the case of FIG. 15A, the optical characteristics can be affected less by the variation in a finished pattern of the edge portion of the color filter 11, as compared to the case of FIG. 14A.

Moreover, a black mask having a line width larger than the variation in a finished pattern of the edge portion of the color filter region 11 may be formed at least on the boundary which is present within the reflective region. In this case, variation in display characteristics such as chromaticity property and contrast can be reduced, although the aperture ratio may be only somewhat reduced.

EXAMPLE 11

Figure 16A:
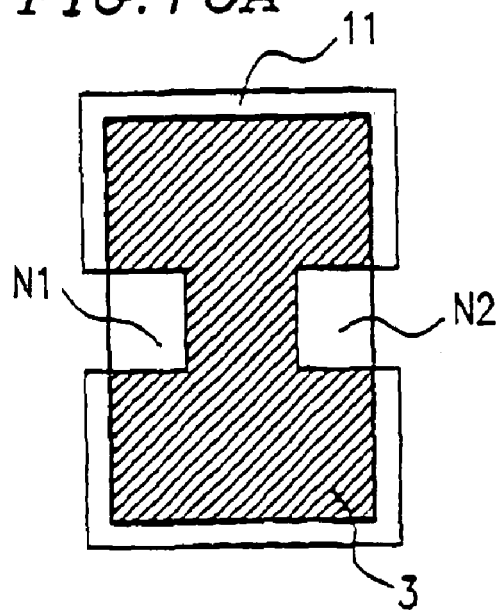
FIGS. 16A and 16B are enlarged plan views each showing a pixel electrode portion of a liquid crystal display device according to Example 11 of the present invention.
Figure 16B:
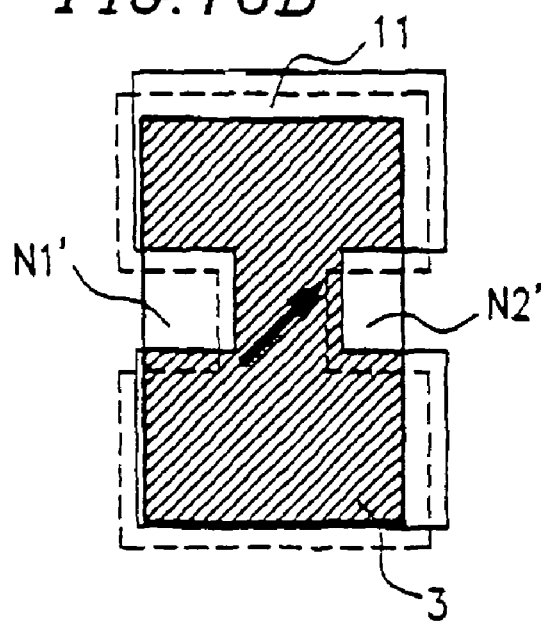

Hereinafter, a liquid crystal display device according to Example 11 of the present invention will be described with reference to the drawings. FIGS. 16A and 16B are enlarged plan views each showing a pixel electrode portion of the liquid crystal display device of Example 11, and FIG. 16C is a plan view showing the entire pattern of a color filter layer of the liquid crystal display device of Example 11.

In Example 11, as shown in FIG. 16A, a color filter region 11 of a high chromaticity-property color filter layer for use in the transmission-type liquid crystal display device is formed as well as non-color filter regions N1 and N2 are provided in each of the regions of the color filter substrate which correspond to the respective reflective pixel electrodes 3. White display is provided by the non-color filter regions N1 and N2, and is mixed with color display provided by the high chromaticity-property color filter regions 11, whereby a bright display, which is required in the reflective regions of the reflection-type liquid crystal display device, can be realized.

Figure 16C:
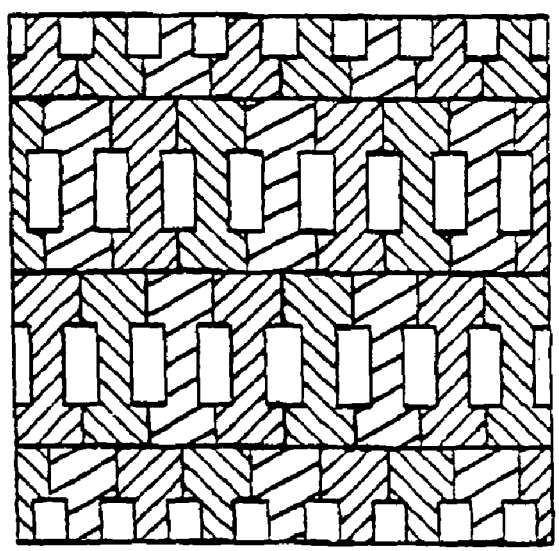
FIG. 16C is a plan view showing the entire pattern of a color filter of the liquid crystal display device of Example 11.

It should be noted that, in the liquid crystal display device of Example 11, the R, G and B color filter regions 11 as shown in FIG. 16A are provided in a delta arrangement as shown in FIG. 16C for color display.

FIG. 16A shows the color filter region 11 on the color filter substrate and the pixel electrode 3 on the lower substrate in the case where the lower substrate and the color filter substrate are laminated to each other with the designed alignment accuracy.

FIG. 16B shows the color filter region 11 on the color filter substrate and the pixel electrode 3 on the lower substrate in the case where the lower substrate and the color filter substrate are laminated to each other with the color filter substrate being shifted with respect to the lower substrate in the direction shown by the arrow.

In the production process of the liquid crystal display device of Example 11, even when the lower substrate and the color filter substrate are mis-aligned with respect to each other as shown in FIG. 16B, the total area $S(N')$ of the resultant non-color filter regions $N1'$ and $N2'$ is equal to the total area $S(N)$ of the non-color filter regions N1 and N2 of FIG. 16A, as follows:

$$S(N')=N1'+N2'$$

$$S(N)=N1+N2$$

$$S(N')=S(N).$$

Therefore, chromaticity and brightness of the liquid crystal display device are not changed.

Thus, according to Example 11, the non-color filter regions are provided, and the color filter layer is patterned such that the total area of the non-color filter regions in each pixel region is not changed even when the lower substrate and the non-color filter substrate are mis-aligned with respect to each other. Therefore, a liquid crystal display device in which the chromaticity and brightness are not changed can be realized.

EXAMPLE 12

Hereinafter, a liquid crystal display device according to Example 12 of the present invention will be described with reference to the drawings. FIGS. 17A and 17B are enlarged plan views each showing a pixel electrode portion of the liquid crystal display device of Example 12.

In Example 12, as shown in FIG. 17A, a color filter region 11 of a high chromaticity-property color filter layer for use in the transmission-type liquid crystal display device is formed as well as non-color filter regions O1 and O2 are provided in each of the regions of the color filter substrate which correspond to the respective pixel electrodes 3. White display is provided by the non-color filter regions O1 and O2, and is mixed with color display provided by the high chromaticity-property color filter regions 11, whereby a bright display, which is required in the reflective regions of the reflection-type liquid crystal display device, can be realized.

FIG. 17A shows the color filter region 11 on the color filter substrate and the pixel electrode 3 on the lower substrate in the case where the lower substrate and the color filter substrate are laminated to each other with the designed alignment accuracy.

FIG. 17B shows the color filter region 11 on the color filter substrate and the pixel electrode 3 on the lower substrate in the case where the lower substrate and the color filter substrate are laminated to each other with the color filter substrate being shifted with respect to the lower substrate in the direction shown by the arrow.

In the production process of the liquid crystal display device of Example 12, even when the lower substrate and the color filter substrate are mis-aligned with respect to each other as shown in FIG. 17B, the total area $S(O')$ of the resultant non-color filter region $O1'$ and $O2'$ is equal to the total area $S(O)$ of the non-color filter region O1 and O2 of FIG. 17A, as follows:

$$S(O')=O1'+O2'$$

$$S(O)=O1+O2$$

$$S(O')=S(O).$$

Therefore, chromaticity and brightness of the liquid crystal display device are not changed.

Thus, according to Example 12, the non-color filter regions are provided, and the color filter layer is patterned such that the total area of the non-color filter regions in each pixel region is not changed even when the lower substrate and the non-color filter substrate are mis-aligned with respect to each other. Therefore, a liquid crystal display device in which the chromaticity and brightness are not changed can be realized.

In such a case, however, the color filter region 11 must be designed so as to have a rectangular pattern as shown in FIG. 16A rather than the curved pattern as shown in FIG. 17A within the alignment margin in the horizontal direction.

EXAMPLE 13

Hereinafter, a liquid crystal display device according to Example 13 of the present invention will be described with reference to the drawings. FIGS. 18A to 18D are enlarged plan views each showing a pixel electrode portion of the liquid crystal display device of Example 13.

Figure 18A:
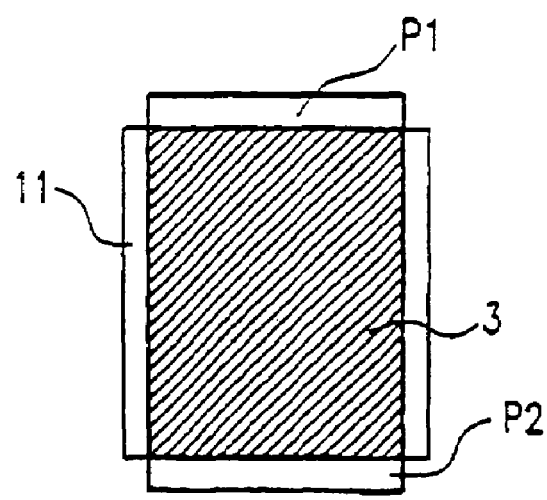
FIGS. 18A to 18D are enlarged plan views each showing a pixel electrode portion of a liquid crystal display device according to Example 13 of the present invention.

In Example 13, as shown in FIG. 18A, a color filter region 11 of a high chromaticity-property color filter for use in the transmission-type liquid crystal display device is formed as well as non-color filter regions P1 and P2 are provided in each of the regions of the color filter substrate which correspond to the respective pixel electrodes 3. White display is provided by the non-color filter regions P1 and P2, and is mixed with color display provided by the high chromaticity-property color filter region 11, whereby a bright display, which is required in the reflective regions of the reflection-type liquid crystal display device, can be realized.

FIG. 18A shows the color filter region 11 on the color filter substrate and the pixel electrode region on the lower substrate in the case where the lower substrate and the color filter substrate are laminated to each other with the designed alignment accuracy.

Figure 18B:
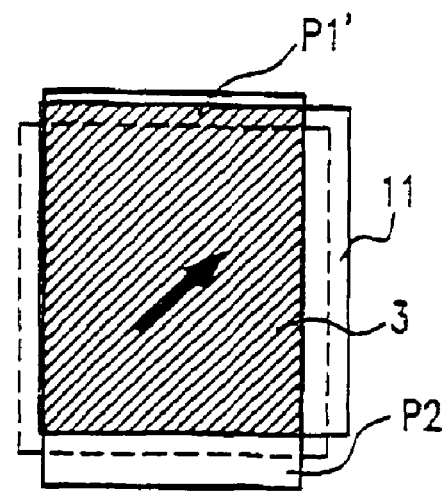

FIG. 18B shows the color filter region 11 on the color filter substrate and the pixel electrode 3 on the lower substrate in the case where the lower substrate and the color filter substrate are laminated to each other with the color filter substrate being shifted with respect to the lower substrate in the direction shown by the arrow.

In the production process of the liquid crystal display device of Example 13, even when the lower substrate and the color filter substrate are mis-aligned with respect to each other as shown in FIG. 18B, the total area S(P') of the resultant non-color filter regions P1' and P2' is equal to the total area S(P) of the non-color filter regions P1 and P2 of FIG. 18A, as follows:

$$S(P')=P1'+P2'$$

$$S(P)=P1+P2$$

$$S(P')=S(P).$$

Therefore, chromaticity and brightness of the liquid crystal display device are not changed.

According to Example 13, the non-color filter regions are provided, and the color filter layer is patterned such that the total area of the non-color filter regions is not changed even when the lower substrate and the non-color filter substrate are mis-aligned with respect to each other. Therefore, a liquid crystal display device in which the chromaticity and brightness are not changed can be realized.

Hereinafter, the effects of variation in a finished pattern of the edge portion of the color filter region 11 on optical characteristics will be described with reference to FIGS. 18C and 18D.

Figure 18C:
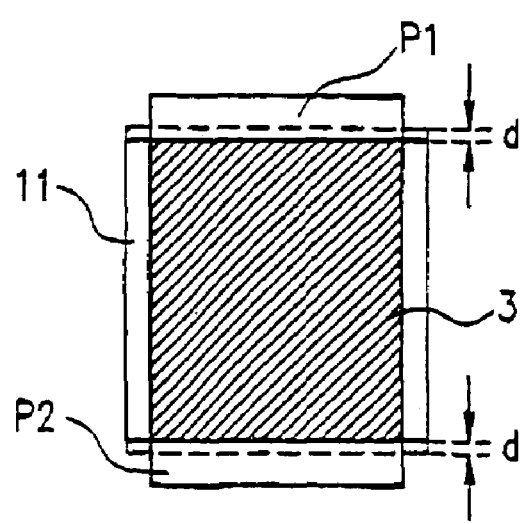
Figure 18D:
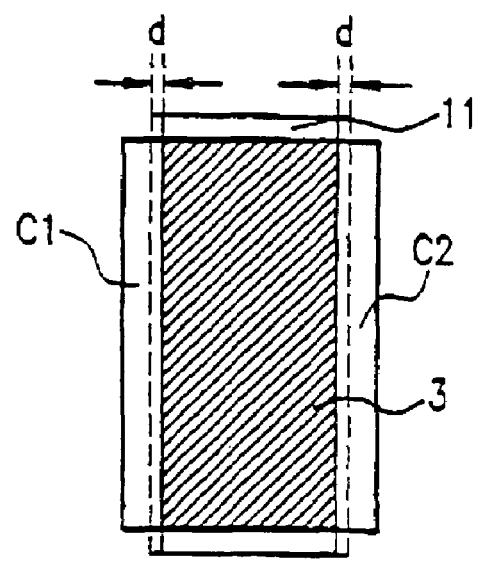

First, the non-color filter region (P1+P2) in the pixel region of FIG. 18A has an area which is equal to the total area of two rectangles each having sides x and y (where y corresponds to the shorter side of the pixel), whereas a non-color filter region (C1+C2) in the pixel region of FIG. 18D has an area which is equal to the total area of two rectangles each having sides x' and y' (where x' corresponds to the longer side of the pixel). It is now assumed that a finished pattern of the edge portion of each of the color filter regions 11 of FIGS. 18C and 18D is varied by d from the above-mentioned respective set value (i.e., x, y, x' and y') due to the exposure step for producing each of the color layers, as shown in FIGS. 18C and 18D.

At this time, the difference ΔP in area in the case of FIG. 18C can be given by the following expression:

$$\Delta P=2(x+d)y-2xy=2dy.$$

Moreover, the difference ΔC in area in the case of FIG. 18D can be given by the following expression:

$$\Delta C=2x'(y'+d)-2x'y'=2dx', \text{ where } y<x'.$$

Therefore, the following relation can be obtained:

$$\Delta C>\Delta P.$$

Thus, when each pixel electrode has a rectangular shape, the optical characteristics can be affected less by the variation in a finished pattern of the edge portion of the color filter region 11 in the case where a non-color filter region is formed in a corresponding reflective region such that at least one side of the non-color filter region has a side which is equal to the shorter side of the pixel electrode.

Moreover, a black mask having a line width larger than the variation in a finished pattern of the edge portion of the color filter region 11 may be formed at least on the boundary which is present within the reflective region. In this case, variation in display characteristics such as chromaticity property and contrast can be reduced, although the aperture ratio may be only somewhat reduced.

EXAMPLE 14

Figure 19A:
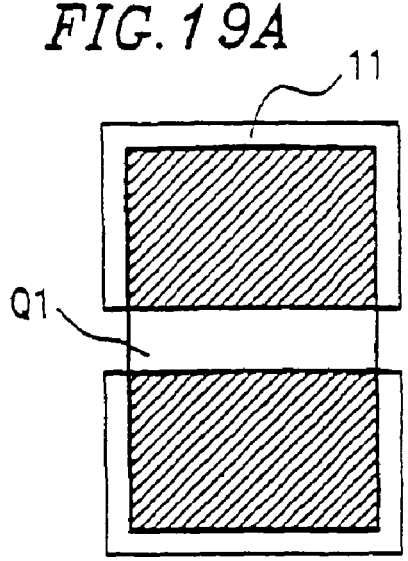
FIGS. 19A to 19C are enlarged plan views each showing a pixel electrode portion of a liquid crystal display device according to Example 14 of the present invention.
Figure 19B:
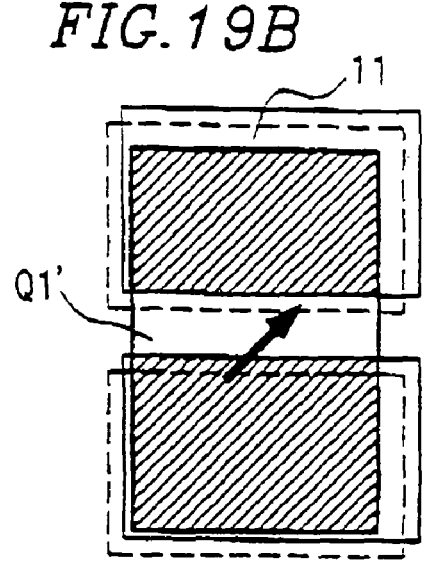
Figure 19C:
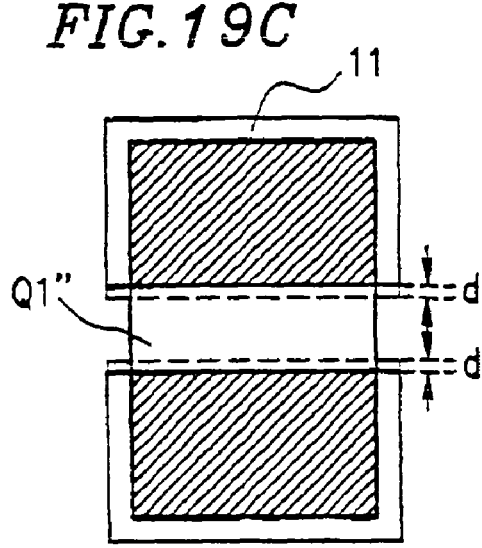
Figure 19D:
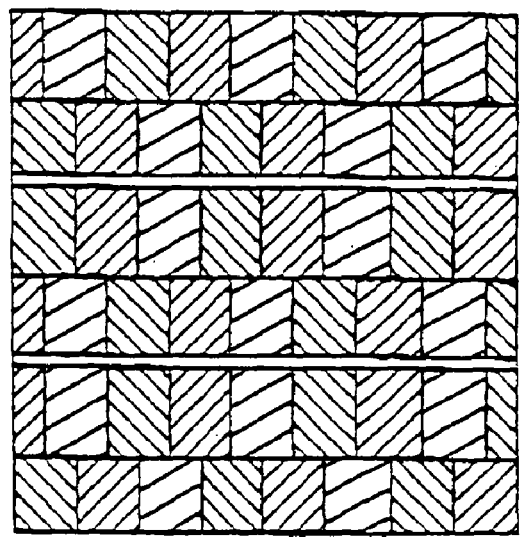
FIG. 19D is a plan view showing the entire pattern of a color filter of the liquid crystal display device of Example 14.

Hereinafter, a liquid crystal display device according to Example 14 of the present invention will be described with reference to the drawings. FIGS. 19A to 19C are enlarged plan views each showing a pixel electrode portion of the liquid crystal display device of Example 14, and FIG. 19D is a plan view showing the entire pattern of a color filter in the liquid crystal display device of Example 14.

In Example 14, as shown in FIG. 19A, a color filter region 11 of a high chromaticity-property color filter layer for use in the transmission-type liquid crystal display device is formed as well as a non-color filter region Q is provided in each of the regions corresponding to the respective pixel electrodes 3 on the color filter substrate. White display is provided by the non-color filter regions Q, and is mixed with color display provided by the high chromaticity-property color filter regions 11, whereby a bright display, which is required in the reflective regions of the reflection-type liquid crystal display device, can be realized.

It should be noted that, in the liquid crystal display device of Example 14, the R, G and B color filter regions 11 as shown in FIG. 19A are provided in a delta arrangement as shown in FIG. 19C for color display.

FIG. 19A shows the color filter region 11 on the color filter substrate and the pixel electrode 3 on the lower substrate in the case where the lower substrate and the color filter substrate are laminated to each other with the designed alignment accuracy.

FIG. 19B shows the color filter region 11 on the color filter substrate and the pixel electrode 3 on the lower substrate in the case where the lower substrate and the color filter substrate are laminated to each other with the color filter substrate being shifted with respect to the lower substrate in the direction shown by the arrow.

In the production process of the liquid crystal display device of Example 14, even when the lower substrate and the color filter substrate are mis-aligned with respect to each other as shown in FIG. 19B, the area S(Q') of the resulting non-color filter region Q' is equal to the area S(Q) of the non-color filter region Q of FIG. 19A, that is, S(Q')=S(Q). Therefore, chromaticity and brightness of the liquid crystal display device are not changed.

According to Example 14, the non-color filter regions are provided, and the color filter layer is patterned such that the area of the non-color filter in each pixel is not changed even when the lower substrate and the non-color filter substrate are mis-aligned with respect to each other. Therefore, a liquid crystal display device in which the chromaticity and brightness are not changed can be realized.

Hereinafter, the effects of variation in a finished pattern of the edge portion of the color filter 11 on optical characteristics will be described with reference to FIG. 19C.

In FIG. 19A, the color portion of the color filter region 11 shown in FIG. 18A is divided into two portions in the vertical direction, and a non-color filter portion having an area equal to the total area of the non-color filter regions P1 and P2 is provided between the two portions (i.e., in the center of the pixel electrode). In this case, the optical characteristics can be affected less by the variation in a finished pattern of the edge portion of the color filter 11, than in the case of FIG. 9A wherein the color portion of the color filter region 11 shown in FIG. 18D is divided into two portions in the vertical direction, and a non-color filter portion having a length equal to the overall width of the non-color filter regions C1 and C2 is provided between the two portions (i.e., in the center of the pixel region).

Moreover, a black mask having a line width larger than the variation in a finished pattern of the edge portion of the color filter region 11 may be formed at least on the boundary which is present within the reflective region. In this case, variation in display characteristics such as chromaticity property and contrast can be reduced, although the aperture ratio may be only somewhat reduced.

The liquid crystal display device according to the present invention is characterized by the patterns of the color filter layer as described in the above examples. However, the color filter layer may have another pattern within the scope of the present invention. In other words, the color filter layer may have any pattern as long as the total area of the non-color filter region(s) in each pixel region is not changed even when the pixel electrode regions and the color filter regions of the liquid crystal display device are mis-aligned with respect to each other.

Embodiment 2

In order to describe Embodiment 2 of the present invention, the principle of providing color display in the liquid crystal display according to the present invention will now be described quantitatively.

Normally, color can be represented by the following three variables x, y and Y in the XYZ color system:

$$x=X/(X+Y+Z); y=Y/(X+Y+Z) \quad (1)$$

$$Y=\int E(\lambda)y(\lambda)d\lambda \quad (2)$$

where x and y are variables representing hue and color saturation, X, Y and Z are stimulus values for a virtual color, E ($\lambda$) is an optical energy (i.e., spectrum) at wavelength $\lambda$, and y ($\lambda$) is human eye's spectral sensitivity to color Y. As given by Expression (2), Y is a function of E ($\lambda$) and y ($\lambda$), representing the brightness sensed by the human eyes. In fact, a comparative value of a reference light source is required, the following expression is used:

$$Y=k\int S(\lambda)\rho(\lambda)y(\lambda)d\lambda$$

$$k=100/\int S(\lambda)y(\lambda)d\lambda \quad (3)$$

where S ($\lambda$) is a spectrum of the reference light source, and $\rho(\lambda)$ is a spectral reflectance or spectral transmittance.

In order to display various colors in a liquid crystal display device, an additive color mixing method is used. More specifically, a color filter including three color layers: R, G and B layers are generally provided on a single substrate such that the respective color layers are arranged in a prescribed manner, and quantities of light transmitted through the respective color layers are controlled by controlling a voltage applied to the liquid crystal layer.

Table 1 shows reflection characteristics of a color filter for use in a reflection-type liquid crystal display device, Table 2 shows transmission characteristics of a color filter for use in a transmission-type liquid crystal display device, and Table 3 shows reflection characteristics of the color filter for use in the transmission-type liquid crystal display device.

TABLE 1

Reflection-type Color Filter
(Reflection Characteristics)

|  | x | y | Y |
|---|---|---|---|
| red (R) | 0.452 | 0.303 | 41.0 |
| green (G) | 0.304 | 0.432 | 73.8 |
| blue (B) | 0.169 | 0.236 | 35.4 |
| white (W) | 0.304 | 0.329 | 50.0 |

TABLE 2

Transmission-type Color Filter
(Transmission Characteristics)

|  | x | y | Y |
|---|---|---|---|
| red (R) | 0.591 | 0.343 | 20.5 |
| green (G) | 0.305 | 0.543 | 50.7 |
| blue (B) | 0.136 | 0.164 | 16.4 |
| white (W) | 0.306 | 0.346 | 29.2 |

TABLE 3

Transmission-type Color Filter
(Reflection Characteristics)

|  | x | y | Y |
|---|---|---|---|
| red (R) | 0.674 | 0.321 | 11.8 |
| green (G) | 0.296 | 0.637 | 31.3 |
| blue (B) | 0.129 | 0.120 | 7.4 |
| white (W) | 0.321 | 0.343 | 16.8 |

Figure 24:
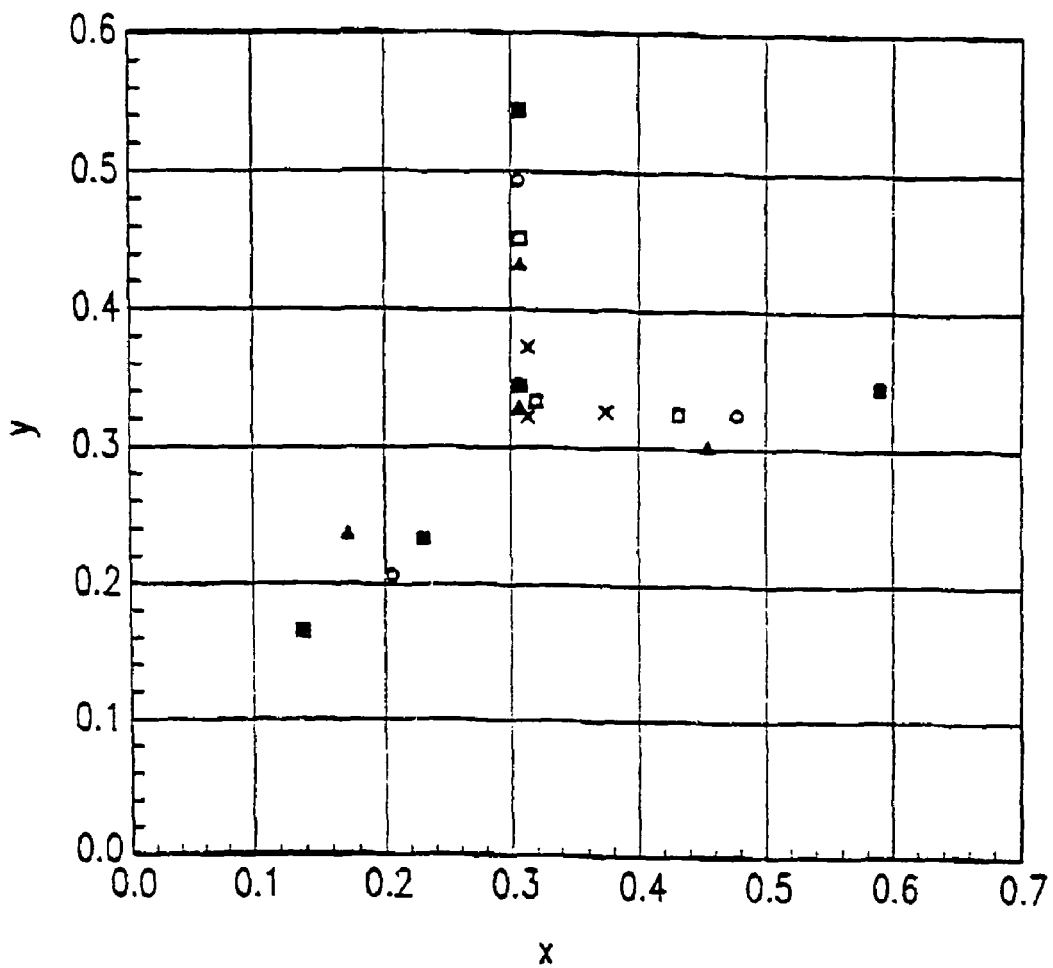
FIG. 24 is a plot (chromaticity diagram) of values x and y of respective color filter layers of a transmission/reflection-type liquid crystal display device, a transmission-type liquid crystal display device and a reflection-type liquid crystal display device.

FIG. 24 is a plot of values x and y in Tables 1 to 3 (hereinafter, this plot is referred to as "chromaticity diagram"). It should be noted that, in each case, the light source used was D65 (a light source for measuring an object illuminated with daylight: color temperature: 6774 K). The transmission characteristics are the spectral transmittance of the respective color filters with respect to the air, whereas the reflection characteristics were calculated by substituting the square of transmittance at each wavelength for $\rho(\lambda)$ of Expression (3).

In the case of a color filter for use in a transmission-type liquid crystal display device, white (W) display is obtained by equally mixing R, G and B light components, thereby achieving a transmittance of about 30%. However, in the case where such a color filter for use in the transmission-type liquid crystal display device is used in a transmission/reflection-type liquid crystal display device, brightness of only about 16% can be obtained in the white display of the reflective regions, resulting in very dark display. This is because light passes through the color filter layer in the reflective regions twice.

In view of this, in a color filter which is used in the reflection-type liquid crystal display device, the thickness of the color filter or the amount of pigment dispersed in a resin is reduced, or a pigment which is suitable for the reflection-type liquid crystal display device is used, whereby brightness of about 50% is obtained.

However, as can be seen from FIG. 24, the respective x-y plot of R, G and B is located near the white point, indicating poor chromaticity property. This results from the fact that light absorption by the pigment must be reduced in order to obtain excellent brightness in the color filter for use in the reflection-type liquid crystal device. Moreover, when such a color filter is used in the transmission/reflection-type liquid crystal display device, chromaticity property in the transmissive electrode regions is further reduced as compared to that in the reflective electrode regions.

Accordingly, in order to realize bright, high chromaticity-property display both in the reflective and transmissive regions of the transmission/reflection-type liquid crystal display device, it is necessary to provide, in each pixel region, a color filter region having characteristics suitable for the reflective and transmissive regions.

Hereinafter, Embodiment 2 of the present invention will be described with reference to the drawings.

Figure 20:
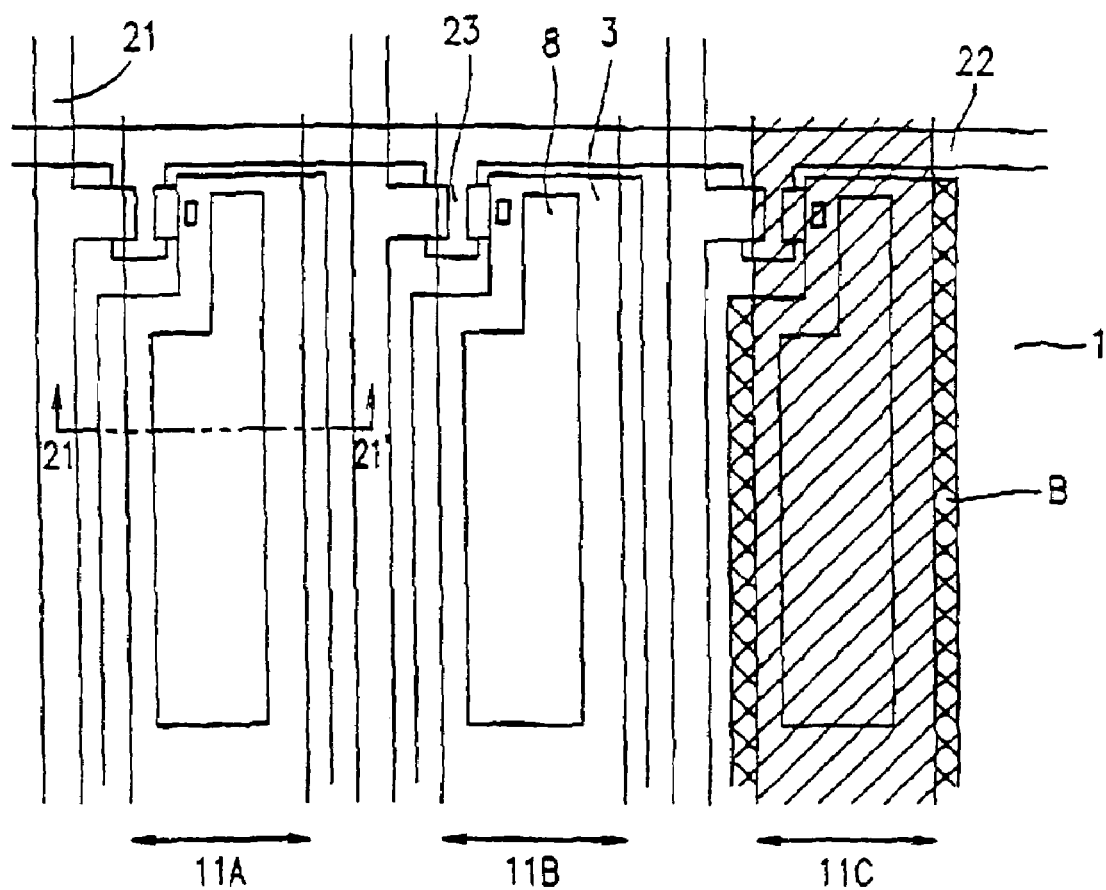
FIG. 20 is a plan view showing a transmission/reflection-type liquid crystal display device according to Example 15 of the present invention.
Figure 21:
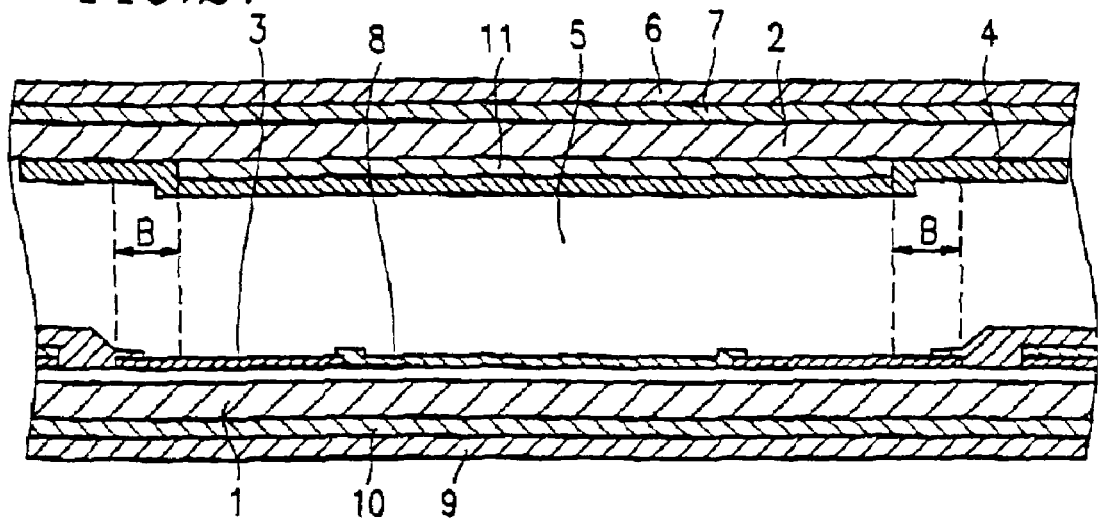
FIG. 21 is a cross sectional view taken along line 21-21' of FIG. 20.

FIG. 20 is a plan view showing a transmission/reflection-type liquid crystal display device according to the present invention, and FIG. 21 is a cross sectional view taken along line 21-21' of FIG. 20. A display mode of the transmission/reflection-type liquid crystal display device of the present invention will now be described with reference to FIGS. 20 and 21.

As shown in FIGS. 20 and 21, a reflective electrode (reflective electrode region) 3 and a transparent electrode (transparent electrode region) 8 each having a prescribed shape are formed on a lower substrate 1. The reflective electrode 3 and the transparent electrode 8 function as a pixel electrode. A color filter layer 11 and a transparent electrode (counter electrode) 4 are formed on a color filter substrate 2 which faces the lower substrate 1.

A liquid crystal layer 5 of a liquid crystal material exhibiting negative dielectric anisotropy is interposed between the transparent electrode 4 and the reflective electrode 3 and transparent electrode 8, wherein liquid crystal molecules of the liquid crystal layer is aligned vertically to the substrate.

A quarter-wave plate 10 is provided between the outer surface of the lower substrate 1 and a polarizing plate 9. Similarly, a quarter-wave plate 7 is provided between the outer surface of the color filter substrate 2 and a polarizing plate 6.

Hereinafter, a reflective region of the liquid crystal display device will be described.

First, incident light on the liquid crystal display device is linearly polarized in the polarizing plate 6. Then, the linearly polarized light is incident on the quarter-wave plate 7 such that an angle between its polarization axis and a slower optic axis of the quarter-wave plate 7 is 45°. The linearly polarized light is circularly polarized in the quarter-wave plate 7, thereby passing through the color filter layer 11.

It is now assumed that an electric field is not generated in the liquid crystal layer 5 which is located between the transparent electrode 4, and the reflective electrode 3 and transparent electrode 8. Since the liquid crystal material has negative dielectric anisotropy, liquid crystal molecules of the liquid crystal layer 5 are aligned substantially perpendicularly to the substrate. Therefore, the liquid crystal layer 5 has only a slight birefringence along the normal of the substrate, whereby a phase difference caused by the liquid crystal layer 5 is substantially zero.

In the case where an electric field is not generated in the liquid crystal layer 5, which is located between the transparent electrode 4 and the reflective electrode 3 and transparent electrode 8, the circularly polarized light passes through the liquid crystal layer 5 without being subjected to any polarization. Then, the circularly polarized light is reflected by the reflective electrode 3 on the lower substrate 1 toward the color filter substrate 2, thereby again entering the quarter-wave plate 7.

Thereafter, the circularly-polarized light passes through the quarter-wave plate 7, thereby entering the polarizing plate 6 as linearly polarized light. This linearly polarized light has a polarization axis which is perpendicular to the polarization axis of the above-mentioned linearly polarized light. At this time, the linearly polarized light having passed through the quarter-wave plate 7 enters the polarizing plate 6 perpendicularly to the transmission axis of the polarizing plate 6. Therefore, the light is absorbed by the polarizing plate 6 and is not transmitted therethrough.

Thus, a black display is obtained when an electric field is not generated in the liquid crystal layer 5 which is located between the transparent electrode 4 and the reflective electrode 3 and transparent electrode 8.

When a voltage is applied to the liquid crystal layer 5 which is located between the transparent electrode 4 and the reflective electrode 3 and transparent electrode 8, the liquid crystal molecules which have been aligned perpendicularly to the substrate are oriented horizontally to the substrate. Therefore, the circularly polarized light incident on the liquid crystal layer 5 is elliptically polarized due to the birefringence of the liquid crystal layer 5. The elliptically polarized light is reflected by the reflective electrode 3, and is again subjected to the birefringence of the liquid crystal layer 5. The resultant light is not rendered linearly polarized light which is perpendicular to the transmission axis of the polarizing plate 6, even after passing through the quarter-wave plate 7. Therefore, the light goes out of the liquid crystal display device through the polarizing plate 6.

By adjusting the voltage applied to the liquid crystal layer 5 which is located between the transparent electrode 4 and the reflective electrode 3 and transparent electrode 8, the quantity of light to be transmitted through the polarizing plate 6 after being reflected from the reflective electrode 3 can be adjusted, whereby a gray-level display can be achieved.

A transparent region of the liquid crystal display device will now be described.

The polarizing plates 6 and 9 of FIG. 21 are located such that the respective transmission axes are in parallel to each other. First, emitted light from the light source is linearly polarized in the polarizing plate 9. Thereafter, the linearly polarized light is incident on the quarter-wave plate 10 such that an angle between its polarization axis and a slower optic axis of the quarter-wave plate 10 is 45°, and is circularly polarized in the quarter-wave plate 10.

It is now assumed that an electric field is not generated in the liquid crystal layer 5 which is located between the transparent electrode 4, and the reflective electrode 3 and transparent electrode 8. Since the liquid crystal material has negative dielectric anisotropy, liquid crystal molecules of the liquid crystal layer 5 are aligned substantially perpendicularly to the substrate. Therefore, the liquid crystal layer 5 has only a slight birefringence along the normal of the substrate, whereby a phase difference caused by the liquid crystal layer 5 is substantially zero.

In the case where an electric field is not generated in the liquid crystal layer 5 which is located between the transparent electrode 4 and the reflective electrode 3 and transparent electrode 8, the circularly polarized light passes through the liquid crystal layer 5 without being subjected to any polarization onto the quarter-wave plate 7. In the case where the respective slower optic axes of the quarter-wave plates 10 and 7 are in parallel to each other, the circularly-polarized light is rendered linearly polarized light in the quarter-wave plate 7, thereby entering the polarizing plate 6. At this time, the polarization axis of the linearly polarized light entering the polarizing plate 6 is perpendicular to the transmission axis of the polarizing plate 6. Since the polarizing plates 6 and 9 are placed such that the respective transmission axes are in parallel to each other, the light is absorbed by the polarizing plate 6 and is not transmitted therethrough.

Thus, a black display is obtained when an electric field is not generated in the liquid crystal layer 5 which is located between the transparent electrode 4, and the reflective electrode 3 and transparent electrode 8.

When a voltage is applied to the liquid crystal layer 5 which is located between the transparent electrode 4 and the reflective electrode 3 and transparent electrode 8, the liquid crystal molecules which have been aligned perpendicularly to the substrate are oriented horizontally to the substrate. Therefore, the circularly polarized light incident on the liquid crystal layer 5 is elliptically polarized due to the birefringence of the liquid crystal layer 5. The elliptically polarized light is not rendered linearly polarized light which is perpendicular to the transmission axis of the polarizing plate 6, even after passing through the quarter-wave plate 7. Therefore, the light goes out of the liquid crystal display device through the polarizing plate 6.

By adjusting the voltage applied to the liquid crystal layer 5 which is located between the transparent electrode 4 and the reflective electrode 3 and transparent electrode 8, the quantity of light to be transmitted through the polarizing plate 6 can be adjusted, whereby a gray-level display can be achieved.

In the case where a voltage is applied to the liquid crystal layer 5 such that the phase difference of the liquid crystal layer 5 corresponds to the half-wave conditions, the total phase difference of the quarter-wave plates 7, 10 and the liquid crystal layer 5 corresponds to the one-wave conditions. Therefore, the light enters the polarizing plate 6 as linearly polarized light which has a polarization axis in parallel to the transmission axis of the polarizing plate 6, whereby the maximum quantity of light is transmitted through the polarizing plate 6.

As described above, in the case where the liquid crystal material has negative dielectric anisotropy, a black display is obtained while a voltage is not applied, whereas a white display is obtained while a voltage is applied. This is generally referred to as a normally-black mode.

In the conventional reflection-type liquid crystal display devices, the method of mixing color light components by using a low chromaticity-property color filter having high transmittance has been used. Instead, according to the present invention, a high chromaticity-property color filter region and a non-color filter region are provided in each of the regions on the color filter layer 2 which correspond to the respective reflective electrode regions 3. Therefore, white display is provided by the non-color filter regions, and is mixed with color display provided by the color filter regions, whereby a bright display, which is required for the reflection-type liquid crystal display device, is realized.

Hereinafter, the positional relation between the color filter layer 11 on the color filter layer 2 and the reflective electrode 3 and transparent electrode 8 on the lower substrate 1 will be described with reference to FIGS. 20 and 21. It should be noted that the transparent electrode 4 on the color filter substrate 2, the liquid crystal layer 5 and a light-shielding layer are not shown in FIG. 20.

As shown in FIG. 20, color filter regions 11A, 11B and 11C respectively represent R, G and B filter regions. Each of the color filter regions 11A, 11B and 11C has a stripe shape so as not to entirely overlap the respective reflective electrode 3, but to entirely cover the respective transmissive electrode 8.

It should be noted that, by changing a ratio of the area of a non-color filter region to the area of a region of the color filter substrate 2 which corresponds to the reflective electrode region 3 (hereinafter, this ratio is simply referred to as "Sr"), chromaticity property and brightness can be set arbitrarily.

Figure 25:
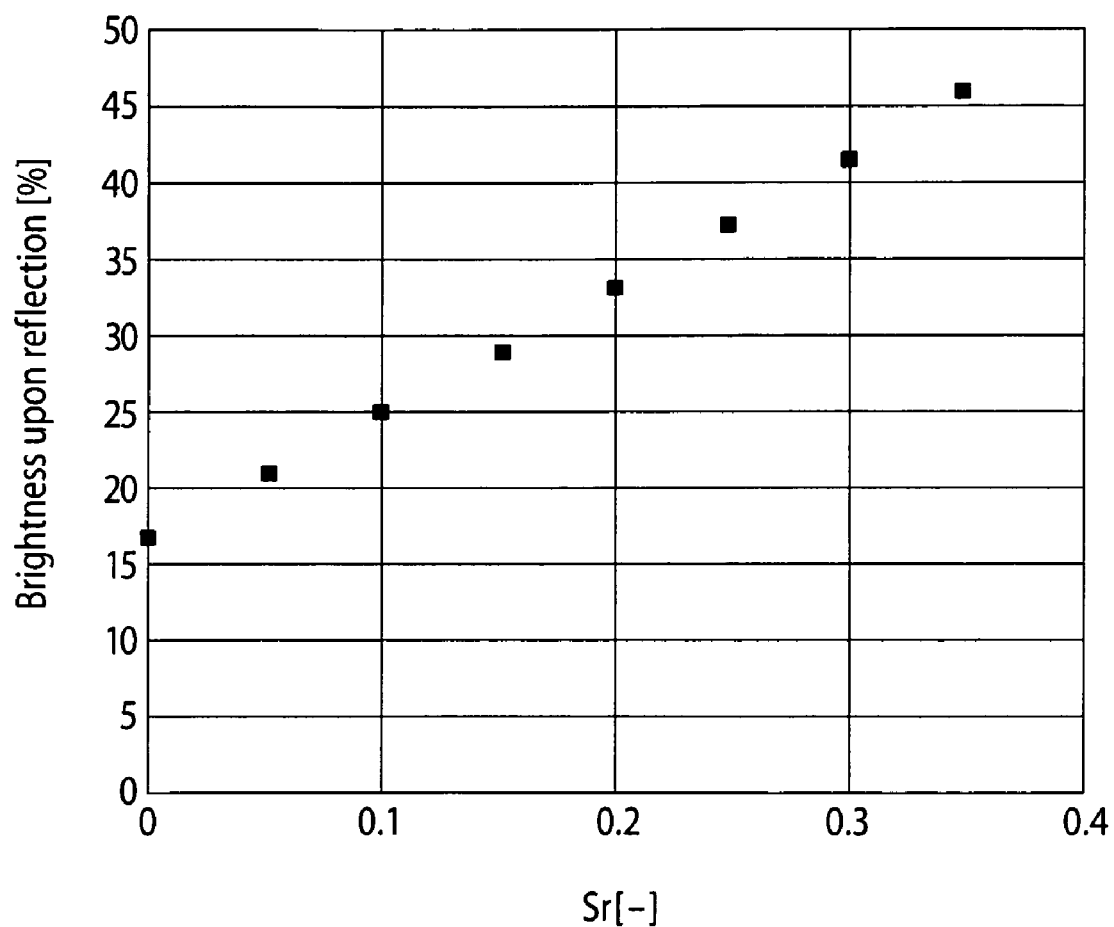
FIG. 25 is a graph showing the relation between a ratio Sr of the area of a non-color filter region to the area of a reflective region and brightness of the reflective region.
Figure 26:
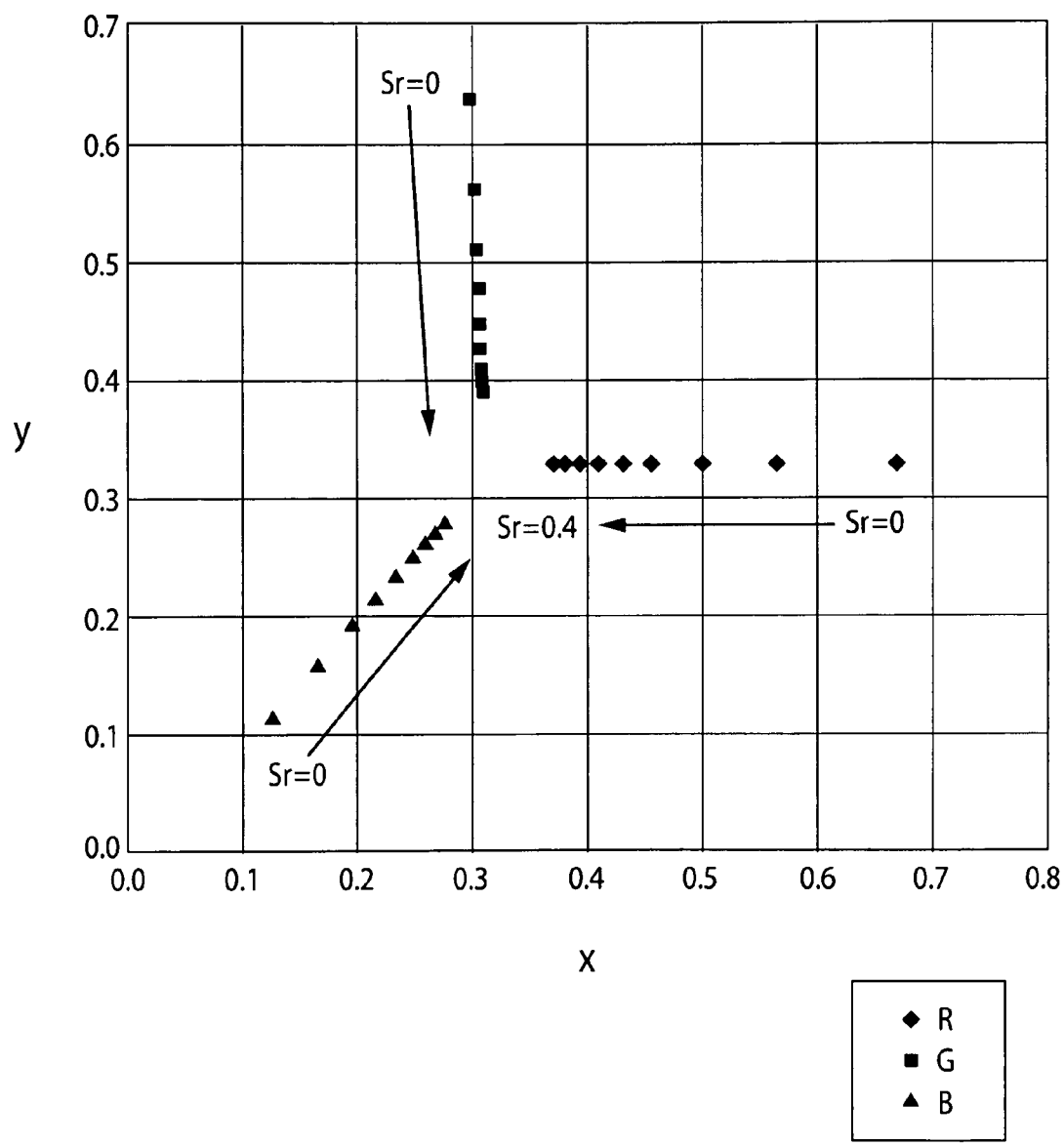
FIG. 26 is a graph showing the relation between the ratio Sr and chromaticity coordinates.

The relation between ratio Sr and brightness of the reflective region upon using the color filter of Table 1 is shown in FIG. 25. Moreover, the relation between ratio Sr and chromaticity coordinates are shown in FIG. 26.

As shown in the Figures, as the ratio Sr is increased, the brightness is increased, while the chromaticity property is reduced. For example, by setting the ratio Sr to about 0.125, the brightness of about 27% can be obtained. In this regard, the liquid crystal display device must be designed according to its use. Table 4 shows the ratio Sr of a transmission/reflection-type liquid crystal display device according to Example 15 of the present invention.

TABLE 4

| | Example 15 | | | |
|---|---|---|---|---|
| | Sr | x | y | Y |
| Red (R) | 0.125 | 0.48 | 0.33 | 23 |
| Green (G) | 0.125 | 0.30 | 0.49 | 40 |
| Blue (B) | 0.125 | 0.21 | 0.21 | 19 |
| White (W) | | 0.32 | 0.34 | 27 |

It should be noted that, in the normally-black display mode, birefringence of the liquid crystal layer 5 is substantially zero while a voltage is not applied. Therefore, an excellent black level can be obtained. Moreover, in the case where a parallel or twisted liquid crystal material is used, a black display is obtained while a voltage is applied. However, liquid crystal molecules in the vicinity of an alignment film are not oriented perpendicularly to the substrate even when a voltage is applied. Therefore, birefringence of the liquid crystal layer 5 is not zero, whereby a sufficient contrast cannot be achieved. In the case where the liquid crystal layer 5 is addressed by active devices, correction of point defects is not necessary, which is significantly advantageous in terms of production cost.

Furthermore, a cell thickness of the liquid crystal display devices may be varied during the production process. However, a black level does not depend on the cell thickness, whereby the production margin is increased. In addition, since the same threshold voltage is used for the reflection display and transmission display, the liquid crystal display device can be easily addressed.

In the present invention, a vertical-alignment display mode in which liquid crystal molecules are aligned perpendicularly to the substrate is used. In such a display mode, it is known that a viewing angle can be increased by providing an optical compensation plate between the polarizing plate and the substrate. In the present invention as well, the same effects can be obtained by providing such an optical compensation plate.

EXAMPLE 15

Hereinafter, a liquid crystal display device according to Example 15 of the present invention will be described with reference to the drawings. FIG. 20 is a plan view showing the transmission/reflection-type liquid crystal display device of Example 15, and FIG. 21 is a cross sectional view taken along line 21-21' of FIG. 20.

It should be noted that, in order to clarify the positional relation between the color filter layer 11 and the pixel electrodes 3 and 8, the transparent electrode 4, the liquid crystal layer 5, a light-shielding layer and an alignment layer are omitted in FIG. 20.

As shown in FIG. 20, vertically extending signal electrodes 21 and transversely extending scanning electrodes 22 are formed on the lower substrate 1. Moreover, a TFT 23 and pixel electrodes 3 and 8 are formed in the vicinity of each of the intersections of the signal electrodes 21 and the scanning electrodes 22. The pixel electrodes 3 and 8 for applying a voltage to the liquid crystal layer 5 are formed from different materials. More specifically, the pixel electrodes 3 serve as reflective electrodes of an aluminum (Al) alloy, whereas the pixel electrodes 8 serve as transmissive electrodes of ITO.

The color filter regions 11A, 11B and 11C are R, G and B color filter regions, respectively. Each of the color filter regions 11A, 11B and 11C has a stripe-shape so as to entirely overlap the respective transmissive electrode 8, as well as to overlap about 87.5% of the total area of the respective reflective electrode 3 (see Table 4: Sr=0.125). It should be noted that the hatched portion B in the figure represents a non-color filter region in the reflective region.

In FIG. 21, the liquid crystal display device of Example 15 includes a pair of substrates: lower substrate (TFT substrate) 1 and color filter substrate 2. A vertical alignment film is applied to each of the substrates 1 and 2, and baked. Thereafter, the inner surface of the resultant color filter substrate 2 is rubbed. Then, the substrates 1 and 2 are laminated to each other with both silica spacers of about 3.5 µm and epoxy resin (which are not shown) interposed therebetween. The epoxy resin is cured by heat treatment.

A liquid crystal material having negative dielectric anisotropy is introduced into the gap between the substrates 1 and 2, whereby the liquid crystal layer 5 is formed. The liquid crystal material used has Δn of about 0.0773. Moreover, the rubbing process is conducted so that the longitudinal axis of the liquid crystal molecules is inclined by about 1° from the normal of the color filter substrate 2.

After the liquid crystal material is introduced, the quarter-wave plate 7 and the polarizing plate 6 are attached to the outer surface of the color filter substrate 2. Similarly, the quarter-wave plate 10 and the polarizing plate 9 are attached to the outer surface of the lower substrate 1. At this time, the respective slower optic axes of the quarter-wave plates 7 and 10 are set to have an angle of about 45° with respect to the rubbing direction, and the quarter-wave plates 7 and 10 are attached to the respective substrates 1 and 2 so that the respective slower optic axes are in parallel to each other. Moreover, the respective transmission axes of the polarizing plates 6 and 9 are set to be in parallel to the rubbing direction.

In the liquid crystal display device thus produced, a contrast of the reflection display is about 15 or more. A reflectance in a bright state (an applied voltage to the liquid crystal layer 5: about 3.25 V) measured by a spectrocolorimeter (Model No. CM2002 made by Minolta Camera Co., Ltd.) was about 9% (reduced for aperture ratio of 100%) of that of a standard diffusing plate. This is substantially equal to the calculated brightness (about 27%) in the reflective regions multiplied by the value (about 34%) obtained from the transmittance of the polarizing plate 6, transmittance of the transparent electrode 4 and reflectance of the reflective electrode 3.

Moreover, chromaticity of white was also excellent as follows: (x, y)=(0.31, 0.32). A contrast of the transmission display is 100 or more, and a transmittance in a bright state (an applied voltage to the liquid crystal layer 5: about 5 V) was about 12% (reduced for aperture ratio of 100%) of that of air.

The above-mentioned display characteristics were obtained in the liquid crystal display device wherein the polarizing plates 6 and 9 have not been subjected to surface treatment such as an antireflective (AR) coating for reducing surface reflection. By conducting such surface treatment, a contrast of the reflection display can be significantly improved.

Moreover, a forward scattering plate may be provided on the surface of the polarizing plate 6 which faces the color filter substrate 2. The front scattering plate scatters incident light only in the direction in which light travels (i.e., in the forward direction), and does not scatters incident light in the opposite direction (i.e., in the backward direction). At this time, light incident on the outer surface of the color filter substrate 2 is transmitted through the forward scattering plate while being scattered, and is reflected by the reflection electrode 3 back into the scattering plate. Therefore, the light is again scattered by the scattering plate. Since the reflection electrode 3 is a mirror, incident light is reflected only in a single direction, whereby a viewing range is limited. However, when such a scattering plate is used, a "mirror effect" is eliminated, whereby the viewing range can be increased. As a result, a paper-white display can be achieved.

The ratio Sr and the arrangement of the non-color filter regions are not limited to those described in Example 15. In the case where brightness is considered more important than chromaticity property, the ratio Sr may be increased. Each of the color filter region 11A, 11B and 11C may have a shape other than the stripe-shape. The same effects as those of Example 15 can be obtained even when the color filter region has an island shape.

EXAMPLE 16

Figure 22:
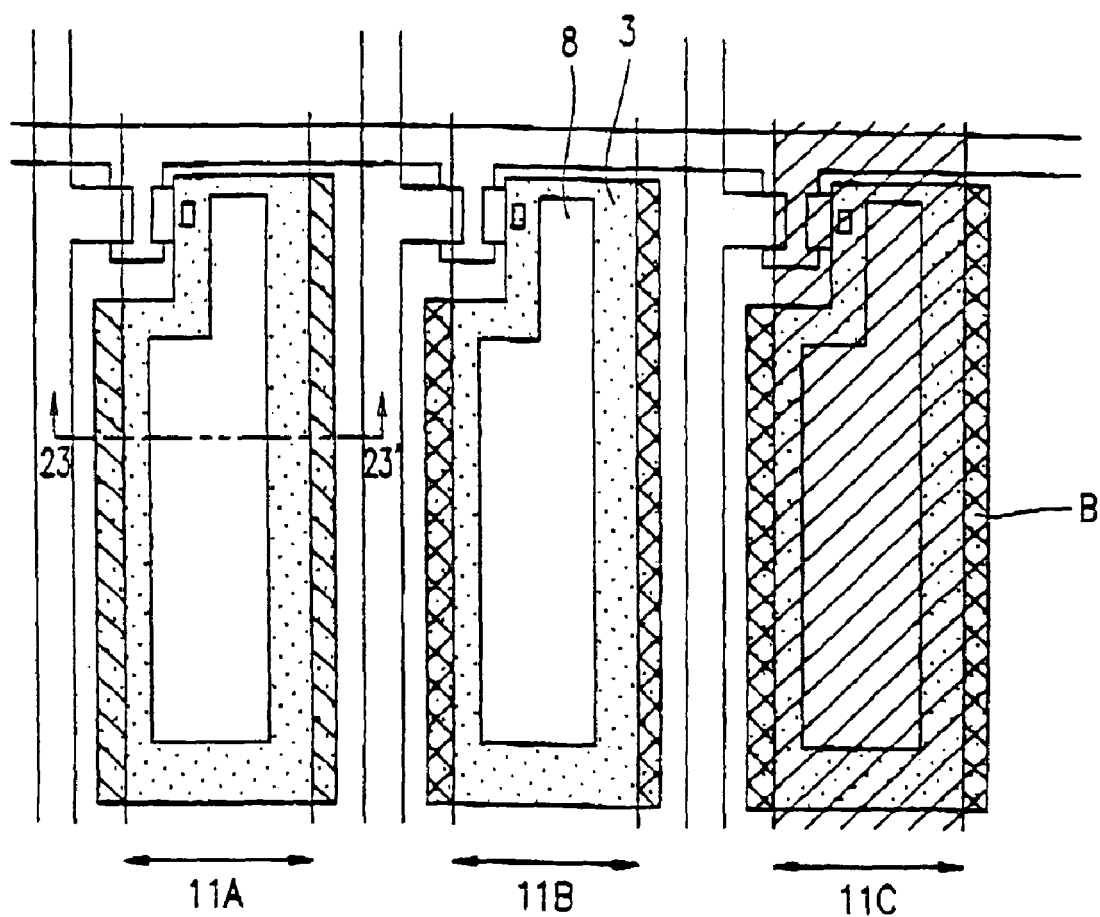
FIG. 22 is a plan view showing a transmission/reflection-type liquid crystal display device according to Example 16 of the present invention.
Figure 23:
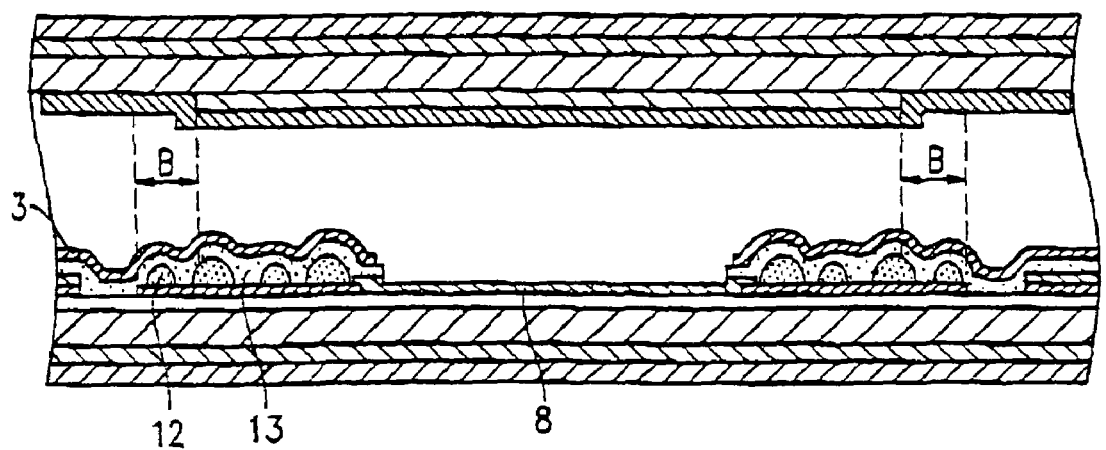
FIG. 23 is a cross sectional view taken along line 23-23' of FIG. 22.

Hereinafter, a liquid crystal display device according to Example 16 of the present invention will be described with reference to the drawings. FIG. 22 is a plan view showing a transmission/reflection-type liquid crystal display device of Example 16, and FIG. 23 is a cross sectional view taken along line 23-23' of FIG. 22. It should be noted that, in order to clarify the positional relation between the color filter layer 11 and the pixel electrodes 3 and 8, the transparent electrode 4, the liquid crystal layer 5, a light-shielding layer and an alignment layer are omitted in FIG. 22.

As shown in FIGS. 22 and 23, the liquid crystal display device of Example 16 is different from that of Example 15 in that the reflective electrodes 3 are formed on a resin 12 having an uneven surface, and that the reflective electrodes 3 are formed from aluminum (Al). The transparent electrodes 8 are formed from the same material as Example 15. Also, the liquid crystal display device of Example 16 is produced by the same production process as Example 15.

In Example 16, the resin 12 having an uneven surface is formed by patterning a transparent, photosensitive acrylic resin into a circular shape, and melting the resultant resin by heating to a temperature equal to or higher than its glass transition temperature. An insulation film 13 formed on the uneven surface of the resin 12 is formed from the same resin material as the resin 12. Therefore, the insulation film 13 serves to fill the recesses in the uneven surface of the resin 12 so as to eliminate mirror-reflection components, as well as serves to prevent electrolytic corrosion of both the Al reflective electrodes 3 and the transparent electrodes 8.

In Example 16, reflected light from the reflective electrodes 3 is appropriately scattered. Therefore, a "mirror effects" does not occur even without using the forward scattering plate, whereby a viewing range can be increased. As a result, a paper-white display can be achieved. It should be noted that, characteristics similar to those of Example 15 are obtained in terms of contrast, brightness, chromaticity property and the like.

EXAMPLE 17

Hereinafter, a specific example of the ratio Sr will be described.

As shown in Table 5, a liquid crystal display device according to Example 17 of the present invention is produced by the same production process as that of Examples 2 and 15 except that the respective ratios Sr of the R, G and B filter regions are set to about 0.2 in Example 17. Table 5 shows the ratio Sr of the transmission/reflection-type liquid crystal display device of Example 17.

TABLE 5

| Example 17 | | | | |
|---|---|---|---|---|
| | Sr | x | y | Y |
| Red (R) | 0.2 | 0.43 | 0.33 | 29 |
| Green (G) | 0.2 | 0.31 | 0.45 | 45 |
| Blue (B) | 0.2 | 0.23 | 0.24 | 26 |
| White (W) | | 0.32 | 0.33 | 33 |

In the liquid crystal display device of Example 17, a contrast of the reflection display is about 15 or more. When a voltage of about 3.25 V is applied to the liquid crystal layer 5, a reflectance was about 11% (reduced for aperture ratio of 100%) of that of a standard diffusing plate.

This is substantially equal to the calculated brightness (about 33%) in the reflective regions multiplied by the transmittance (about 34%) obtained from the respective transmittance of the polarizing plate 6 and transparent electrode 4 and reflectance of the reflection electrode 3.

The chromaticity of each color is as shown in FIG. 24 and Table 5. As a result, reflection display having a color reproduction range equivalent to that of the reflection-type liquid crystal display device can be realized.

EXAMPLE 18

Hereinafter, another specific example of the ratio Sr will be described.

As shown in Table 6, a liquid crystal display-device according to Example 18 of the present invention is produced by the same production process as that of Examples 2 and 15 except that the respective ratios Sr of the R, G and B filter region are set to about 0.38, about 0.5 and about 0.2. Table 6 shows the ratio Sr in the transmission/reflection-type liquid crystal display device of Example 18.

TABLE 6

| Example 18 | | | | |
|---|---|---|---|---|
| | Sr | x | y | Y |
| Red (R) | 0.38 | 0.37 | 0.33 | 45 |
| Green (G) | 0.5 | 0.31 | 0.37 | 66 |
| Blue (B) | 0.2 | 0.23 | 0.24 | 26 |
| White (W) | | 0.31 | 0.32 | 46 |

In order to obtain brightness equivalent to that of the reflective color filter shown in Table 1, the ratio Sr must be set to about 0.4. However, if the ratio Sr is set to about 0.4, light passing through the B color filter region cannot be distinguished from white color which is a color of the light source.

Accordingly, in the liquid crystal display device of Example 18, the ratio Sr of the B filter region is reduced as well as the ratio Sr of the G filter region is increased, in order to increase brightness. This causes the chromaticity of white to be slightly shifted toward blue. However, such a color can still be recognized as a white color.

In the liquid crystal display device of Example 18, a contrast of the reflection display is about 15 or more. When a voltage of about 3.25 V is applied to the liquid crystal layer 5, a reflectance was about 16% (reduced for aperture ratio of 100%) of that of a standard diffusing plate.

This is substantially equal to the calculated brightness (about 46%) in the reflective regions multiplied by the transmittance (about 34%) of the polarizing plate 6 and transparent electrode 4 and reflectance of the reflection electrode 3.

The chromaticity of each color is as shown in FIG. 24 and Table 6. As a result, a bright reflection display, which is equivalent to that of the reflection-type liquid crystal display device, can be obtained, although a color reproduction range is reduced.

The above-mentioned reflection characteristics were obtained in the liquid crystal display device wherein the polarizing plates 6 and 9 have not been subjected to surface treatment such as an antireflective (AR) coating for reducing surface reflection. By conducting such surface treatment, a contrast of the reflection display can be significantly improved. Each of the color filter region 11A, 11B and 11C may have a shape other than the stripe-shape. The same effects as those of Embodiment 2 can be obtained even when the color filter region has an island shape.

EXAMPLE 19

Figure 27A:
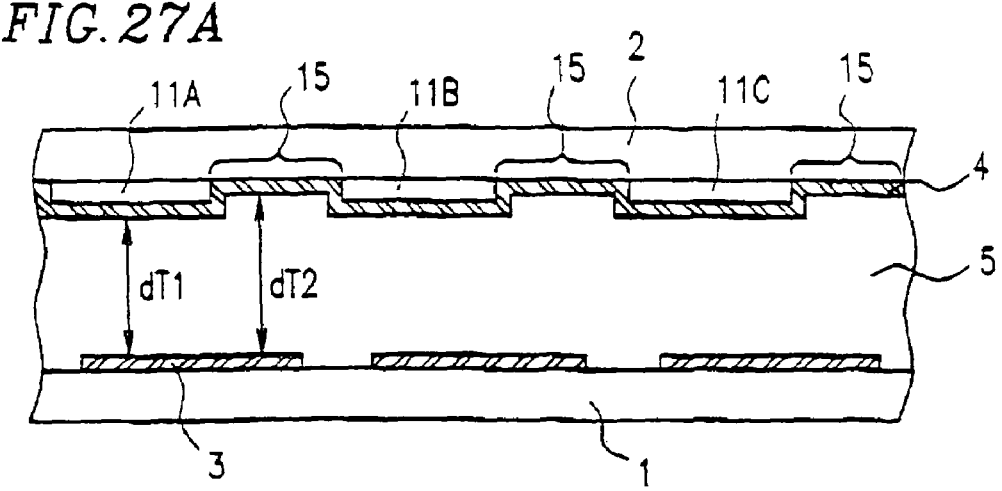
FIG. 27A is a cross sectional view showing the transmission/reflection-type liquid crystal display device of Example 15.
Figure 27B:
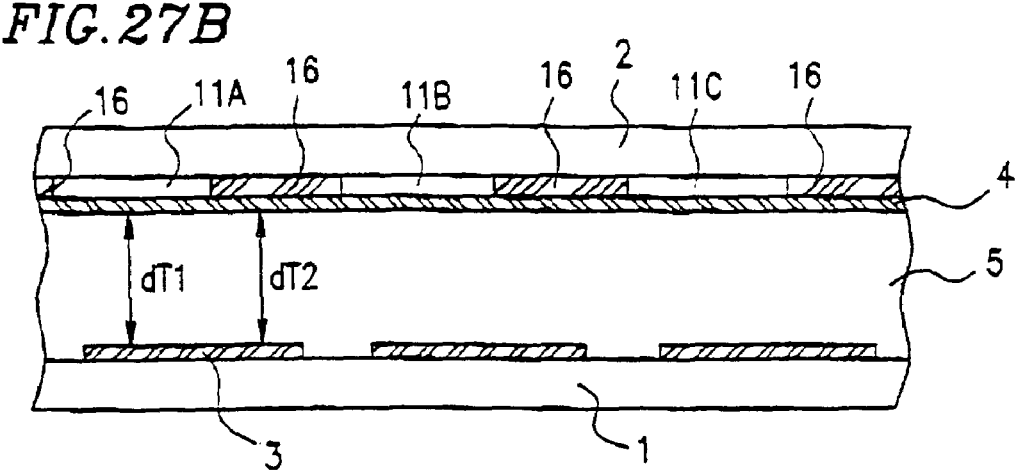
FIGS. 27B and 27C are cross sectional views each showing a transmission/reflection-type liquid crystal display device according to Example 19 of the present invention.
Figure 27C:
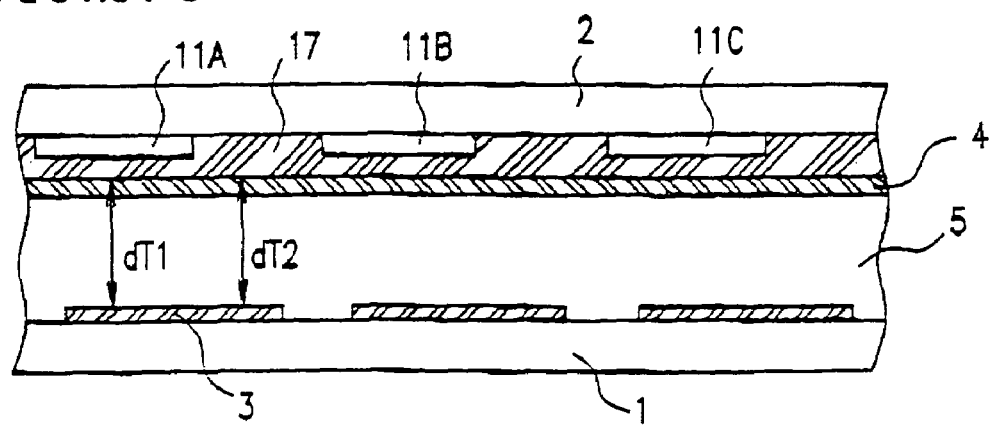
Figure 28A:
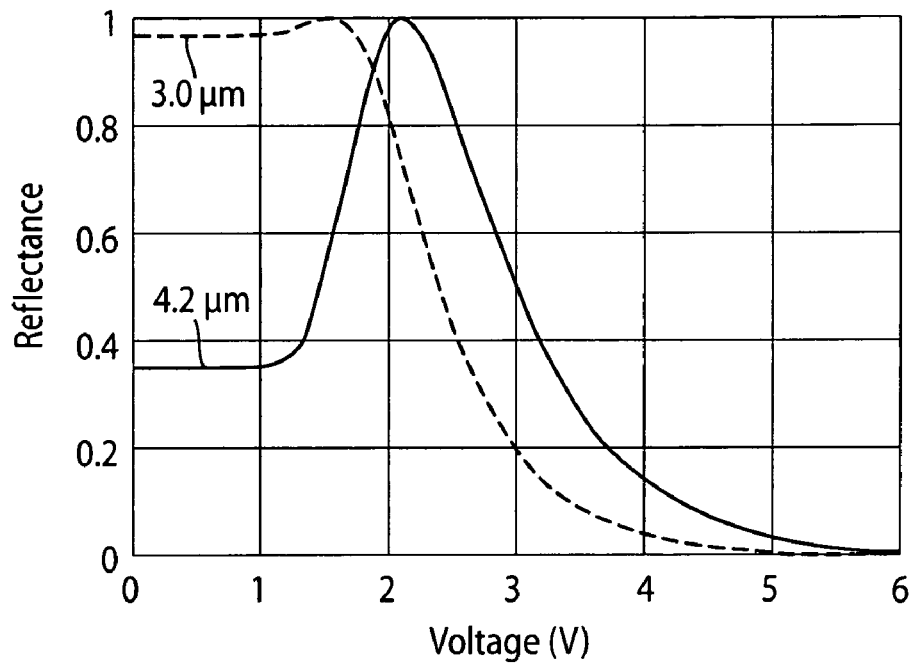
FIGS. 28A and 28B are graphs each showing electro-optical characteristics of the transmission/reflection-type liquid crystal display shown in FIG. 27A.
Figure 28B:
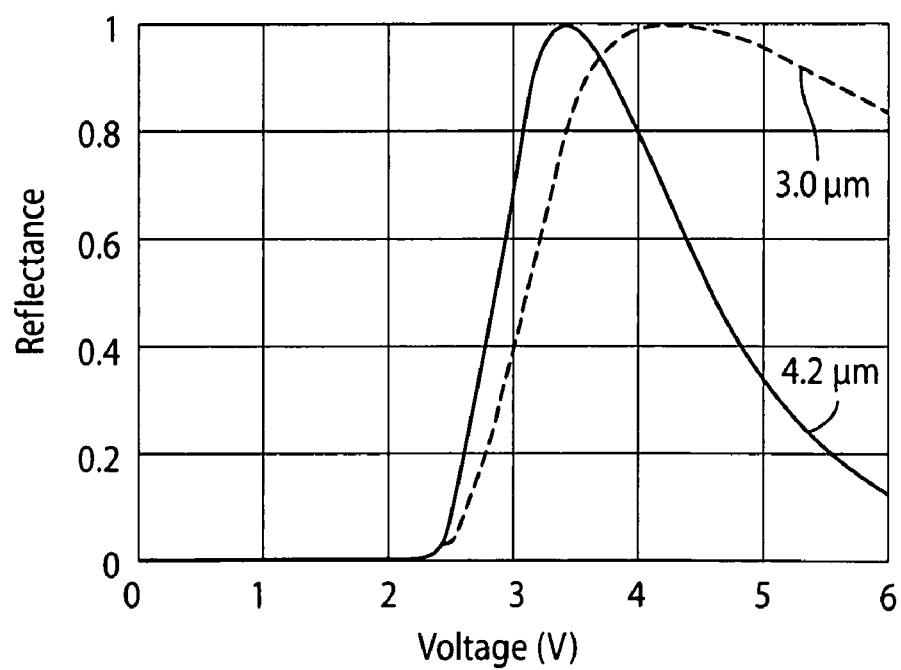

Hereinafter, a liquid crystal display device according to Example 19 of the present invention will be described with reference to the drawings. FIG. 27A is a cross sectional view showing the transmission/reflection-type liquid crystal display device of Example 15, and FIGS. 27B and 27C are cross sectional views each showing the transmission/reflection-type liquid crystal display device of Example 19. FIGS. 28A and 28B are graphs showing electro-optical characteristics of the liquid crystal display device shown in FIG. 27A.

As shown in FIGS. 27A to 27C, the liquid crystal display device of Example 19 is different from that of Example 15 only in that a planarizing film having a light-transmitting property is formed at least on a non-color filter region on the color filter substrate. Except for the planarizing film, the structure and production process of the liquid crystal display device of Example 19 is the same as those of Example 15.

It should be noted that, in order to clarify the features of the liquid crystal display device of Example 19, the structure thereof is partially omitted in FIGS. 27A to 27C. In addition, the elements shown in FIGS. 27A to 27C are not correctly scaled.

First, the liquid crystal display device of Example 15 will now be described with reference to FIG. 27A. As shown in FIG. 27A, the reflective electrodes 3 having a prescribed shape are formed on the lower substrate 1, whereas the color filter regions 11A, 11B and 11C and the counter electrode 4 are formed on the color filter substrate 2 which faces the lower substrate 1. The liquid crystal layer 5 is interposed between the reflective electrodes 3 and the counter electrode 4 which are respectively formed on the lower substrate 1 and the color filter substrate 2.

In order to display various colors in the liquid crystal display device, the R, G and B filter regions 11A, 11B and 11C and non-color filter regions 15 are provided on the color filter substrate 2. By providing the non-color filter regions 15, light transmitted through the non-color filter regions 15 is mixed with light transmitted through the color filter regions 11A, 11B and 11C having high chromaticity property, whereby a bright display, which is necessary in the reflective regions of the liquid crystal display device, can be realized.

However, as shown in FIG. 27A, provided that a thickness of a region of the liquid crystal layer 5 which corresponds to the respective color filter regions 11A, 11B and 11C is denoted by dT1, and a thickness of a region of the liquid crystal layer 5 which corresponds to the respective non-color filter regions 15 is denoted by dT2, the liquid crystal display device of Example 15 has dT1 of about 3.0 μm and dT2 of about 4.2 μm. In this case, as shown in FIGS. 28A and 28B, electro-optical characteristics of the regions of the liquid crystal display device do not match each other, due to the difference in thickness between the regions of the liquid crystal layer 5. Such electro-optical characteristics of the liquid crystal display device of Example 15 will be specifically described with reference to FIGS. 28A and 28B.

First, the electro-optical characteristics shown in FIG. 28A correspond to a normally-white mode. Therefore, when a high voltage of about 6 V is applied, the liquid crystal molecules are aligned substantially perpendicularly to the substrate, whereby a black display can be provided by each region of the liquid crystal layer 5, substantially regardless of the thickness of the liquid crystal layer 5. However, due to the voltage resistance of a driver, the liquid crystal display device is usually driven with a voltage of about 4 V to about 5 V, resulting in a defective black display. Therefore, it is difficult to realize a higher contrast.

The electro-optical characteristics shown in FIG. 28B correspond to a normally-black mode. Therefore, in an initial state, the liquid crystal molecules are aligned substantially perpendicularly to the substrate, whereby a black display can be provided by each region of the liquid crystal layer 5, substantially regardless of the thickness of the liquid crystal layer 5. As a result, although a contrast higher than that of the normally-white mode can be obtained, characteristics in a bright state (a voltage of about 4 V) as well as in a gray state are significantly varied as in the case of the normally-white mode.

Therefore, in Example 19, a planarizing film 16 or 17 is formed at least in the non-color filter regions 15 as shown in FIGS. 27B and 27C, respectively, in order to make the thicknesses dT1 and dT2 of the liquid crystal layer 5 equal to each other.

It should be noted that, although the thicknesses dT1 and dT2 of the liquid crystal layer 5 are shown to be equal to each other in FIGS. 27B and 27C, display characteristics can also be improved even when the thicknesses dT1 and dT2 are not exactly equal to each other. In other words, the thicknesses dT1 and dT2 does not have to be equal to each other as long as the difference therebetween can be made small by a planarizing film 16 or 17.

With such a structure, retardation of the region of the liquid crystal layer 5 having a thickness dT1 can be made equal to that of the region of the liquid crystal layer 5 having a thickness dT2. Accordingly, the liquid crystal display device has the same electro-optical characteristics in each region of the liquid crystal layer 5, allowing for uniform display in a dark state, gray state and bright state. As a result, a higher contrast can be achieved.

Although an acrylic, photosensitive resin, which is a base material of the color filter layer, is used as the planarizing films 16 and 17 in Example 19, the present invention is not limited thereto. In other words, each of the planarizing films 16 and 17 may be formed from any material as long as the material has a light-transmitting property, and its adhesive property and resistance against treatments are similar to those of the acrylic, photo-sensitive resin. However, a colorless material is preferred as the planarizing films. The above-mentioned photosensitive resin can be easily patterned. The planarizing film may alternatively be formed by applying $SiO_2$ dissolved in a solvent by a spin-coating method or printing method and baking the applied film.

In the structure of FIG. 27B, the planarizing film 16 is patterned by using a photolithography technique so as to be formed only on the non-color filter regions. Therefore, the flatness of the surface which is in contact with the liquid crystal layer 5 can be improved.

In the structure of FIG. 27C, the planarizing film 17 is formed so as to cover the entire surface of the color filter substrate 2. In this case, the patterning by the photolithography technique is not necessary, thereby simplifying the production process.

EXAMPLE 20

Figure 29A:
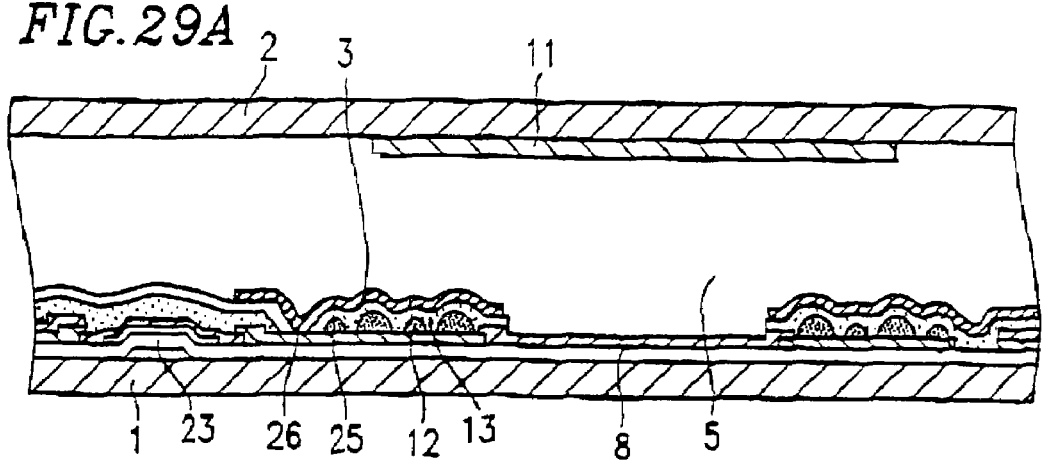
FIG. 29A is a cross sectional view showing the transmission/reflection-type liquid crystal display device of Example 15.

Hereinafter, a liquid crystal display device according to Example 20 of the present invention will be described with reference to the drawings. FIG. 29A is a cross sectional view showing the transmission/reflection-type liquid crystal display device of Example 15, and FIGS. 29B and 29C are cross sectional views each showing the transmission/reflection-type liquid crystal display device of Example 20.

Figure 29B:
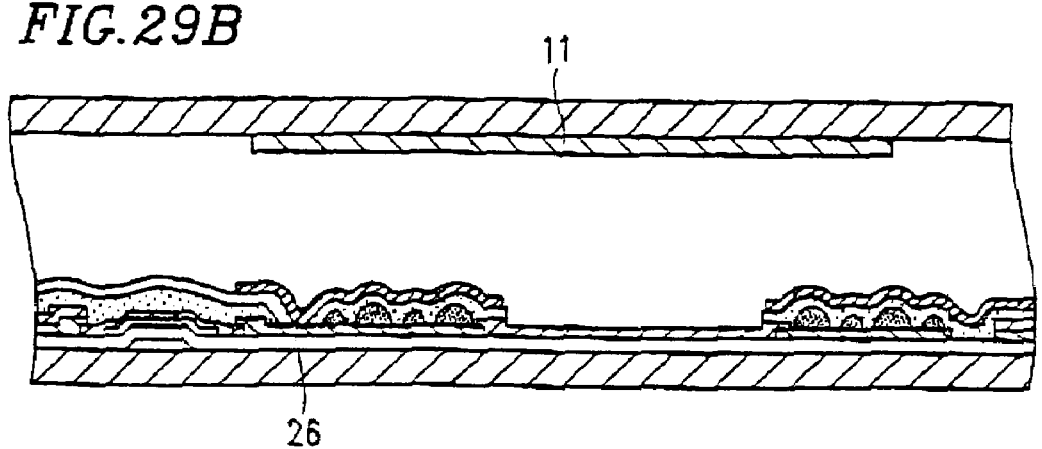
FIGS. 29B and 29C are cross sectional views each showing a transmission/reflection-type liquid crystal display device according to Example 20 of the present invention.
Figure 29C:
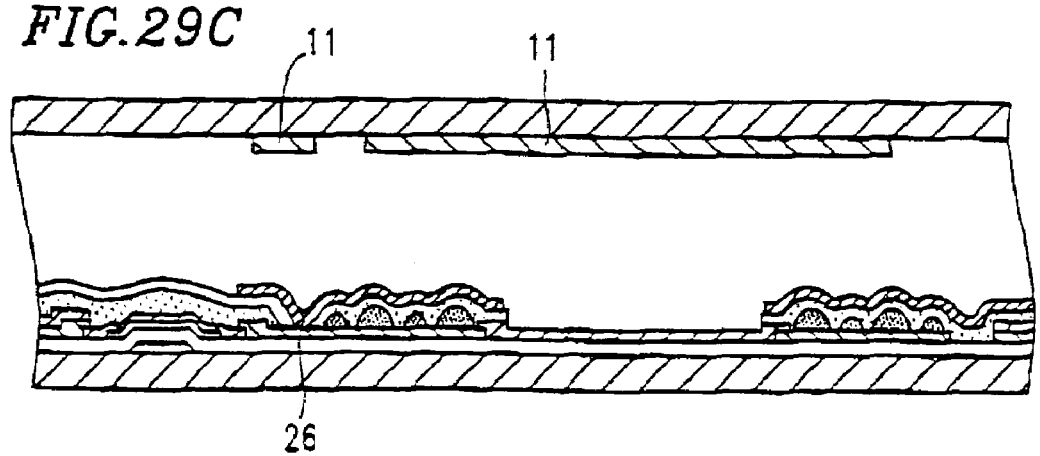
Figure 30:
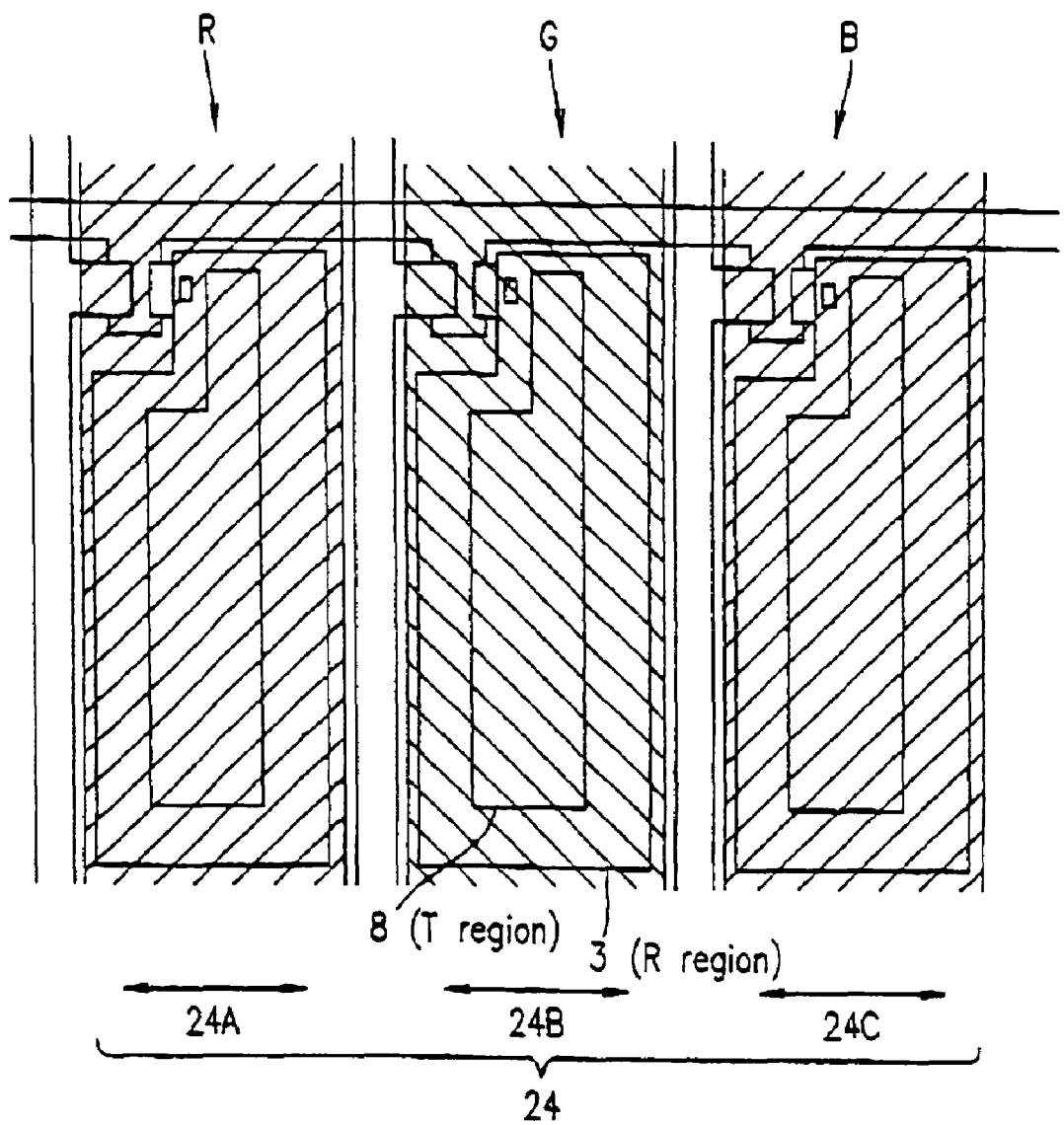
FIG. 30 is a plan view showing the arrangement of a color filter in a transmission/reflection-type liquid crystal display device.

As shown in FIGS. 29A to 29C, the arrangement of a color filter layer of the liquid crystal display device of Example 20 is different from that of Example 15 in that a color filter layer 11 is formed on a region of the color filter substrate 2 which corresponds to a contact hole 26 for connecting a respective switching device to the respective pixel electrode 3. Except for this, the structure and production process of the liquid crystal display device of Example 20 are the same as those of Example 15.

First, the arrangement of the color filter layer of the liquid crystal display device of Example 15 will be described with reference to FIG. 29A. In the liquid crystal display device shown in FIG. 29A, the reflective electrode 3 is formed on a resin 12 having an uneven surface, unlike the liquid crystal display device shown in FIG. 21. As shown in FIG. 29A, the reflective electrode 3 and the transparent electrode 8 each having a prescribed shape are formed on the lower substrate 1. The color filter layer 11 is formed on the region of the color filter substrate 2 which faces the reflective electrode 3 and the transparent electrode 8 except for a portion of the color filter substrate 2 which corresponds to the reflective electrode 3. A liquid crystal layer 5 is provided between the lower substrate 1 and the color filter substrate 2.

On the lower substrate 1 of such a liquid crystal display device, a pixel electrode including the reflective electrode 3 and transparent electrode 8 is connected to a drain electrode 25 of a TFT (i.e., switching device) 23 through the contact hole 26. Moreover, the color filter layer 11 and non-color filter regions are provided on the pixel electrode region of the color filter substrate 2. By providing such non-color filter regions, light transmitted through the non-color filter regions is mixed with light transmitted through the color filter regions having high chromaticity property, whereby a bright display, which is necessary in the reflective regions of the transmission/reflection-type liquid crystal display device, can be realized.

However, as shown in FIG. 29A, a portion of the liquid crystal layer 5 which corresponds to the contact hole 26 is thicker than the remaining portion of the liquid crystal layer 5 by the thickness of an interlayer insulation film 13. Therefore, in black display, leakage of light occurs in a portion of the reflective region which corresponds to the non-color filter region, thereby reducing a contrast.

Therefore, in Example 20, the color filter layer 11 is formed also on the portion of the color filter substrate 2 which corresponds to the contact hole 26, as shown in FIGS. 29B and 29C. Thus, the leakage of light within the reflective region, which results from the mismatch of the electro-optical characteristics due to the difference in retardation, is reduced.

With such a structure, a defective display which occurs in the vicinity of the contact hole 26 can be eliminated, thereby allowing for a uniform display in a dark state, gray state and bright state. Moreover, a higher contrast can be achieved.

Although the color filter layer 11 is formed also on a portion of the color filter substrate 2 which corresponds to the contact hole 26 in Example 20, the present invention is not limited to the color filter layer 11 as long as the leakage of light can be reduced and defective display can be eliminated. For example, a light-shielding layer such as a black mask may alternatively be used. However, when the black mask serving as a light-shielding film is used, production cost is increased as compared to the case where the color filter layer 11 is used. Moreover, a larger black mask must be formed in view of the alignment margin, thereby reducing the aperture ratio which contributes to the display.

In view of the above, in Example 20, the color filter layer 11 is formed on the portion of the color filter substrate 2 which corresponds to the contact hole 26. As a result, an additional production step is not required, thereby simplifying the production process.

FIG. 29B shows the structure in which the color filter layer 11 is extended to the position corresponding to the contact hole 26, and FIG. 29C shows the structure in which the color filter layer 11 is patterned so as to correspond to the contact hole 26.

Embodiment 3

In the above embodiments, the reflection-type liquid crystal display device and the transmission/reflection-type liquid crystal display device have been described. Descriptions in embodiment 3 will be focused on the details of a color filter layer.

The following descriptions are directed to an example in which a color filter layer according to embodiment 3 is applied to a transmission/reflection-type liquid crystal display device, but the color filter layer according to embodiment 3 is not limited thereto. The color filter layer according to embodiment 3 only has to include two regions between which the number of times that light used for display is transmitted through the color filter layer is different. The present invention includes a display device which uses such a color filter layer.

In a transmission/reflection-type liquid crystal display device according to the present invention, light is transmitted through the color filter layer only once in the transmissive regions, while in the reflective regions, light is transmitted through the color filter layer twice. Therefore, in the case where the color filter layer is not optimized in both the transmissive regions and the reflective regions, the efficiency for light utilization (reflectance) in the reflective regions decreases, and the chromaticity property of light differs between transmitted light used for display in the transmissive regions and reflected light used for display in the reflective regions.

Figure 31A:
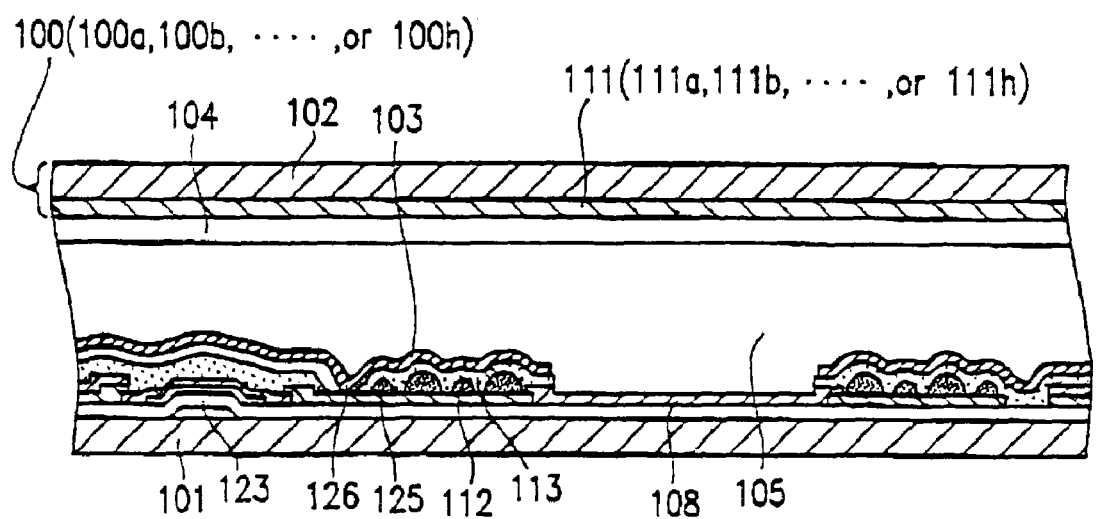
FIG. 31A is a cross-sectional view of a transmission/reflection-type liquid crystal display device according to embodiment 3 of the present invention.

FIG. 31A is a cross-sectional view of a transmission/reflection-type liquid crystal display device according to embodiment 3. As shown, a reflective electrode 103 and a transmissive electrode 108 are formed in predetermined shapes on a lower substrate 101. The lower substrate 101 faces a color filter substrate 100 (100a, 100b, . . . , or 100h). The color filter substrate 100 includes a glass substrate 102 and a color filter layer 111(111a, 111b, . . . or 111h) formed thereon. A counter electrode 104 is formed on the color filter layer 111. A liquid crystal layer 105 is interposed between the lower substrate 101 and the color filter substrate 100.

In the following descriptions of embodiment 3, the details of the color filter layer 111 will be described as well as a positional relationship of the formed color filter layer 111 to a reflective region (which corresponds to the reflective electrode 103) and a transmissive region (which corresponds to the transmissive electrode 108).

Figure 31B:
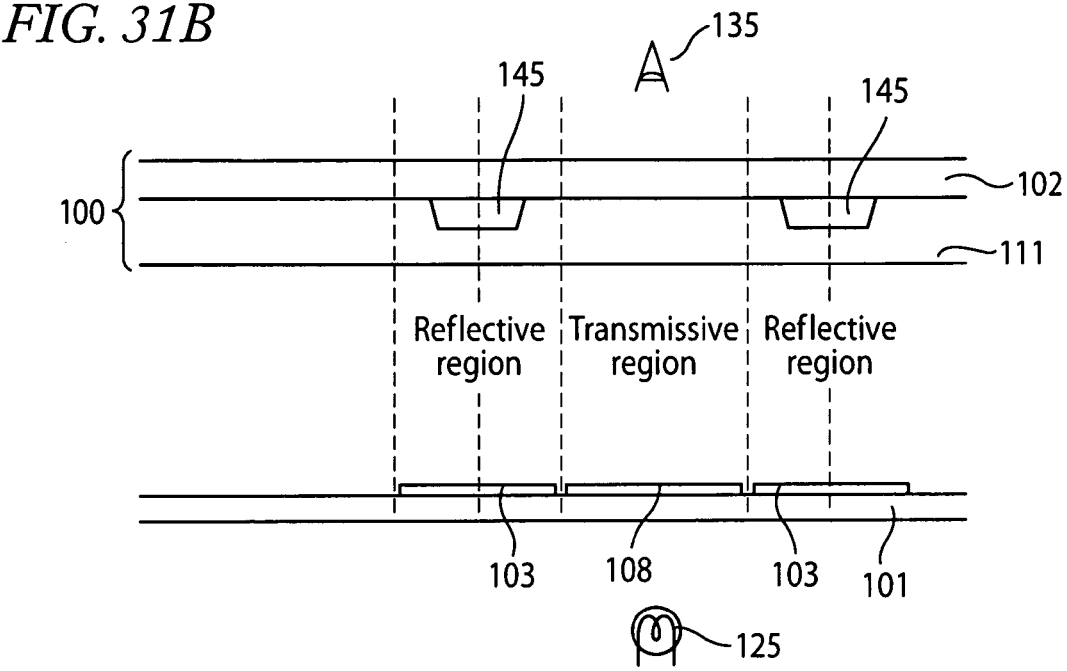
FIG. 31B is a schematic cross-sectional view of a transmission/reflection-type liquid crystal display device for illustrating a representative color filter layer according to embodiment 3.

FIG. 31B is a schematic cross-sectional view of a transmission/reflection-type liquid crystal display device for illustrating a representative color filter layer according to embodiment 3. The reflective electrodes 103 (functioning as reflection means) and the transmissive electrodes 108 are formed on the lower substrate 101. The reflective electrodes 103 correspond to the reflective regions, and the transmissive electrodes 108 correspond to the transmissive regions. In the reflective regions, light from outside of the liquid crystal display device is reflected by the reflective electrodes 103 (reflection means), and the reflected light is used for display (i.e., the reflected light is observed by a viewer 135). On the other hand, in the transmissive regions, light from a light source 125 is transmitted through the transmissive regions and used for display.

According to examples 21-24 according to embodiment 3, a transmissive non-color filter region 145 is provided in a color filter layer of a reflective region, whereby the thickness of the color filter layer in the reflective regions is changed so that the chromaticity property of the reflected light and the transmitted light which are used for display is adjusted appropriately.

Figure 31C:
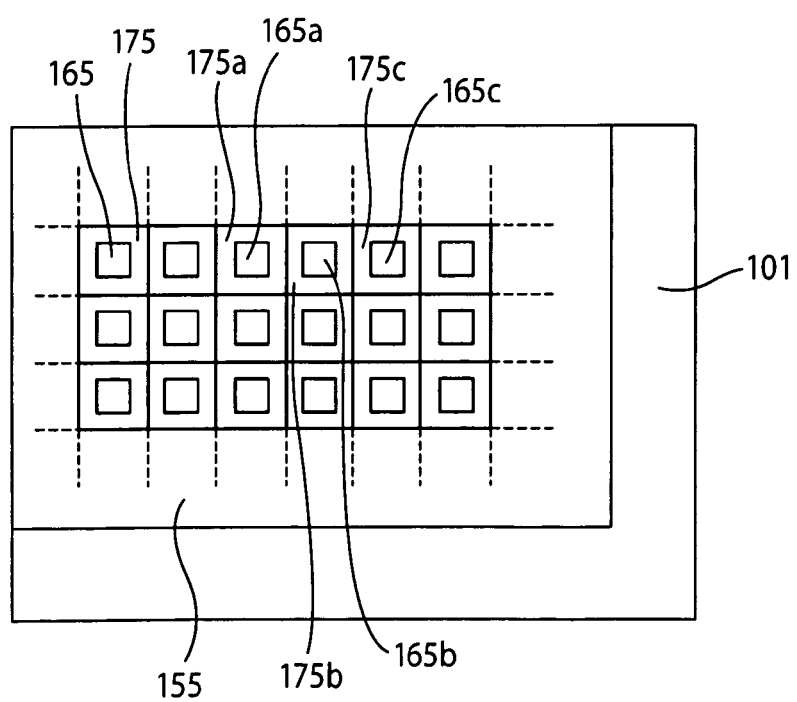
FIG. 31C is a plan view of the transmission/reflection-type liquid crystal display device according to embodiment 3.

FIG. 31C is a plan view of the transmission/reflection-type liquid crystal display device according to embodiment 3. A display region 155 on the lower substrate 101 includes transmissive regions 165 and reflective regions 175. In one example, the transmissive regions 165 and the reflective regions 175 are formed so that a transmissive region 165a and a reflective region 175a provide a display in a first color type (e.g., red), a transmissive region 165b and a reflective region 175b provide a display in a second color type (e.g., blue), and a transmissive region 165c and a reflective region 175a provide a display in a third color type (e.g., green).

However, according to embodiment 3, the transmissive regions and the reflective regions are not limited to the transmissive regions 165 and the reflective regions 175 shown in FIG. 31C. In FIG. 31C, the transmissive regions are enclosed by the reflective regions. However, the reflective regions may be enclosed by the transmissive regions. Alternatively, the transmissive regions and the reflective regions each may have the same shape, and may be alternately arranged in a matrix. The area ratio between the transmissive regions and the reflective regions is varied within a range, for example, from 1:9 to 9:1 according to the specification of a product to which the liquid crystal display device is applied. The advantages of the transmission/reflection-type liquid crystal display device can be obtained as long as either of the transmissive regions and the reflective regions occupy at least about 10% area with respect to the whole area of the display region.

For example, in a portable transmission/reflection-type liquid crystal display device, it is preferable in view of power saving, that the reflective regions are larger than the transmissive regions. On the other hand, in a transmission/reflection-type liquid crystal display device for use in a car, which can use a car battery having a relatively large capacity, it is preferable that the transmissive regions are larger than the reflective regions. Thus, the desirable area ratio between the transmissive regions and the reflective regions varies based on a relationship between the power consumption by a light source and a required brightness. Of course, the area ratio between the transmissive regions and the reflective regions may be 1:1.

EXAMPLE 21

FIGS. 32A through 32D show steps of forming a color filter substrate according to example 21 by using a pigment dispersion method.

Figure 32A:
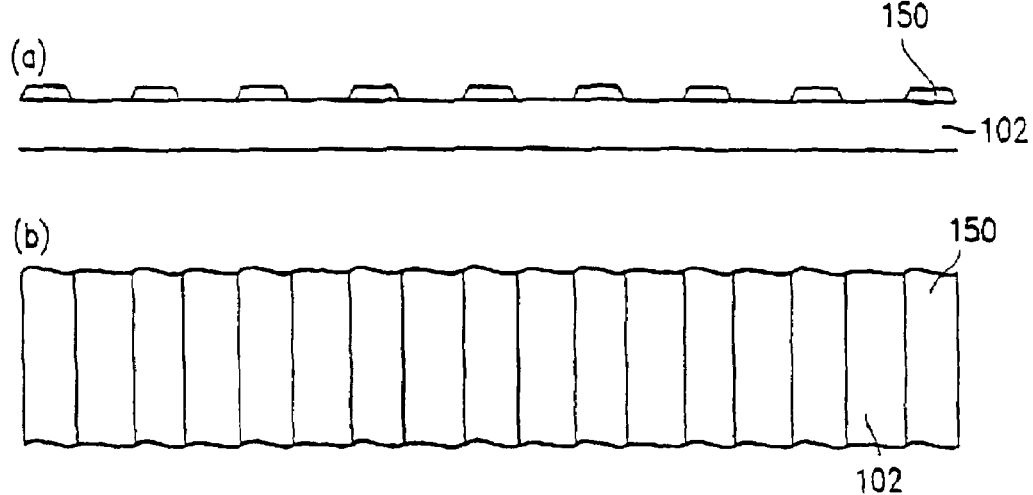
FIGS. 32A through 32D show steps of forming a color filter substrate according to example 21 of the present invention by using a pigment-dispersion method.

Part (a) of FIG. 32A is a cross-sectional view of a glass substrate 102 on which transparent resin portions 150 are formed. Part (b) of FIG. 32A is a plan view of the glass substrate 102 shown in Part (a) of FIG. 32A.

In the first step, a transparent acrylic photosensitive material (e.g., OPTMER® NN700 available from JSR Corporation) is spin-coated onto the glass substrate 102 so as to form a film having a thickness of about 0.5 µm Then, the transparent material film is subjected to a pattern-exposure process which uses active light, and developed with an alkaline developing solution. After being washed with water, the resultant structure is thermally treated, whereby transparent resin portions 150 are formed on the glass substrate 102 as shown in Parts (a) and (b) of FIG. 32A. Herein, the transparent resin portions 150 are formed in a predetermined pattern on the glass substrate 102 so that each of them is within a region corresponding to a reflective region of the lower substrate 101 in a final product. In the final product, the transparent resin portions 150 form transmissive non-color filter regions. In this example, the transparent resin portions 150 are formed by using a pattern-exposure process of the photosensitive resin. However, the transparent resin portions 150 may be formed using other techniques such as patterning by etching, printing, transferring, etc. Furthermore, as shown in Part (b) of FIG. 32A, the transparent resin portions 150 are formed in a stripe pattern, but may be formed in islands as long as each of the islands is within a region which corresponds to a reflective region of the lower substrate 101.

Figure 32B:
Figure 32C:
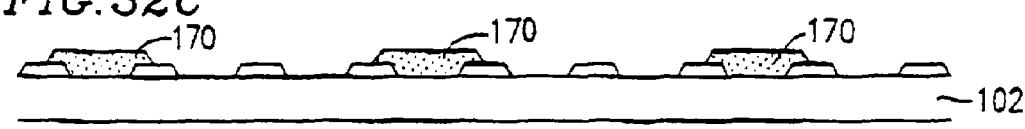
Figure 32D:
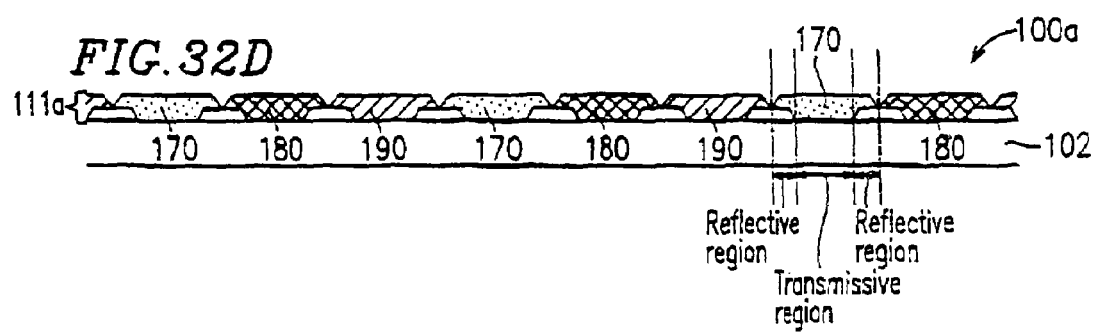

Thereafter, an acrylic pigment-dispersion photosensitive material of a first color (e.g., red) for a first color region is applied by spin-coating over the entire glass substrate 102 so as to form a film 160 having a thickness of about 1 µm, shown in FIG. 32B. The formed film 160 has a relatively flat upper surface entirely over the glass substrate 102, and thus, the thickness of the film 160 is thinner in a region over the transparent resin portions 150 than in a region between the transparent resin portions 150 in which the film 160 is formed directly on the glass substrate 102. Then, the film 160 of the first color photosensitive material is subjected to a pattern-exposure process which uses active light, and developed with an alkaline developing solution. After being washed with water, the resultant structure is thermally treated, whereby first color portions 170 for a color filter layer 111a are obtained as shown in FIG. 32C. In the same manner, second color portions 180 and third color portions 190 are formed of an acrylic pigment-dispersion photosensitive material of a second color (e.g., blue) and an acrylic pigment-dispersion photosensitive material of a third color (e.g., green), respectively, whereby a color filter layer 111a of a color filter substrate 100a is completed as shown in FIG. 32D. In these production steps, it is easy to form the color filter layer 111a so as to have a substantially perfectly flat upper surface. As a result, the color filter layer 111a has thin color filter portions in portions or the entirety of the reflective regions. In the final product, the first color portions 170, the second color portions 180, and the third color portions 190 form the color filter regions.

Over the color filter layer 111a of the thus-obtained color filter substrate 100a, an over-coat layer (not shown) and a transparent conductive layer (not shown) are formed. Then, the color filter substrate 100a is combined with the lower substrate 101 (in the liquid crystal display device, the orientation treatment may be performed before these substrates are combined). On the lower substrate 101, each pixel may include a transmissive region and a reflective region. The color filter substrate 100a is aligned with respect to the lower substrate 101 so that the transparent resin portions 150 in the color filter layer 111a are within regions which correspond to the reflective regions of the lower substrate 101 and do not protrude into the transmissive regions of the lower substrate 101 as indicated in FIG. 32D. That is, the thin color filter portions 170, 180, and 190 over the transparent resin portions 150 are within regions which correspond to the reflective regions of the lower substrate 101. After the two substrates have been combined, a liquid crystal material is injected therebetween, whereby a liquid crystal display panel is completed. Herein, a light-shielding layer may be provided to the color filter substrate 100a if necessary. Furthermore, it is desirable to consider an alignment margin such that the transparent resin portions 150 do not overlap the transmissive regions in the case where the color filter substrate 100a is mis-aligned with respect to the lower substrate 101. With such an alignment margin, light which passes through the transmissive region is prevented from passing through the transparent resin portions 150 that have protruded into the transmissive regions and therefore is prevented from being used for display in the transmissive regions.

In the above-fabricated transmission/reflection-type liquid crystal display device, in the transmissive regions, a display is produced by utilizing light from a light source such as a backlight which is provided on a back surface of the liquid crystal display panel which is opposite to a surface at which a viewer is looking. In this region, the light is transmitted through the color filter layer once only. On the other hand, in the reflective regions, a display is produced by utilizing outside light such as sunlight, light from an indoor lighting device, or light from a lighting device placed at a front side of the display device, and the light is transmitted through the color filter layer twice.

As described above, in the color filter layer 111a according to example 21 of the present invention, the thickness of the color filter region is thinner in portions or the entirety of the reflective regions than in the transmissive regions. Therefore, the utilization efficiency for outside light does not decrease although the outside light is transmitted through the color filter layer 111a twice. When the color filter layer 111a of example 21 is employed, a transmission/reflection-type liquid crystal display device which can produce a bright display is obtained. It is preferable to establish a relationship between the thickness of the color filter regions in the transmissive regions and the thickness of the color filter regions in portions or the entirety of the reflective regions so that the difference of the chromaticity property between the transmissive regions and the reflective regions is as small as possible. With this arrangement, the transmissivity of at least a portion of the reflective regions for a wavelength in a certain wavelength range becomes smaller than a transmissivity of the transmissive regions for the same wavelength. In a transmission/reflection-type liquid crystal display device having such a structure, the variation in the chromaticity which may occur when the intensity of ambient light is changed (e.g., when intense sunlight is suddenly introduced to the liquid crystal display device or when a car which is running in daylight enters into a tunnel) can be suppressed, so that an uncomfortable display condition is not produced, and high visibility can be obtained in various environments.

EXAMPLE 22

FIGS. 33A through 33E show steps of forming a color filter substrate by using a dyeing technique according to example 22.

Figure 33A:
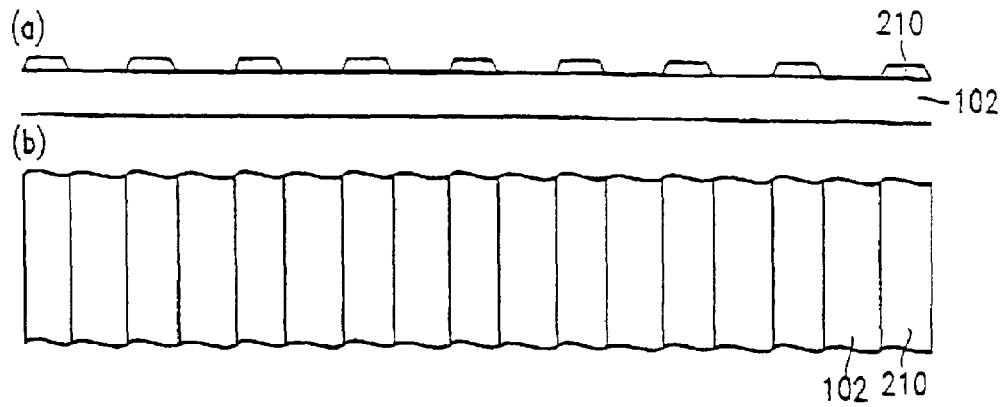
FIGS. 33A through 33E show steps of forming a color filter substrate according to example 22 of the present invention by using a dyeing technique.

Part (a) of FIG. 33A is a cross-sectional view of a glass substrate 102 on which transparent resin portions 210 are formed. Part (b) of FIG. 33A is a plan view of the glass substrate 102 shown in Part (a) of FIG. 33A.

In the first step, a non-dyeable photosensitive transparent material is spin-coated onto the glass substrate 102 so as to form a film having a thickness of about 0.5 µm. Then, the transparent material film is subjected to a pattern-exposure process which uses active light, and developed with an alkaline developing solution. After being washed with water, the resultant structure is thermally treated, whereby transparent resin portions 210 are formed on the glass substrate 102 as shown in Parts (a) and (b) of FIG. 33A. Herein, the transparent resin portions 210 are formed in a predetermined pattern on the glass substrate 102 so that each of them is within a region corresponding to a reflective region of the lower substrate 101 in a final product. In the final product, the transparent resin portions 210 form transmissive non-color filter regions. In this example, the transparent resin portions 210 are formed by using a pattern-exposure process of the photosensitive resin. However, the transparent resin portions 210 may be formed using other techniques such as patterning by etching, printing, transferring, etc. Furthermore, as shown in Part (b) of FIG. 33A, the transparent resin portions 210 are formed in a stripe pattern, but may be formed in islands as long as each of the islands is within a region which corresponds to a reflective region of the lower substrate 101.

Figure 33B:
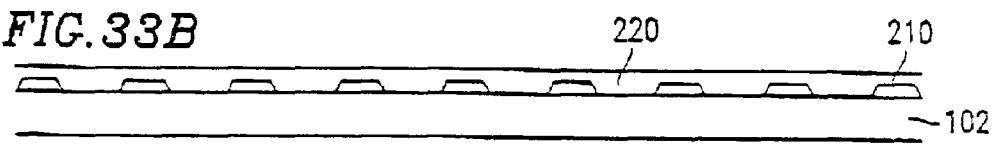
Figure 33C:
Figure 33D:
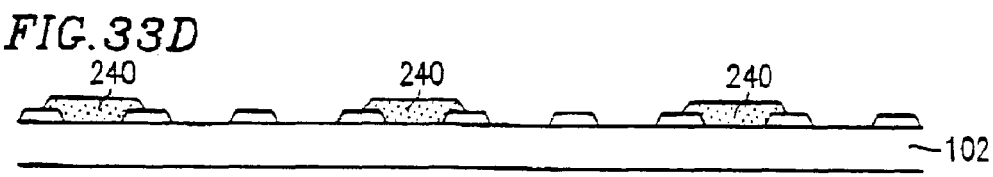
Figure 33E:
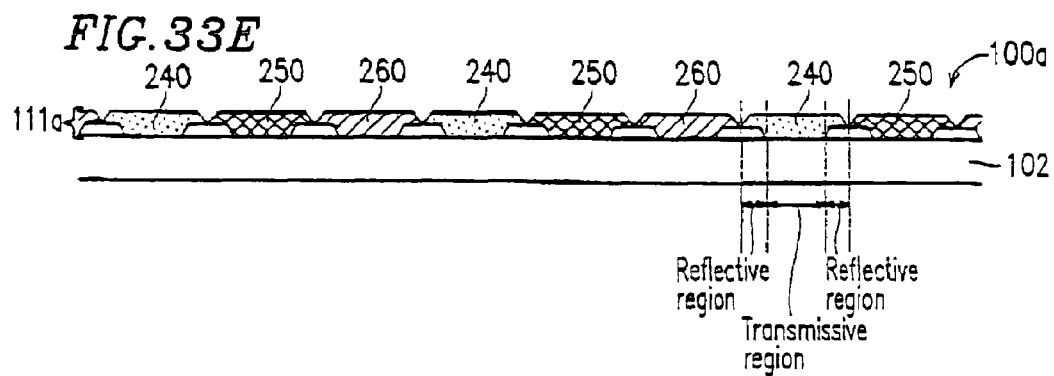

Thereafter, a dyeable photosensitive resin (e.g., a water solution in which an ammonium dichromate is added to a low molecular weight gelatin so as to provide photosensitivity) is applied by spin-coating over the glass substrate 102 so as to form a film 220 having a thickness of about 1 µm, shown in FIG. 33B. The formed film 220 has a relatively flat upper surface over the entire glass substrate 102, and thus, the thickness thereof is thinner in a region over the transparent resin portions 210 than in a region between the transparent resin portions 210 in which the film 220 is formed directly on the glass substrate 102. Then, the dyeable photosensitive resin film 220 is exposed to ultraviolet light through an exposure mask having a predetermined light-shielding pattern so as to form in the film 220 a latent image for first color portions (e.g., red portions). The dyeable photosensitive resin film is water-developed so that unexposed portions of the film are dissolved, whereby a first color relief pattern 230 is formed as shown in FIG. 33C. Thereafter, the resultant structure is immersed in a first color dye solution to dye the relief pattern 230. Then, a dye fixation process and a dye-proofing treatment are performed, whereby first color portions 240 are formed as shown in FIG. 33D. In these steps, the transparent resin portions 210 are not dyed with a first color because they are non-dyeable. In the same manner, second color (e.g., blue) portions 250 and third color (e.g., green) portions 260 are formed on the glass substrate 102, whereby the color filter layer 111a of a color filter substrate 100a is completed. Thereafter, an over-coat layer (not shown) may be formed of an acrylic resin material over the color filter layer 111a if necessary. In the final product, the first color portions 240, the second color portions 250, and the third color portions 260 form the color filter regions.

Over the color filter layer 111a of the thus-obtained color filter substrate 100a (FIG. 33B), a transparent conductive layer (not shown) is formed. Then, the color filter substrate 100a is combined with the lower substrate 101, and a liquid crystal material is injected therebetween, whereby a liquid crystal display panel is completed (in the liquid crystal display device, an orientation treatment may be performed before the substrates are combined). It should be noted that on the lower substrate 101, each pixel may include both a transmissive region and a reflective region.

As in example 21, in the color filter layer 111a of example 22, the thickness of the color filter region is thinner in portions or the entirety of the reflective regions than in the transmissive regions. Therefore, the utilization efficiency for outside light does not decrease in the reflective regions although the outside light is transmitted through the color filter layer 111a twice. When the color filter layer 111a of example 21 is employed, a transmission/reflection-type liquid crystal display device which produces a bright and even display is obtained.

EXAMPLE 23

FIGS. 34A through 34E show steps of forming a color filter substrate according to example 23, which includes a step of polishing a color filter material film.

Figure 34A:
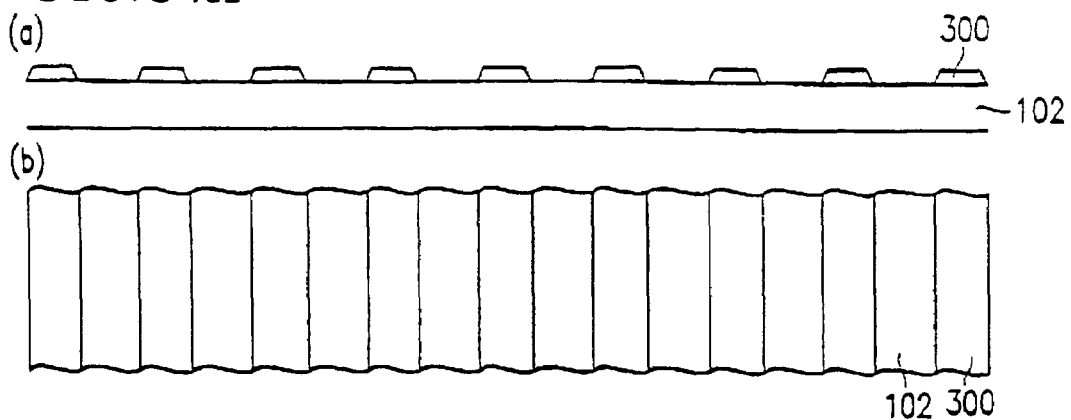
FIGS. 34A through 34E show steps of forming a color filter substrate according to example 23 of the present invention by polishing a color filter layer.

Part (a) of FIG. 34A is a cross-sectional view of a glass substrate 102 on which transparent resin portions 300 are formed. Part (b) of FIG. 34A is a plan view of the glass substrate 102 shown in Part (a) of FIG. 34A.

In the first step, a transparent acrylic photosensitive material (e.g., OPTMER® NN700 available from JSR Corporation) is spin-coated onto the glass substrate 102 so as to form a film having a thickness of about 0.5 µm. Then, the transparent material film is subjected to a pattern-exposure process which uses active light, and developed with an alkaline developing solution. After being washed with water, the resultant structure is thermally treated, whereby transparent resin portions 300 are formed on the glass substrate 102 as shown in Parts (a) and (b) of FIG. 34A. Herein, the transparent resin portions 300 are formed in a predetermined pattern on the glass substrate 102 so that each of them is within a region corresponding to a reflective region of the lower substrate 101 in a final product. In the final product, the transparent resin portions 300 form transmissive non-color filter regions. In this example, the transparent resin portions 300 are formed by using a pattern-exposure process of the photosensitive resin. However, the transparent resin portions 300 may be formed using other techniques such as patterning by etching, printing, transferring, etc. Furthermore, as shown in Part (b) of FIG. 34A, the transparent resin portions 300 are formed in a stripe pattern, but may be formed in islands as long as each of the islands is within a region which corresponds to a reflective region of the lower substrate 101.

Figure 34B:
Figure 34C:
Figure 34D:

Thereafter, an acrylic pigment-dispersion photosensitive material of a first color (e.g., red) is spin-coated entirely over the glass substrate 102 so as to form a film 310 having a thickness of about 1 µm, shown in FIG. 34B. The film 310 is formed so as to have a relatively flat upper surface over the entire glass substrate 102. However, if the viscosity of the acrylic pigment-dispersion photosensitive material used is high, steps may be formed between portions of the film 310 over the transparent resin portions 300 and the portions of the film 310 between the transparent resin portions 300 which are directly on the glass substrate 102. Then, the formed film 310 of the first color photosensitive material is subjected to a pattern-exposure process which uses active light, and developed with an alkaline developing solution. After being washed with water, the resultant structure is thermally treated, whereby first color portions 320 for a color filter layer 111a are formed as shown in FIG. 34C. In the same manner, second color portions 330 and third color portions 340 are formed of an acrylic pigment-dispersion photosensitive material of a second color (e.g., blue) and an acrylic pigment-dispersion photosensitive material of a third color (e.g., green), respectively, thereby forming a color filter layer 110 of a color filter substrate 100' as shown in FIG. 34D. In the final product, the first color portions 320, the second color portions 330, and the third color portions 340 form the color filter regions.

In the color filter substrate 100a' shown in FIG. 34D, high steps have been formed in the color portions 320, 330, and 340 of the color filter layer 110 between regions in which the transparent resin portions 300 are formed and regions in which the transparent resin portions 300 are not formed. In such a case, the effects of the present invention that have been described in example 21 cannot be satisfactorily obtained, because there is not a sufficient difference in the thickness of the color portions 320, 330, and 340 between the regions in which the transparent resin portions 300 are formed and the regions in which the transparent resin portions 300 are not formed. Furthermore, in the case where a color filter substrate having such an uneven color filter layer 110 is combined with a counter substrate to form a liquid crystal panel, a liquid crystal panel having a multi-gap structure in which the thickness of a liquid crystal layer varies within a reflective region of a single pixel results. Such a multi-gap structure may deteriorate the display quality. In particular, in a liquid crystal display device which uses a liquid crystal material having a positive dielectric anisotropy and operates in a display mode where a black display is produced when a particular voltage is applied, the contrast ratio deteriorates because light is not completely interrupted by the liquid crystal molecules when a black display is produced (in a liquid crystal display device which uses a liquid crystal material having a negative dielectric anisotropy, the liquid crystal display device operates in a display mode where a black display is produced when a voltage is not applied or when the applied voltage is smaller than a threshold voltage, e.g., a vertical orientation display mode). In such a case, the contrast ratio does not deteriorate because the light is completely interrupted by the liquid crystal molecules during a black display.

Figure 34E:
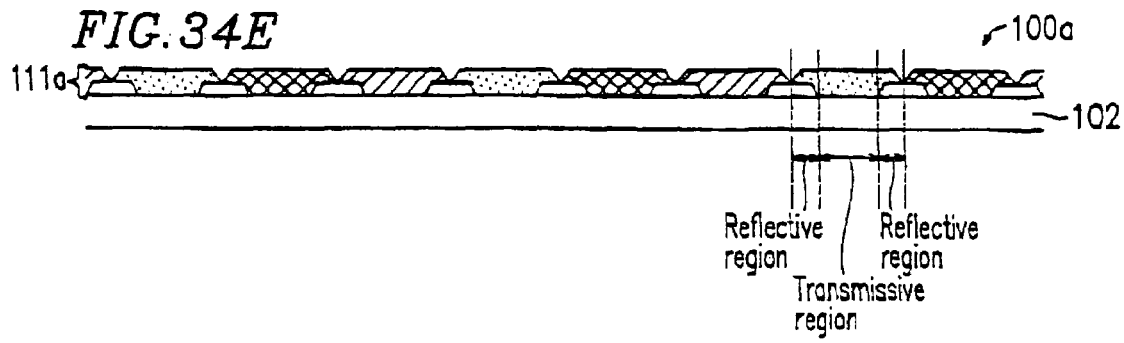

In this example, a surface of the uneven color filter layer 110 is polished so that the steps formed on the surface of the color filter layer 110 shown in FIG. 34D are reduced or removed so as to obtain a color filter layer 111a having a substantially flat surface as shown in FIG. 34E. With the flat color filter layer 111a, the effects of the present invention that have been described in the above examples can be satisfactorily obtained. Furthermore, the deterioration in display quality due to the multi-gap structure in the reflective regions can be prevented.

EXAMPLE 24

FIGS. 35A through 35H show steps of forming a color filter substrate by partially reducing the thickness of a color filter region in a color filter layer.

Figure 35A:
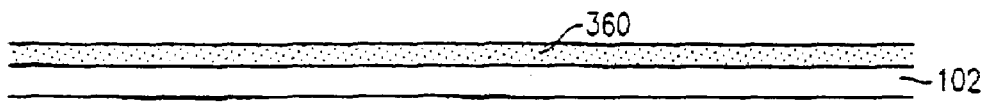

FIG. 35A is a cross-sectional view of a glass substrate 102 on which a transparent acrylic photosensitive material film 360 is formed.

Figure 35B:
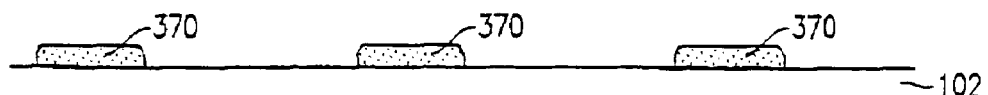
Figure 35C:
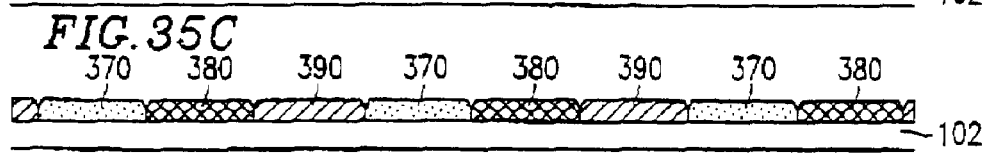

In the first step, an acrylic pigment-dispersion photosensitive material of a first color (e.g., red) is spin-coated onto a glass substrate 102 so as to form a film 360 having a thickness of about 1 µm, shown in FIG. 35A. Then, the formed film 360 of the first color photosensitive material is subjected to a pattern-exposure process which uses active light, and developed with an alkaline developing solution. After being washed with water, the resultant structure is thermally treated, whereby first color portions 370 are formed as shown in FIG. 35B. In the same manner, second color portions 380 and third color portions 390 for the color filter layer are formed of an acrylic pigment-dispersion photosensitive material of a second color (e.g., blue) and an acrylic pigment-dispersion photosensitive material of a third color (e.g., green), respectively, as shown in FIG. 35C.

Figure 35D:
Figure 35E:
Figure 35F:
Figure 35G:
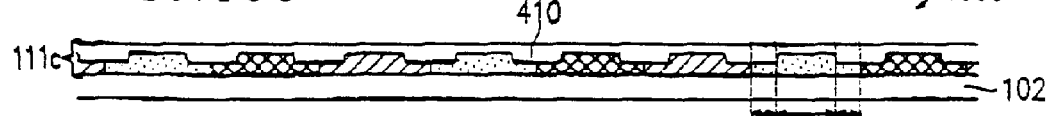
Figure 35H:
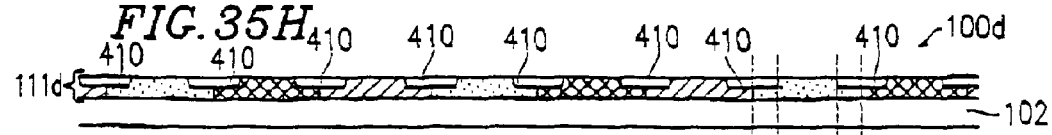

Next, as shown in FIG. 35D, resist portions 400 are formed on the color portions 370, 380, and 390 so that the resist portions 400 are provided in regions which correspond to the transmissive regions or to the transmissive regions and portions of the reflective regions in the final product. Then, portions of the color portions 370, 380, and 390 which are not covered with the resist portions 400 are etched by dry etching as shown in FIG. 35E (instead of dry etching, other techniques such as ashing, etc., may be used). Thereafter, the resist portions 400 are removed from the structure shown in FIG. 35E, whereby a color filter substrate 100b having a color filter layer 111b is obtained as shown in FIG. 35F. This color filter substrate 100b can be combined with a lower substrate 101 (FIG. 31A) to fabricate a transmission/reflection-type liquid crystal display device.

In addition, a transparent resin layer 410 having a flat upper surface may be formed over the entire color filter layer 111b or on portions of the color filter layer 111b which have been thinned by etching, whereby a color filter substrate 100c (FIG. 35G) or a color filter substrate 100d (FIG. 35H) are respectively obtained. In the case where the color filter substrate 100c or the color filter substrate 100d is employed, the thickness of the liquid crystal layer or the optical path length in the liquid crystal layer is optimized, and the orientation of the liquid crystal layer is stabilized, i.e., a uniform liquid crystal layer is obtained over the entire liquid crystal display device. Furthermore, the orientation of the liquid crystal layer is stabilized. In the final product, the transparent resin layer 410 forms a transmissive non-color filter region(s), and the first color portions 370, the second color portions 380, and the third color portions 390 form the color filter regions.

Furthermore, the shape of the portions of the color filter layer 111b to be thinned by etching is not limited to a particular shape, but may be any shape (e.g., stripes, islands, etc.) as long as the thinned portions are within regions which correspond to the reflective regions of the lower substrate 101.

Over the color filter layer 111 (111b, 111c, or 111d) of the color filter substrate too (100b, 100c, or 100d) which has been fabricated as described above, an over-coat layer (not shown) and a transparent conductive layer (not shown) are formed. Then, the color filter substrate 100 is combined with the lower substrate 101, and a liquid crystal material is injected therebetween, whereby a liquid crystal display panel is completed (in the liquid crystal display device, an orientation treatment may be performed before the substrates are combined). It should be noted that in the lower substrate 101, each pixel may include both a transmissive region and a reflective region. Furthermore, a light-shielding layer may be provided on the color filter substrate 100a if necessary.

In example 24, the color filter layer may be produced by using the dyeing technique which has been described in example 22. A method for producing such a color filter will be described with reference to FIGS. 36A through 36I.

Figure 36A:
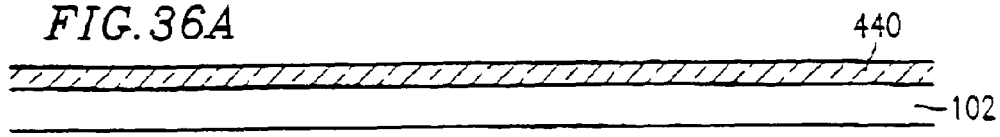
Figure 36B:
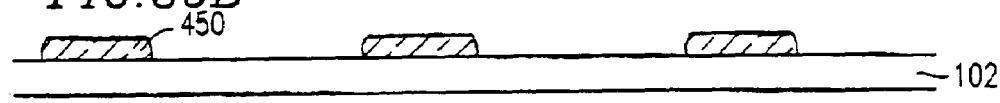
Figure 36C:

In the first step, a dyeable photosensitive resin (e.g., a water solution in which an ammonium dichromate is added to a low molecular weight gelatin so as to provide photosensitivity) is applied by spin-coating over the glass substrate 102 so as to form a film 440 having a thickness of about 1 µm, shown in FIG. 36A. Then, the dyeable photosensitive resin film 440 is exposed to ultraviolet light through an exposure mask having a predetermined light-shielding pattern so as to form in the film 440 a latent image for first color portions (e.g., red portions). The dyeable photosensitive resin film 440 is water-developed so that unexposed portions of the film are dissolved, whereby a relief pattern 450 for first color portions is formed as shown in FIG. 36B. Thereafter, the resultant structure is immersed in a first color dye solution to dye the relief pattern 450. Then, a dye fixation process and a dye-proofing treatment are performed, whereby first color portions 460 are formed as shown in FIG. 36C. In the same manner, second color (e.g., blue) portions 470 and third color (e.g., green) portions 480 are formed on the glass substrate 102, whereby a structure shown in FIG. 36D is obtained.

Figure 36D:
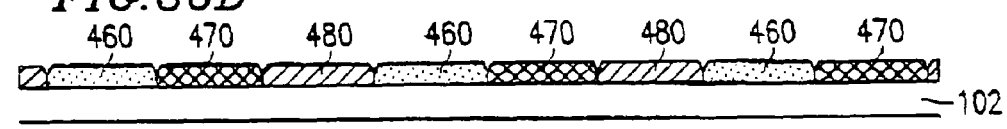
Figure 36E:
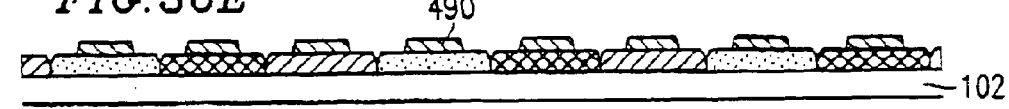
Figure 36F:
Figure 36G:
Figure 36H:
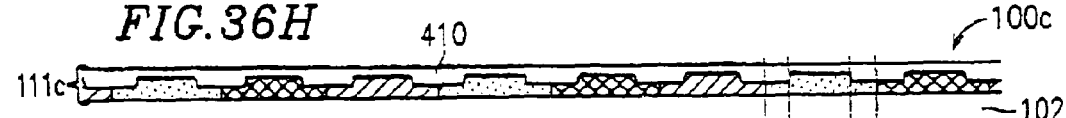
Figure 36I:

Thereafter, the structure shown in FIG. 36D is subjected to the steps shown in FIGS. 36E and 36F which are the same as the steps shown in FIGS. 35D and 35E. Through these steps, predetermined portions of the color portions which are within regions corresponding to the reflective regions of the lower substrate are thinned, whereby a desired color filter substrate 100b is obtained. In addition, a transparent resin layer 410 having a flat upper surface may be formed over the entire color filter layer 111b or on portions of the color filter layer 111b which have been thinned, whereby a color filter substrate 100c (FIG. 36H) or a color filter substrate 100d (FIG. 36I) are respectively obtained. It should be noted that in the lower substrate 101, each pixel may include both a transmissive region and a reflective region.

Now comparing the production methods of the color filter layer according to examples 21 and 22 (i.e., the color filter portions are formed after the transmissive non-color filter regions have been formed on the glass substrate, see FIGS. 32A through 32D and FIGS. 33A through 33E, respectively) and the production methods of the color filter layer according to example 24 (i.e., the transmissive non-color filter regions are formed after the color filter portions are formed on the glass substrate, see FIGS. 35A through 35H and FIGS. 36A through 36I), it can be clearly seen from the drawings and the descriptions above, that the production methods of examples 21 and 22 can produce a flat color filter layer with a smaller number of steps than the production methods of example 24 because the steps of thinning the color filter layer (dry-etching, ashing, etc.) are not required in the production methods according to examples 21 and 22.

In examples 21-24, the color filter regions in the transmissive regions and the color filter regions in the reflective regions which are of the same color type have been made of the same material, but may be made of different materials.

EXAMPLE 25

There is a further method for producing a color filter substrate 100 according to embodiment 3 of the present invention, in which the chromaticity property and the transmissivity of a color filter layer are appropriately adjusted for the transmissive regions and the reflective regions of the lower substrate 101. This method will be described with reference to FIGS. 37A through 37C.

Figure 37A:
FIGS. 37A through 37C show steps of forming a color filter substrate which includes color filter regions having different pigment concentrations according to example 25 of the present invention.
Figure 37B:
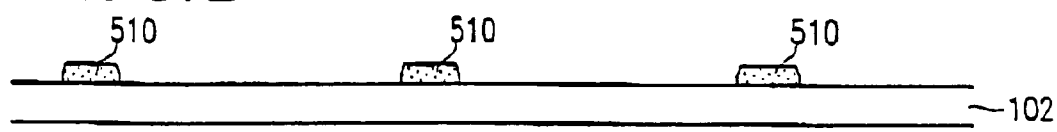
Figure 37C:
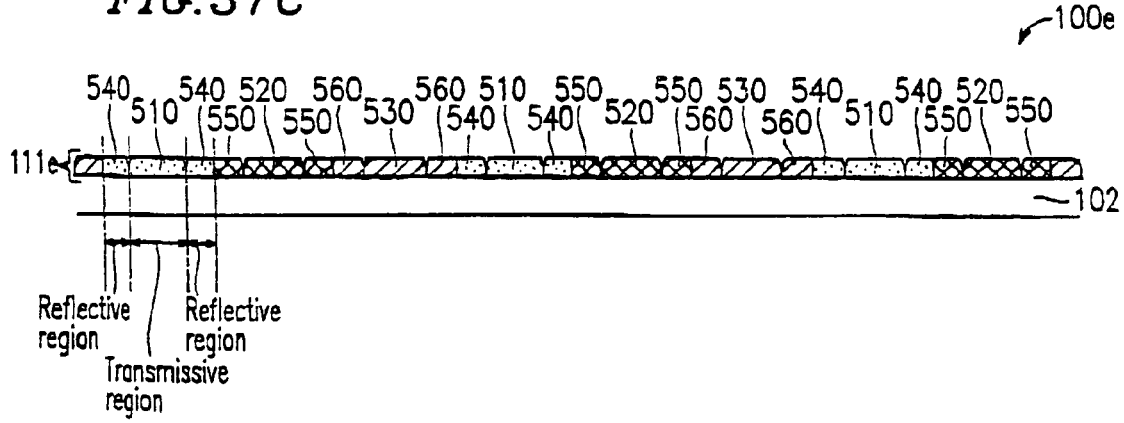

In the first step, an acrylic pigment-dispersion photosensitive material of a first color (e.g., red for a transmissive region) is spin-coated onto a glass substrate 102 so as to form a film 500 having a thickness of about 1 µm, shown in FIG. 37A. Then, the formed film 500 of the first color photosensitive material is subjected to a pattern-exposure process which uses active light, and developed with an alkaline developing solution. After being washed with water, the resultant structure is thermally treated, whereby first color filter regions 510 are formed as shown in FIG. 37B. In the same manner, second color filter regions 520, third color filter regions 530, fourth color filter regions 540, fifth color filter regions 550, and sixth color filter regions 560 are respectively formed of acrylic pigment-dispersion photosensitive materials of a second color (e.g., blue for a transmissive region), of a third color (e.g., green for a transmissive region), of a fourth color (e.g., red for a reflective region), of a fifth color (e.g., blue for a reflective region), and of a sixth color (e.g., green for a reflective region), whereby a color filter layer 111e (i.e., a color filter substrate 100e) is completed as shown in FIG. 37C. Herein, the first color filter regions 510 and the fourth color filter regions 540 are of the same color type; the second color filter regions 520 and the fifth color filter regions 550 are of the same color type; and the third color filter regions 530 and sixth color filter regions 560 are of the same color type. However, the pigment concentrations in the first, second, and third color filter regions 510, 520, and 530 are higher than those in the forth, fifth, and sixth color filter regions 540, 550, and 560, respectively.

In the present invention, it is assumed that, in the transmissive regions, light that contributes to a display passes through the color filter layer once, while in the reflective regions, light that contributes to a display passes through the color filter layer twice. In the color filter layer 111e, for the same color type, different color filter materials (i.e., different types of pigments or materials having different pigment concentration) are employed for the color filter regions in the transmissive regions and the color filter regions in the reflective regions, so that the difference of the chromaticity property of light which contributes to display between the reflective regions and the transmissive regions is reduced. For example, referring to the first color filter regions 510 of red for a transmissive region and the fourth color filter regions 540 of red for a reflective region, the pigment concentration of the first color filter regions 510 is higher than that of the fourth color filter regions 540. Thus, in such a structure, although outside light which contributes to display in the reflective regions passes through the fourth color filter regions 540 twice, the utilization efficiency of the outside light does not decrease because the pigment concentration of the fourth color filter regions 540 is lower than that of the first color filter regions 510. Therefore, when the color filter layer 111e is employed, a transmission/reflection-type liquid crystal display device which provides superior brightness and chromaticity property over the entire display region can be obtained.

Furthermore, there is still another method for producing a color filter substrate 100 according to embodiment 3 of the present invention, in which the types of materials used for the color filter regions and the thicknesses of the color filter regions are appropriately changed. This method will be described with reference to FIGS. 38A through 38E.

Figure 38A:
FIGS. 38A through 38E show steps of forming another color filter substrate according to example 25 in which the thickness of the color filter layer is different in transmissive regions and reflective regions.
Figure 38B:
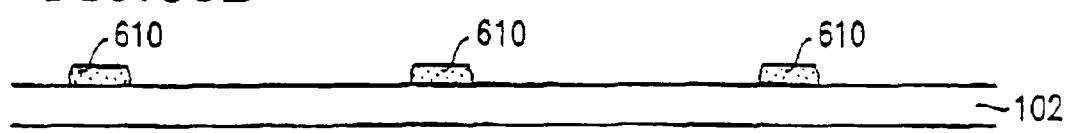
Figure 38C:
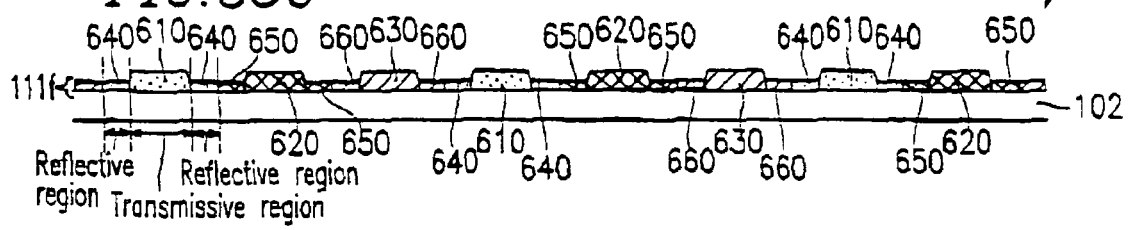
Figure 38D:
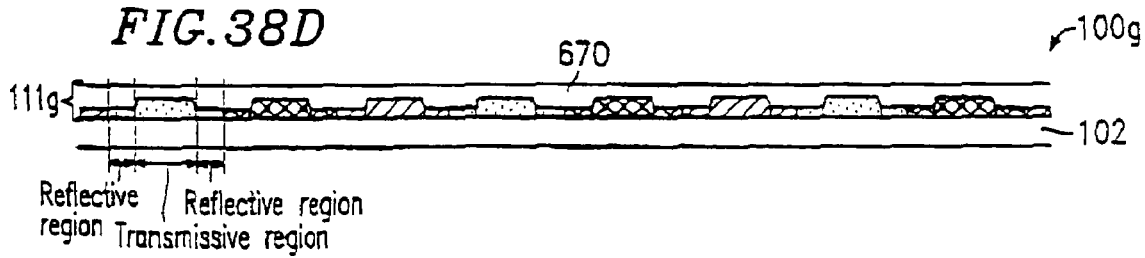

In the first step, an acrylic pigment-dispersion photosensitive material of a first color (e.g., red for a transmissive region) is spin-coated onto a glass substrate 102 so as to form a film 600 having a thickness of about 1 μm, shown in FIG. 38A. Then, the formed film 600 of the first color photosensitive material is subjected to a pattern-exposure process which uses active light, and developed with an alkaline developing solution. After being washed with water, the resultant structure is thermally treated, whereby first color portions 610 are formed as shown in FIG. 38B. In the same manner, second color portions 620, third color portions 630, fourth color portions 640, fifth color portions 650, and sixth color portions 660 are respectively formed of acrylic pigment-dispersion photosensitive materials of a second color (e.g., blue for a transmissive region), of a third color (e.g., green for a transmissive region), of a fourth color (e.g., red for a reflective region), of a fifth color (e.g., blue for a reflective region), and of a sixth color (e.g., green for a reflective region), whereby a color filter layer 111*f* is fabricated as shown in FIG. 38C. In this step, the fourth color portions 640 are formed of the same acrylic pigment-dispersion photosensitive material as that employed for the first color portions 610. However, the fourth color portions 640 (red for a reflective region) are formed so as to be a thinner film than the first color portions 610 (red for a transmissive region) by changing the conditions of the spin-coating or the viscosity of the material for the fourth color portions 640. Similarly, the fifth color portions 650 (blue for a reflective region) and the sixth color portions 660 (green for a reflective region) are thinner than the second color portions 620 (blue for a transmissive region) and the third color portions 630 (green for a transmissive region), respectively. In such a structure, although outside light which contributes to display in the reflective regions passes through the color filter layer 111*f* twice, the utilization efficiency of the outside light does not decrease because the color filter layer 111*f* in the reflective regions is thinner than in the transmissive regions, and the amount of pigment contained in the color filter layer 111*f* in the reflective regions is lower than that in the transmissive regions. Therefore, in a transmission/reflection-type liquid crystal display device which employs the color filter layer 111*f*, a bright and even image can be produced over the entire display region.

Figure 38E:
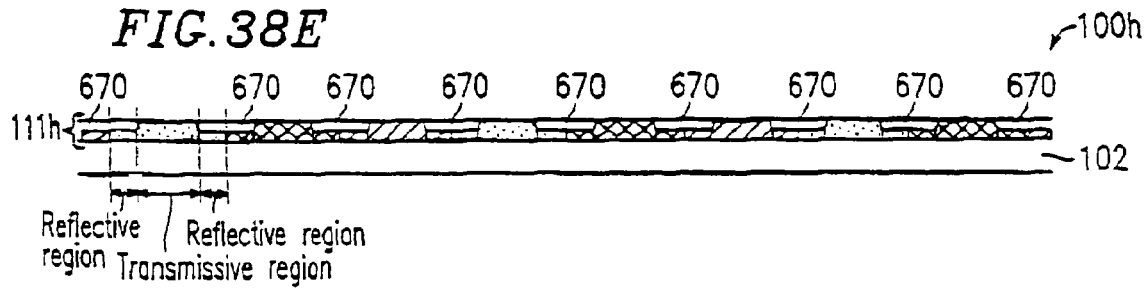

Furthermore, if necessary, a transparent resin layer 670 may be provided on the color filter layer 111*f* to form a color filter layer 111*g* or a color filter layer 111*h* having a flat upper surface, thereby obtaining color filter substrates 100*g* and 100*h* as shown in FIGS. 38E and 38F, respectively.

Figure 39:
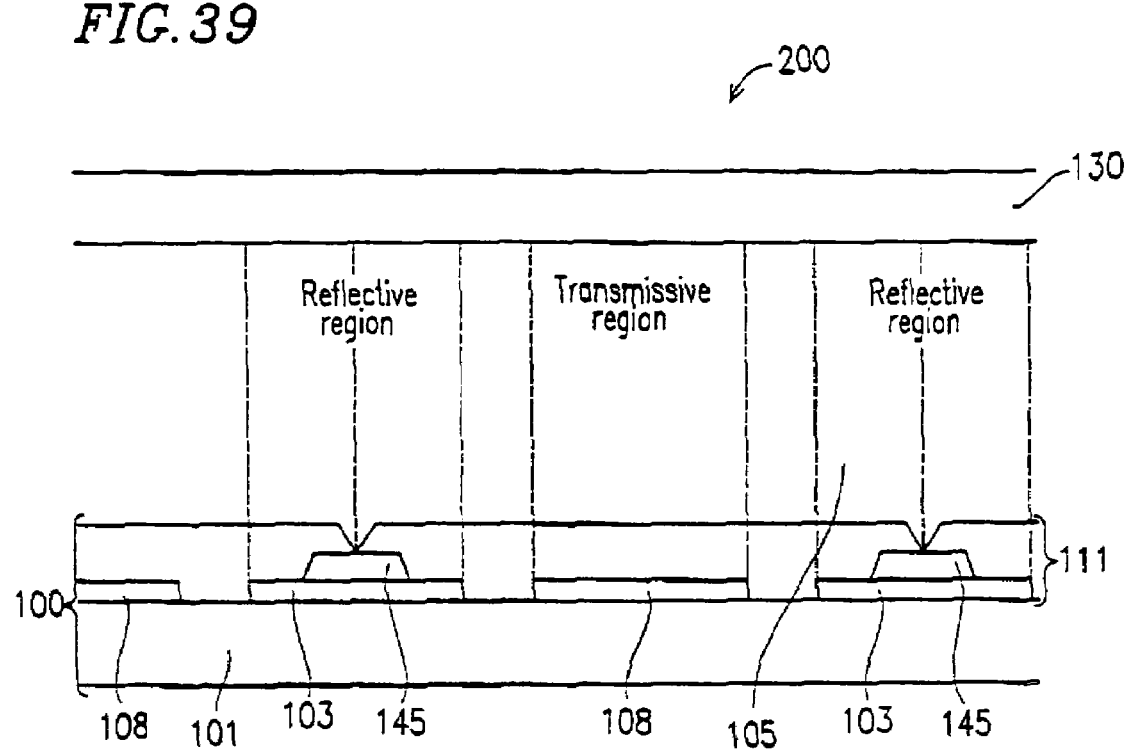
FIG. 39 is a cross-sectional view showing another transmission/reflection-type liquid crystal display device according to embodiment 3.

In the above descriptions of embodiment 3, the color filter layer is provided on a glass substrate, but the present invention is not limited thereto. The color filter layer may be formed on the lower substrate. For example, the present invention includes a display device 200 having a structure shown in FIG. 39. In the display device 200, a color filter substrate 100 includes a lower substrate 101 and a color filter layer 111. A liquid crystal layer 105 is provided between the color filter substrate 100 and a counter substrate 130. The color filter layer 111 is formed over the lower substrate 101 so as to cover reflective electrodes 103 and transmissive electrodes 108. The color filter layer 111 includes transmissive non-color filter regions 145 provided over portions of the reflective electrodes 103. It is apparent to those skilled in the art that in the case where this structure is formed so that the difference of the chromaticity property between light used for display in the transmissive regions and light used for display in the reflective regions is as small as possible, the effects of the present invention can be obtained.

Furthermore, in the case where a color filter layer according to embodiment 3 is applied to the invention of embodiment 1 or 2, and each of the plurality of reflective regions so that each of them has the same ratio of an area of a color filter region to an area of a transmissive non-color filter region, a uniform, even display can be achieved over a display region of a display device.

According to the present invention, a liquid crystal display device includes a pair of substrates which are laminated to each other with a liquid crystal layer interposed therebetween, wherein pixel electrodes are formed on one of the substrates, a color filter including color filter regions are formed on the other substrates, and a color filter region(s) and a non-color filter region(s) are provided on each of the regions of the other substrate which correspond to the respective pixel electrodes. The color filter layer is formed such that the area of the non-color filter region(s) in each pixel region is not changed even when the pixel electrode regions and the color filter regions are mis-aligned each other. Therefore, variation in optical characteristics of the liquid crystal device (e.g., brightness and chromaticity property) can be minimized even when the edge portion of each color filter region is shifted from the designed position upon producing the color filter layer, as well as even when the substrates are mis-aligned upon producing the liquid crystal panel.

According to the present invention, non-color filter regions are provided in the reflective regions, whereby white display can be provided as well as brightness of the display can be improved without increasing the number of steps in the production process as compared to the color filter for use in the transmission-type liquid crystal display device. Moreover, light transmitted through the color filter regions having high chromaticity property is mixed with light transmitted through the non-color filter regions, whereby a transmission/reflection-type liquid crystal display device capable of providing a bright color display required for the reflection display can be realized.

Moreover, a planarizing film having a light-transmitting property is formed at least on each of the non-color filter regions in order to make the thickness of the portion of the liquid crystal layer which corresponds to the color filter regions equal to the thickness of the portion of the liquid crystal layer which corresponds to the non-color filter regions. Thus, retardation in both portions of the liquid crystal layer is made equal to each other, whereby a uniform display can be realized from a dark state to a bright state.

Moreover, a color filter layer is formed on a region of the other substrate which corresponds to a contact hole for connecting the respective pixel electrode to a respective switching device. Thus, the leakage of light within the reflective region due to the mismatch of the electro-optical characteristics which results from the difference in retardation is reduced.

By realizing such a transmission/reflection-type liquid crystal display device, the problems of the conventional liquid crystal display devices can be easily solved without increasing the cost of the color filter.

According to the transmission/reflection-type liquid crystal display device of the present invention, display can be provided by using a backlight, whereby bright, a high-contrast display can be provided without being significantly affected by the brightness around the liquid crystal display device. Furthermore, a display can also be provided without the backlight, whereby power consumption can be significantly reduced.

Thus, upon providing display, the quantity of light of the backlight can be appropriately adjusted in view of the conditions (e.g., brightness of the environment) under which the liquid crystal display device is used. Therefore, increase in the power consumption, which is a problem of conventional transmission-type liquid crystal display devices, can be prevented, as well as variation in display due to the brightness of the environment, which is a problem of conventional reflection-type liquid crystal display devices, can be eliminated.

Accordingly, the transmission/reflection-type liquid crystal display device of the present invention can solve the problems of both the conventional transmission-type liquid crystal display devices and the conventional reflection-type liquid crystal display devices.

In embodiment 3 of the present invention, a glass substrate is used for a color filter substrate, but the present invention is not limited to the glass substrate. A substrate made of a material other than glass may be used as long as it is transparent.

In the present invention, it is assumed that in the transmissive regions, light which contributes to a display passes through the color filter layer once, while in the reflective regions, light which contributes to a display passes through the color filter layer twice. Based on this assumption, a color filter layer according to embodiment 3 of the present invention adopts a special optical design, by which the difference of the chromaticity property between the reflected light from the reflective regions and the transmitted light from the transmissive regions is reduced, in addition to improving the utilization efficiency of light in the reflective regions.

For example, according to embodiment 3, the color filter layer is formed so that the transmissivity of the color filter layer in portions or the entirety of the reflective regions for a wavelength in a certain wavelength range is larger than that of the color filter layer in the transmissive regions for the wavelength in the certain wavelength range.

Specifically, the above effect of the present invention is achieved by changing the thickness of the color filter layer in the transmissive regions and the reflective regions.

According to the present invention, it is preferable that the color filter layer has a flat upper surface. Such a color filter layer avoids a structure in which the thickness of a liquid crystal layer varies within a reflective region of a single pixel (multi-gap structure). In addition, the optical path length of the liquid crystal layer is appropriately adjusted, or the orientation of the liquid crystal layer is stabilized, whereby the deterioration of display quality is prevented.

Alternatively, a transparent resin layer may be partially provided between a glass substrate and color filter layer formed thereon so that the thickness of the color filter layer is different between the transmissive regions and the reflective regions but the color filter layer retains a flat upper surface. With the color filter layer having such a structure, the above effects of the present invention can be achieved.

Furthermore, it is preferable to consider an alignment margin so that a portion of the color filter layer which should be within a reflective region do not protrude to a transmissive region even in the case where the color filter substrate is mis-aligned with respect to the lower substrate when they are combined, or even in the case where elements are misarranged on a single substrate. With such an alignment margin, the variation of transmissivity and chromaticity property in the transmissive regions is prevented.

In general, in a liquid crystal display device which uses a liquid crystal material having a positive dielectric anisotropy and operates in a display mode where a black display is produced when a particular voltage is applied, the contrast ratio may deteriorate because light is not completely interrupted by the liquid crystal molecules during a black display. According to embodiment 3 of the present invention, a liquid crystal display device uses a liquid crystal material having a negative dielectric anisotropy and operates in a display mode where a black display is produced when a voltage is not applied or when the applied voltage is smaller than a threshold voltage (e.g., vertical orientation display mode). Thus, the contrast ratio does not deteriorate because the light is completely interrupted by the liquid crystal molecules during a black display.

According to the present invention, a color filter layer includes at least two regions between which the number of times that light used for display is transmitted through the color filter layer is different. In such a structure, the structure of the color filter layer is determined based on the number of times that the light used for display is transmitted through the color filter layer in the at least two regions.

According to the present invention, although the number of times that light used for display is transmitted through the color filter layer is different in various regions over a display region, the chromaticity property over the entire display region is optimized by optimizing the chromaticity property of a display state for each of the various regions.

According to the present invention, in a transmission/reflection-type display device, a color filter layer includes at least two regions between which the number of times that light used for display is transmitted through the color filter layer is different. In such a transmission/reflection-type display device, the structure of the color filter layer is determined based on the number of times that the light used for display is transmitted through the color filter layer in each of the at least two regions.

According to the present invention, the chromaticity property of display in a reflective region and the chromaticity property of display in a transmissive region are optimized so that the optimized chromaticity property of display is obtained over an entire display region. Therefore, a display device is provided in which the satisfactory chromaticity property can maintained even in the case where environmental lightning conditions abruptly changed.

Furthermore, a display device according to the present invention is applicable to a transmission/reflection-type liquid crystal display device.

A transmission/reflection-type liquid crystal display device according to the present invention includes a second substrate. With such a structure, a reliable liquid crystal display device in which an operation of a liquid crystal layer is securely performed can be achieved.

In a display device according to the present invention, a reflective region and a transmissive region each have a color filter region so that light is never used for display without passing through the color filter region. In such a structure, deterioration in a chromaticity property of transmitted light and reflected light is prevented.

According to the present invention, a transmissive non-color filter region may be provided in a reflective region, whereby the thickness of a color filter layer is adjusted. As a result, optical path lengths of a transmissive region and a reflective region (i.e., the phase difference between the reflective and transmissive regions) can be adjusted. Alternatively, in the case where the thickness of the color filter region in the reflective region is different from the thickness of the color filter region in the transmissive region, a transmissive non-color filter region may be provided in the reflective region so that the difference in thickness is compensated for and the color filter layer has a flat upper surface.

According to the present invention, a transmissive non-color filter region may be provided over or under a color filter region in a color filter layer. In such a structure, light transmitted through the transmissive non-color filter region is also transmitted through the color filter region. Therefore, a transmittance characteristic with respect to a certain wavelength of light (spectral characteristic) is improved, thereby obtaining a sharp spectrum. As a result, a chromaticity property for display is improved. Furthermore, even in the case where the reflective region of the color filter layer is mis-aligned with respect to a reflective region of the lower substrate, light is not used for display without being transmitted through a color filter region. In general, for example in a color filter used in a liquid crystal display device, a backlight which produces light for a transmissive region produces light having a large optical power. Thus, if light from the backlight is used for display without being transmitted through the color filter layer, the resultant spectrum of spectral characteristic is a broad spectrum. According to the present invention, light is never used for display without being transmitted through the color filter region.

According to the present invention, a transmissive non-color filter region may be provided between a color filter layer and a substrate. In such a structure, the thickness of the color filter region can be adjusted with a smaller number of steps. Therefore, a chromaticity property can be easily adjusted between transmissive regions and reflective regions.

According to the present invention, a chromaticity property can be easily adjusted between a transmissive region and a reflective region by changing the thickness of the color filter region.

According to the present invention, the same material may be used for both a color filter region in a reflective region and a color filter region in a transmissive region so as to have the same color type. Therefore, a chromaticity property can be easily adjusted between transmissive regions and reflective regions.

According to the present invention, in the case where a color filter layer is formed so that the thickness thereof is thinner in the reflective regions than in the transmissive regions, the same material can be used in both the reflective regions and the transmissive regions. In such a case, troublesome steps of selecting the type of a pigment used for the color filter regions which are of the same color type and of adjusting the concentration of a pigment are not necessary. Thus, a superior chromaticity property can be obtained by simple steps of adjusting the thickness of a color filter layer.

According to the present invention, each of a plurality of reflective regions may have the same ratio of an area ratio of a color filter region to a transmissive non-color filter region. With such a structure, a uniform, even display can be achieved over the entire display device.

According to the present invention, a transmissivity of at least a portion of a reflective region for a certain wavelength may be less than a transmissivity for the certain wavelength of a transmissive region which produces the same color type which is produced in the first region. With such a structure, the difference in a chromaticity property between the reflective and transmissive regions can be reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A transflective liquid crystal display device for displaying an image and including a plurality of pixels, the liquid crystal display device comprising:
    a first substrate;
    a second substrate;
    a liquid crystal layer provided between at least the first substrate and the second substrate;
    a pixel region including a reflection region having light-reflectivity and a transmission region having light-transmissivity, wherein reflected light from the reflection region and transmitted light from the transmission region are each utilized in displaying the image;
    wherein one of the substrates supports a color filter structure, the color filter structure including a color filter region and at least one transmissive non-color filter region, wherein at least portions of both the color filter region and the transmissive non-color filter region are provided in the reflection region;
    wherein a transmissive electrode is provided in at least the transmission region, and wherein the transmissive electrode is in electrical communication with a transistor corresponding; to the pixel region;
    wherein a reflective layer is provided in the reflection region;
    wherein the transmissive non-color filter region is substantially rectangular shaped; and
    wherein the color filter region overlaps the center of the reflective layer in the reflection region.

2. The transflective liquid crystal display device of claim 1, wherein the reflective layer comprises a reflective electrode that is in electrical communication with the transistor corresponding to the pixel region.

3. The liquid crystal display device of claim 2, wherein the reflective electrode and the transmissive electrode of the pixel region are in electrical communication with each other.

4. The liquid crystal display device of claim 1, wherein the reflective layer is formed on an uneven insulating layer so as to have a wavy shape as viewed in cross section.

5. The liquid crystal display device of claim 1, wherein the transmissive non-color filter region is substantially stripe-shaped and is provided between two spaced apart color filters in a given reflection region of a given color filter region.

6. The liquid crystal display device of claim 2, wherein the transmissive electrode and the reflective layer are provided on the opposite substrate as the color filter structure.

7. A liquid crystal display device for displaying an image and including a plurality of pixels, the liquid crystal display device comprising:
    a first substrate;
    a second substrate;
    a liquid crystal layer provided between at least the first substrate and the second substrate;
    a pixel region including a reflection region having light-reflectivity and a transmission region having light-transmissivity, wherein reflected light from the reflection region and transmitted light from the transmission region are each utilized in displaying the image;
    a color filter structure including a color filter region and a transmissive non-color filter region, wherein at least portions of both the color filter region and the transmissive non-color filter region are provided in the reflection region of at least one pixel region;
    wherein a transmissive electrode is provided in at least the transmission region, and wherein the transmission electrode is in electrical communication with a transistor;
    wherein a reflective layer is provided in the reflection region;
    wherein the transmissive non-color filter region is substantially rectangular-shaped; and wherein the color filter region overlaps the center of the reflective layer in the reflection region.

8. The liquid crystal display device of claim 7, wherein the reflective layer comprises a reflective electrode that is in electrical communication with the transistor.

9. The liquid crystal display device of claim 7, wherein the transmissive non-color filter region is provided between two spaced apart color filters of the same color in a given color filter region.

10. The liquid crystal display device of claim 7, wherein the transmissive non-color filter region is centrally located in a given reflection region.

11. The liquid crystal display device of claim 8, wherein the reflective electrode has a concave/convex surface for reflecting light.

* * * * *